(12) United States Patent
Chang et al.

(10) Patent No.: US 8,022,607 B2
(45) Date of Patent: Sep. 20, 2011

(54) PLASMA LAMP WITH SMALL POWER COUPLING SURFACE

(75) Inventors: Yian Chang, Topanga, CA (US); Frederick M. Espiau, legal representative, Topanga, CA (US); Marc DeVincentis, Palo Alto, CA (US)

(73) Assignee: Luxim Corporation, Sunnyvale, CA (US)

( * ) Notice: Subject to any disclaimer, the term of this patent is extended or adjusted under 35 U.S.C. 154(b) by 911 days.

(21) Appl. No.: 11/553,910

(22) Filed: Oct. 27, 2006

(65) Prior Publication Data

US 2007/0211991 A1 Sep. 13, 2007

Related U.S. Application Data

(60) Provisional application No. 60/730,785, filed on Oct. 27, 2005, provisional application No. 60/730,654, filed on Oct. 27, 2005, provisional application No. 60/730,720, filed on Oct. 27, 2005, provisional application No. 60/730,950, filed on Oct. 27, 2005, provisional application No. 60/730,953, filed on Oct. 27, 2005, provisional application No. 60/730,786, filed on Oct. 27, 2005.

(51) Int. Cl.
*H01J 7/46* (2006.01)
(52) U.S. Cl. ..................... 313/231.31; 315/39
(58) Field of Classification Search .................... 313/46, 313/231.61, 231.71, 231.31, 317, 110, 621, 313/634, 635, 636, 252, 276, 607, 620; 315/39, 315/246, 111.41, 248, 112, 111.21
See application file for complete search history.

(56) References Cited

U.S. PATENT DOCUMENTS

| | | |
|---|---|---|
| 3,787,705 A | 1/1974 | Bolin et al. |
| 3,826,950 A | 7/1974 | Hruda et al. |
| 4,001,631 A | 1/1977 | McNeill et al. |
| 4,206,387 A | 6/1980 | Kramer et al. |
| 4,485,332 A | 11/1984 | Ury et al. |
| 4,498,029 A | 2/1985 | Yoshizawa et al. |

(Continued)

FOREIGN PATENT DOCUMENTS

| | | |
|---|---|---|
| JP | 8148127 | 6/1996 |
| KR | 1020050018587 A | 2/2005 |
| WO | WO-2006070190 | 7/2006 |
| WO | WO-2007138276 | 12/2007 |
| WO | WO-2006129102 | 12/2008 |

OTHER PUBLICATIONS

"Chapter 4—Cavity Resonators, Army Technical Manual, TM 11-673—Generation and Transmission of Microwave Energy", (Jun. 1953), 12 pgs.

(Continued)

*Primary Examiner* — Joseph L Williams
*Assistant Examiner* — Fatima N Farokhrooz
(74) *Attorney, Agent, or Firm* — Schwegman, Lundberg & Woessner, P.A.

(57) ABSTRACT

In an example embodiment, an electrodeless plasma lamp is, provided which comprises a dielectric body having an effective dielectric constant greater than two. The dielectric body may have a surface with a first region coated with an electrically conductive material and a second region that is not coated with the electrically conductive material. A bulb is located proximate to the second region of the dielectric body and having an outer surface area and the second region may have an uncoated surface area that is less than about sixty percent (60%) of the outer surface area of the bulb. A power source is coupled to the dielectric body to provide radio frequency power to the dielectric body at a frequency that resonates at a fundamental mode in the dielectric body. The bulb contains a fill that forms a plasma when the radio frequency power is provided from the dielectric body through the second region.

41 Claims, 34 Drawing Sheets

U.S. PATENT DOCUMENTS

| | | | |
|---|---|---|---|
| 4,633,140 | A | 12/1986 | Lynch et al. |
| RE32,626 | E | 3/1988 | Yoshizawa et al. |
| 4,749,915 | A | 6/1988 | Lynch et al. |
| 4,795,658 | A | 1/1989 | Kano et al. |
| 4,887,192 | A | 12/1989 | Simpson et al. |
| 4,950,059 | A | 8/1990 | Roberts |
| 4,975,625 | A | 12/1990 | Lynch et al. |
| 4,978,891 | A | 12/1990 | Ury |
| 5,039,903 | A | 8/1991 | Farrall |
| 5,070,277 | A | 12/1991 | Lapatovich |
| 5,072,157 | A | 12/1991 | Greb et al. |
| 5,084,801 | A | 1/1992 | El-Hamamsy et al. |
| 5,086,258 | A * | 2/1992 | Mucklejohn et al. ......... 315/248 |
| 5,361,274 | A | 11/1994 | Simpson et al. |
| 5,438,242 | A | 8/1995 | Simpson |
| 5,448,135 | A | 9/1995 | Simpson |
| 5,498,937 | A | 3/1996 | Korber et al. |
| 5,525,865 | A | 6/1996 | Simpson |
| 5,594,303 | A | 1/1997 | Simpson et al. |
| 5,786,667 | A | 7/1998 | Simpson et al. |
| 5,841,242 | A * | 11/1998 | Simpson et al. ............... 315/248 |
| 5,910,710 | A | 6/1999 | Simpson |
| 5,910,754 | A | 6/1999 | Simpson et al. |
| 5,923,116 | A | 7/1999 | Mercer et al. |
| 6,020,800 | A * | 2/2000 | Arakawa et al. .............. 333/208 |
| 6,031,333 | A | 2/2000 | Simpson |
| 6,049,170 | A | 4/2000 | Hochi et al. |
| 6,137,237 | A | 10/2000 | MacLennan et al. |
| 6,246,160 | B1 | 6/2001 | MacLennan et al. |
| 6,252,346 | B1 | 6/2001 | Turner et al. |
| 6,265,813 | B1 | 7/2001 | Knox et al. |
| 6,313,587 | B1 | 11/2001 | MacLennan et al. |
| 6,424,099 | B1 | 7/2002 | Kirkpatrick et al. |
| 6,566,817 | B2 | 5/2003 | Lapatovich |
| 6,617,806 | B2 | 9/2003 | Kirkpatrick et al. |
| 6,621,195 | B2 | 9/2003 | Fuji et al. |
| 6,666,739 | B2 | 12/2003 | Pothoven et al. |
| 6,737,809 | B2 | 5/2004 | Espiau et al. |
| 6,856,092 | B2 | 2/2005 | Pothoven et al. |
| 6,922,021 | B2 | 7/2005 | Espiau et al. |
| 7,012,489 | B2 | 3/2006 | Sherrer et al. |
| 7,034,464 | B1 | 4/2006 | Izadian et al. |
| 7,291,985 | B2 | 11/2007 | Espiau et al. |
| 7,348,732 | B2 | 3/2008 | Espiau et al. |
| 7,358,678 | B2 | 4/2008 | Espiau et al. |
| 7,362,054 | B2 | 4/2008 | Espiau et al. |
| 7,362,055 | B2 | 4/2008 | Espiau et al. |
| 7,362,056 | B2 | 4/2008 | Espiau et al. |
| 7,372,209 | B2 | 5/2008 | Espiau et al. |
| 7,391,158 | B2 | 6/2008 | Espiau et al. |
| 7,429,818 | B2 | 9/2008 | Chang et al. |
| 2001/0035720 | A1 | 11/2001 | Guthrie et al. |
| 2002/0011802 | A1* | 1/2002 | Espiau et al. ................. 315/246 |
| 2002/0180356 | A1 | 12/2002 | Kirkpatrick et al. |
| 2004/0155589 | A1* | 8/2004 | Espiau et al. .................... 315/39 |
| 2005/0212456 | A1 | 9/2005 | Espiau et al. |
| 2005/0286263 | A1 | 12/2005 | Champion et al. |
| 2006/0250090 | A9 | 11/2006 | Guthrie et al. |
| 2007/0109069 | A1 | 5/2007 | Espiau et al. |
| 2008/0211971 | A1 | 9/2008 | Pradhan |

OTHER PUBLICATIONS

"Chapter 6.3—Rectangular Waveguide Cavities", *in: Microwave Engineering*, Pozar, D. M., Editor (John Wiley & Sons, Inc.), 313-318.

Espiau, F. M., et al., "Plasma Lamp", U.S. Appl. No. 60/022,028, filed Jul. 31, 2000, 28 pgs.

Guthrie, C., et al., "A Corregated Wave-Guide Used for the Excitation of an Electrode-Less Metal Halide Plasma Lamp Incorporating a Solid Dielectric Material", U.S. Appl. No. 60/224,060, filed Aug. 9, 2000, 9 pgs.

Guthrie, C., et al., "A Method for Connecting the Antenna on a Printed Wiring Board to a Wave-Guide in a Light Source in Which an Electrode-Less Lamp is Built Into The Wave-Guide Structure", U.S. Appl. No. 60/244,061, filed Aug. 9, 2000, 9 pgs.

Guthrie, C., "D.R.I. Drawings—Wave Guide Lamp Concept 8 (WGC008); Wave Guide Lamp Concept 9 (WGC009); and Wave Guide Lamp Concept 10 (WGC010)", *Guthrie Exhibit 2173, Board of Patent Appeals and Interferences* (Interference No. 105,393), (Jun. 28, 2000), 3 pgs.

Guthrie, Charles, et al., "Electrodeless Incandescent Bulb", U.S. Appl. No. 60/639,857, filed Dec. 27, 2004, and Don Wilson 16 pgs.

Guthrie, Charles, "Lamp", U.S. Appl. No. 60,687,458, filed Jun. 6, 2005, 12 pgs.

Guthrie, Charles, et al., "Lamp", U.S. Appl. No. 60/687,280, filed Jun. 3, 2005, and Neate, 17 pgs.

Inventors Not Listed, "Lamp", International Application Serial No. PCT_GB2007_001935, International filing date May 24, 2007, GB Application Serial No. 0610580.3, filed May 30, 2006.

Izadian, J. S., et al., "Generating Light From Electromagnetic Energy", U.S. Appl. No. 60/337,057, filed Nov. 6, 2001, 120 pgs.

Pozar, D. M., "Section 5.8, Tapered Lines", *In: Microwave Engineering, 3rd Edition, 2005* (John Wiley and Sons, Inc.), (2005), 9 pgs.

Pozar, D. M., "Section 6.4, Circular Waveguide Cavities", *in: Microwave Engineering*, 3rd Edition, 2005 (John Wiley and Sons, Inc.), (2005), 8 pgs.

Prior, G., et al., "Quartz Bulb Enclosed in a Wave-Guide", U.S. Appl. No. 60/234,415, filed Sep. 21, 2000, 5 pgs.

Prior, G., et al., "Wave-Guide Used for the Excitation of an Electrode-Less Metal Halide Plasma Lamp Incorporating a Solid Dielectric Material", U.S. Appl. No. 60/224,059, filed Aug. 9, 2000, 7 pgs.

Prior, G., et al., "Wave-Guide Used for the Excitation of an Electrode-Less Metal Halide Plasma Lamp Incorporating a Solid Dielectric Material", U.S. Appl. No. 60/224,298, filed Aug. 10, 2000, 5 pgs.

Sandberg, E., et al., "A Mechanical Means of Sealing the Window to an Electrode-Less Metal Halide Bulb That Is Integrated Into a Waveguide", U.S. Appl. No. 60/262,536, filed Jan. 17, 2001, 6 pgs.

Sandberg, E., "An Improved Drive Circuit for an Electrode-Less Plasma Lamp That is Embedded in a Waveguide", U.S. Appl. No. 60/241,198, filed Oct. 17, 2000, 7 pgs.

Sandberg, E., "Light Source for Use in Microdisplay Based Light Engines", U.S. Appl. No. 60/192,731, filed Mar. 27, 2000, 31 pgs.

Smoler, D., "E-Mail to C. Guthrie re: Ridged Waveguide Ideas", (Jun. 27, 2000), 2 pgs.

Wharmby, D. O., "Chapter 11—Electrodeless Lamps", *In: Lamps & Lighting*, 4th Edition, 1997 (Arnold & John Wiley & Sons, Inc., (1997), 13 pgs.

Wharmby, D. O., "Electrodeless Lamps for Lighting: A Review", *IEEE Proceedings-A*, vol. 140 (6), (Nov. 1993), 9 pgs.

Wilson, D., et al., "Use of a Coating to Prevent the Reduction of Ceramic to Elemental Metal in the Bulb of a Wave-Guide Lamp", U.S. Appl. No. 60/224,866, filed Aug. 11, 2000, 3 pgs.

Wilson, D., et al., "Electrode-Less Metal Halide Plasma Lamp With Integrated Electronics", U.S. Appl. No. 60/224,290, filed Aug. 10, 2000, 9 pgs.

Wilson, D., et al., "High Temperature, Low Cost Window Sealing Technique for Plasma Lamps", U.S. Appl. No. 60/224,291, filed Aug. 10, 2000, 5 pgs.

Wilson, D., et al., "Light Source Consisting of an Electrode-Less Metal Halide Plasma Bulb That is Integrated Into a Wave-Guide", U.S. Appl. No. 60/224,289, filed Aug. 10, 2000, 6 pgs.

Wilson, D., et al., "Means to Reduce EMI in a Wave-Guide", U.S. Appl. No. 60/224,503, filed Aug. 10, 2000, 20 pgs.

Wilson, D., et al., "R.F. Wave-Guide Into Which an Insert of a Hermetic Material That Has Been Either Molded or Plasma Deposited", U.S. Appl. No. 60/224,257, filed Aug. 10, 2000, 5 pgs.

Wilson, D., et al., "Use of a Heat Sink in a Plasma Light Source (Located Between a Wave Guide That Incorporates the Bulb and the Drive Electronics", U.S. Appl. No. 60/224,961, filed Aug. 11, 2000, 6 pgs.

Wilson, D., et al., "Use of a Heat Sink in a Plasma Light Source (Located Externally and Surrounding the Lamp Assembly)", U.S. Appl. No. 60/224,617, filed Aug. 11, 2000, 20 pgs.

* cited by examiner

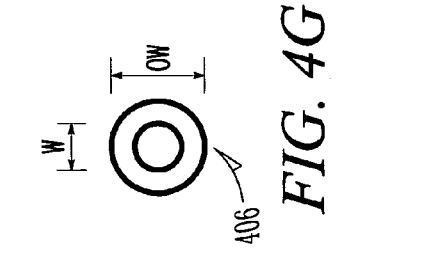
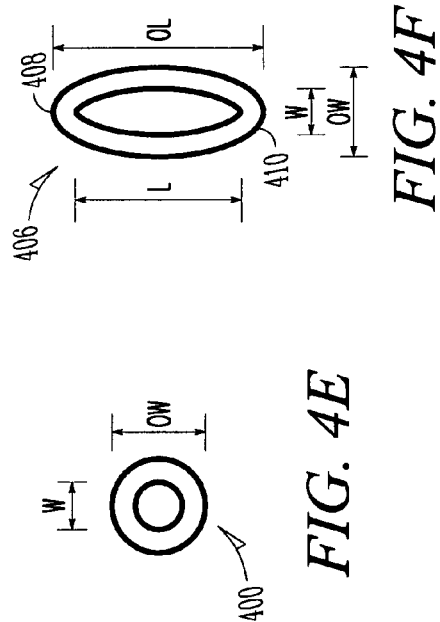
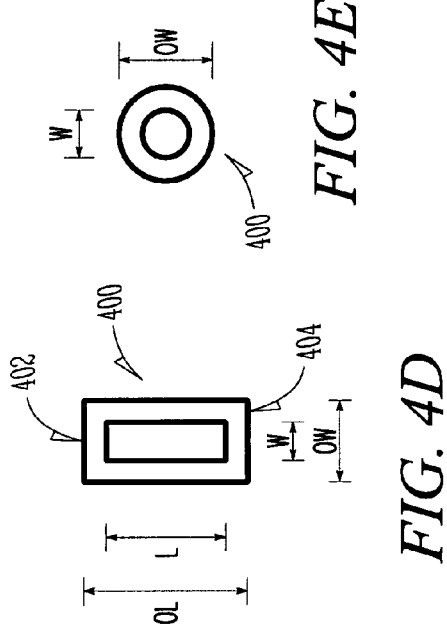
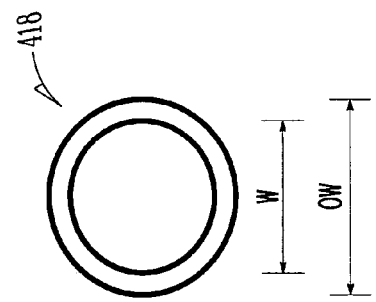
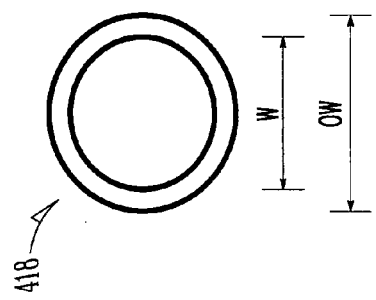
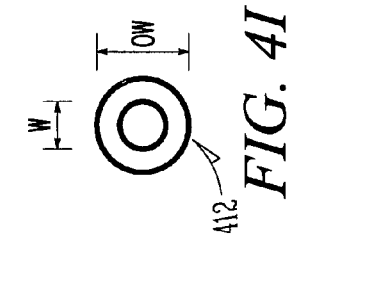
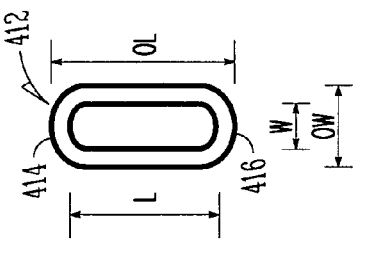

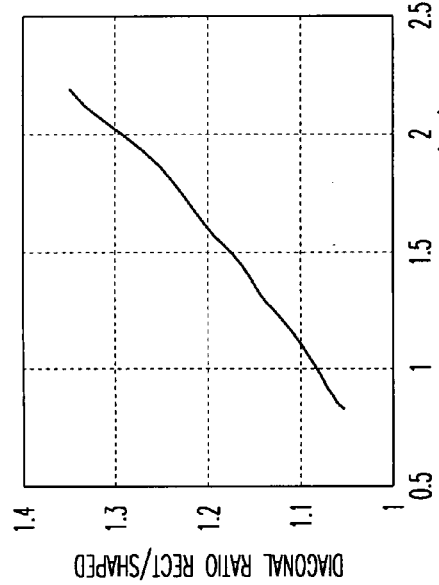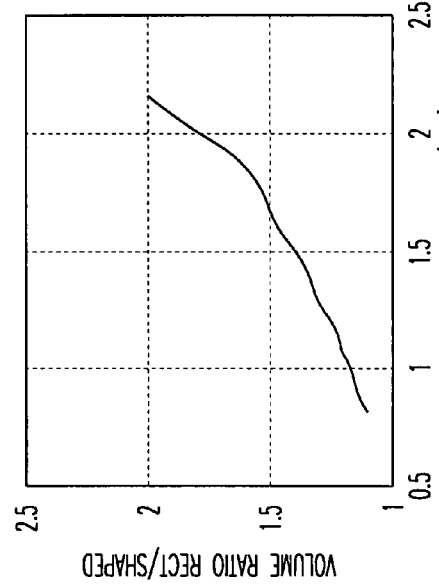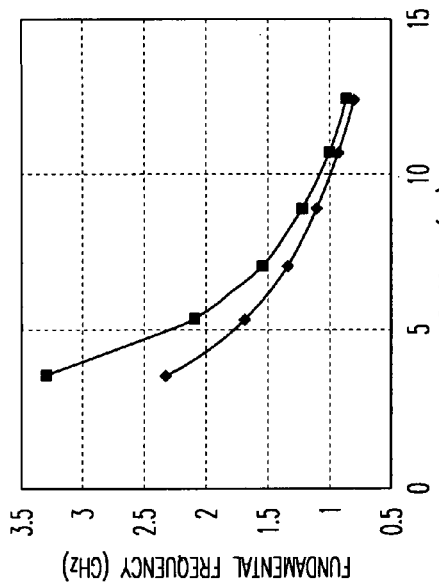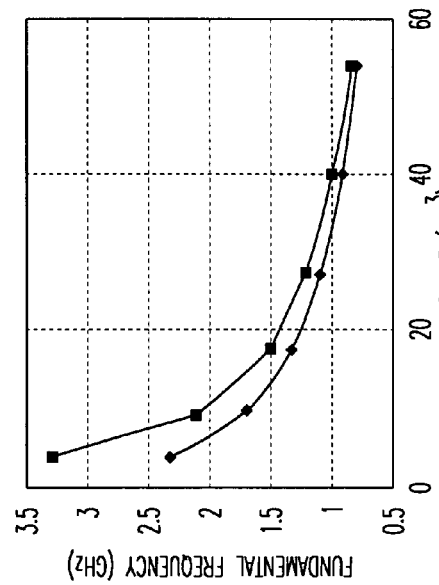
FIG. 18A
FIG. 18B
FIG. 19A
FIG. 19B

PLASMA LAMP WITH SMALL POWER COUPLING SURFACE

CROSS-REFERENCE

This application claims benefit of priority to U.S. Provisional Application Ser. No. 60/730,785 filed on Oct. 27, 2005, U.S. Provisional Application Ser. No. 60/730,654 filed on Oct. 27, 2005, U.S. Provisional Application Ser. No. 60/730,720 filed on Oct. 27, 2005, U.S. Provisional Application Ser. No. 60/730,950 filed on Oct. 27, 2005, U.S. Provisional Application Ser. No. 60/730,953 filed on Oct. 27, 2005 and U.S. Provisional Application Ser. No. 60/730,786 filed on Oct. 27, 2005, the entire contents of which are herein incorporated by reference.

BACKGROUND

I. Field

The field of the present invention relates to devices and methods for generating light, and more particularly to electrodeless plasma lamps.

II. Background

Electrodeless plasma lamps may be used to provide point-like, bright, white light sources. Because electrodes are not used, they may have longer useful lifetimes than other lamps. Some plasma lamps direct microwave energy into an air cavity, with the air cavity enclosing a bulb containing a mixture of substances that can ignite, form a plasma, and emit light. However, for many applications, light sources that are brighter, smaller, less expensive, more reliable, and have longer useful lifetimes are desired.

Plasma lamps have been proposed that use a dielectric waveguide body to reduce the size of the lamp. See, for example, U.S. Pat. No. 6,737,809 B2 and U.S. Pat. No. 6,922,021. An example lamp of this type may use a solid dielectric waveguide body in the shape of a rectangular prism or cylinder such as shown in FIGS. 1A and 1B, respectively. An amplifier circuit (AC1, AC2) may be used to provide power to the waveguide body (WB1, WB2) to excite a plasma in a bulb (PB1, PB2) positioned within a lamp chamber (LC1, LC2) in the waveguide body (WB1, WB2).

It may be desirable to reduce the operating frequency for certain applications, so as to reduce the cost of the associated lamp electronics. Because of the wide availability and relatively low cost of parts, operation in the 900 MHz band commonly used for consumer electronics is particularly desirable. Another band of interest is around 2 GHz which in recent years has been widely utilized for state-of-the-art consumer electronics.

One way of reducing frequency is to use materials with a high dielectric constant. However, many such materials suffer from both low thermal conductivity and poor resistance to heat-induced stress, making them poorly suited for a plasma lamp waveguide body. Moreover, some high dielectric constant materials suffer large changes in dielectric constant over the operational temperature range of a plasma lamp.

What is desired are improved plasma lamp configurations, and methods therefor, which can operate at the low end of the microwave frequency range without incurring the size penalty caused by lowering frequency, and which facilitate adjustment of resonant mode frequencies within a selected band. What is also desired are improved plasma lamp configurations, and methods therefor, which allow for a reduced size to be used for operation at a desired frequency. What is also desired are improved bulb and lamp configurations and methods for providing high brightness. What is also desired are improved configurations and methods for ignition, power control and thermal management.

SUMMARY

In an example embodiment, an electrodeless plasma lamp is provided which comprises a dielectric body having an effective dielectric constant greater than two. The dielectric body may have a surface with a first region coated with an electrically conductive material and a second region that is not coated with the electrically conductive material. A bulb is located proximate to the second region of the dielectric body and having an outer surface area and the second region may have an uncoated surface area that is less than about sixty percent (60%) of the outer surface area of the bulb. A power source is coupled to the dielectric body to provide radio frequency power to the dielectric body at a frequency that resonates at a fundamental mode in the dielectric body and the bulb containing a fill that forms a plasma when the radio frequency power is provided from the dielectric body through the second region.

In a further example embodiment, an electrodeless plasma lamp is provided which comprises a dielectric body having an effective dielectric constant greater than two. The dielectric body may have a surface with a first region and a second region and an electrically conductive material forming an electromagnetic boundary condition proximate to the first region, wherein the electromagnetic boundary condition formed by the electrically conductive material does not extend to the second region; the second region having a surface area that is less than about 150 mm$^2$. A bulb is provided proximate to the second region of the dielectric body and a power source is coupled to the dielectric body to provide radio frequency power to the dielectric body at a frequency that forms a standing wave in the dielectric body. The frequency may be in the range of about 50 MHz to 3 GHz. The bulb contains a fill that forms a plasma when the radio frequency power is provided from the dielectric body through the second region.

In accordance with a further example embodiment, an electrodeless plasma lamp is provided which comprises a solid dielectric body having a surface with a first region and a second region and an electrically conductive material forming an electromagnetic boundary condition proximate to the first region. The electromagnetic boundary condition formed by the electrically conductive material does not extend to the second region. A bulb is provided proximate to the second region of the dielectric body and has an outer surface area, the second region having a surface area that is less than about sixty percent (60%) of the outer surface area of the bulb. A power source is coupled to the dielectric body to provide radio frequency power to the dielectric body at a frequency that forms a standing wave in the dielectric body, wherein the frequency is in the range of about 50 MHz to 3 GHz. The bulb contains a fill that forms a plasma when the radio frequency power is provided from the dielectric body through the second region.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of example embodiments will be obtained by reference to the following detailed description and the accompanying drawings in which:

FIGS. 4D, 4E, 4F, 4G, 4H, 4I, 4J and 4K show example bulb configurations that may be used in connection with example embodiments.

FIG. 18A compares, as a function of body diagonal, the fundamental mode frequency of the FIG. 6 waveguide body with that of a rectangular prism FIG. 1A waveguide body, when both are designed for operation at 2 GHz.

FIG. 18B plots the FIG. 18A data as the ratio of the FIG. 1A body diagonal to the FIG. 6 body diagonal, as a function of fundamental mode frequency.

FIG. 19A compares, as a function of body volume, the fundamental mode frequency of the FIG. 6 waveguide body with that of a rectangular FIG. 1A waveguide body, when both are designed for operation at 2 GHz.

FIG. 19B plots the FIG. 19A data as the ratio of the FIG. 1A body volume to the FIG. 6 body volume, as a function of fundamental mode frequency.

DETAILED DESCRIPTION

Figure 1A:
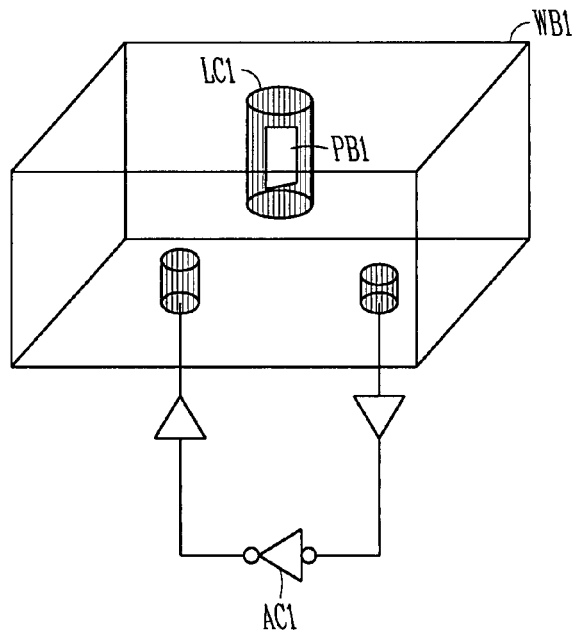
FIG. 1A schematically depicts a plasma lamp according to the prior art, including a rectangular prism-shaped waveguide body of dielectric material.

While the present invention is open to various modifications and alternative constructions, the example embodiments shown in the drawings will be described herein in detail. It is to be understood, however, there is no intention to limit the invention to the particular forms disclosed. On the contrary, it is intended that the invention cover all modifications, equivalences and alternative constructions falling within the spirit and scope of the invention as expressed in the appended claims.

Figure 2:
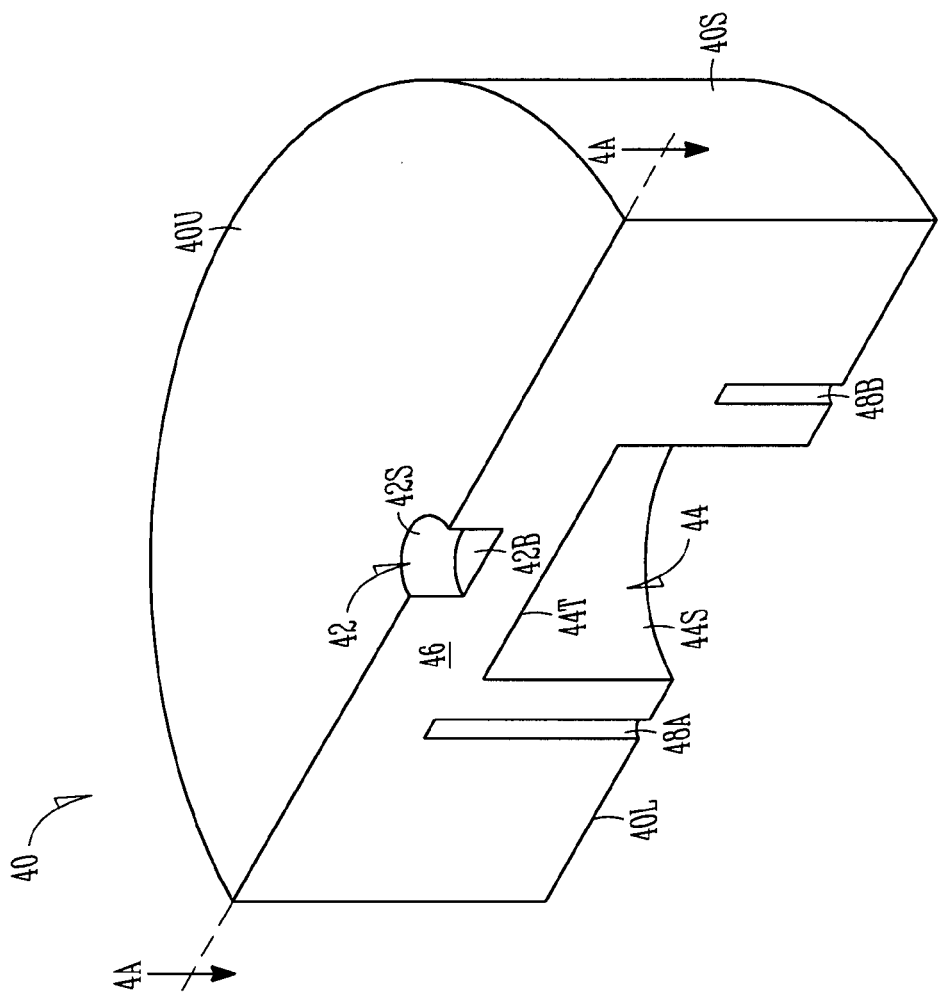
FIG. 2 is a perspective sectional view of a cylindrical dielectric waveguide body according to a first example embodiment of the invention, including an opening separated from a bottom recess by a layer of dielectric material.
Figure 4A:
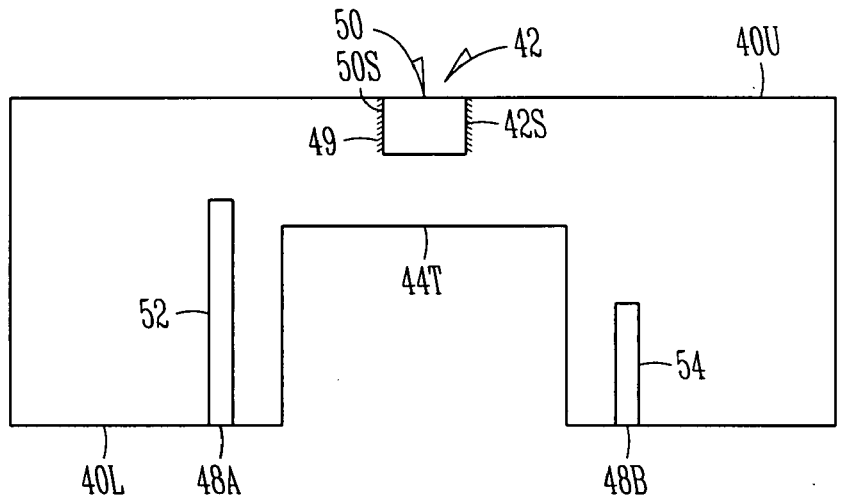
FIG. 4A is a cross-sectional view of the FIG. 2 waveguide body with a bulb in the opening, taken along line 4A-4A of FIG. 2.

FIG. 2 is a perspective sectional view of a cylindrical waveguide body 40 according to a first example. Body 40 includes dielectric material having a dielectric constant greater than about 2. For example, alumina, a ceramic having a dielectric constant of about 9, may be used. In some example embodiments, the dielectric material may have a dielectric constant in the range of from 2 to 10 or any range subsumed therein, or a dielectric constant in the range from 2 to 20 or any range subsumed therein, or a dielectric constant in the range from 2 to 100 or any range subsumed therein, or an even higher dielectric constant. In some example embodiments, the body 40 may include more than one such dielectric material resulting in an effective dielectric constant for the body 40 within any of the ranges described above. Body 40 has a cylindrical outer surface 40S, a planar upper surface 40U from which depends downwardly an opening 42 for receiving a bulb, determined by a circumferential surface 42S and a planar bottom surface 42B, and a planar lower surface 40L from which depends upwardly a recess 44 determined by a circumferential surface 44S and a planar top surface 44T. A layer 46 of dielectric material separates chamber bottom surface 42B from recess top surface 44T. Surfaces 42S and 44S are cylindrical; however, other symmetric shapes, such as square or rectangular prisms, and asymmetric shapes may be used. The axis of symmetry of body 40 coincides with that of opening 42 and recess 44; however, body configurations with offset axes also are feasible. Surfaces 40S, 40U and 40L may be coated with an electrically conductive coating, as may surfaces 42S and 42B of opening 42 and surfaces 44S and 44T of recess 44. In example embodiments, the coating may be metallic electroplating. In other example embodiments, the coating may be silver paint or other metallic paint. The paint may be brushed or sprayed onto the waveguide body 40 and may be fired or cured at high temperature. First and second openings 48A, 48B extend from surface 40L into body 40, on opposite sides of recess 44. As shown in FIG. 4A, a cross-sectional view of body 40 taken along line 4A-4A of FIG. 2, a plasma bulb 50, positioned within opening 42. The plasma bulb 50 may have an outer surface 50S whose contour matches that of surface 42S and be separated from surface 42S by a layer 49 of heat-sintered alumina powder or adhesive. Layer 49 may be used to optimize thermal conductivity between the bulb surface 50S and the waveguide body 40. Alternatively, surfaces 42S and 50S are separated by an airgap. First and second probes 52, 54 are positioned, respectively, within openings 48A, 48B. In some example embodiments having a body such as body 40, at least one additional probe may be positioned in the body 40.

Figure 3:
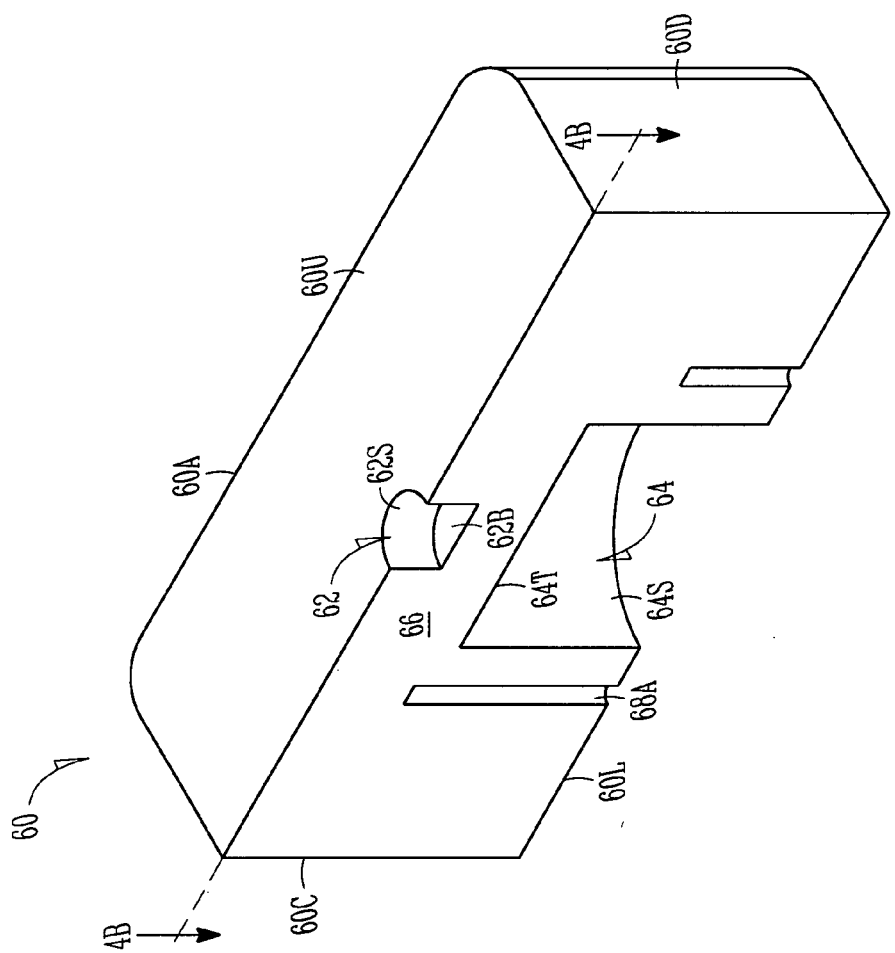
FIG. 3 is a perspective sectional view of a rectangular prism-shaped dielectric waveguide body according to a second example embodiment, including an opening separated from a bottom recess by a layer of dielectric material.
Figure 4B:
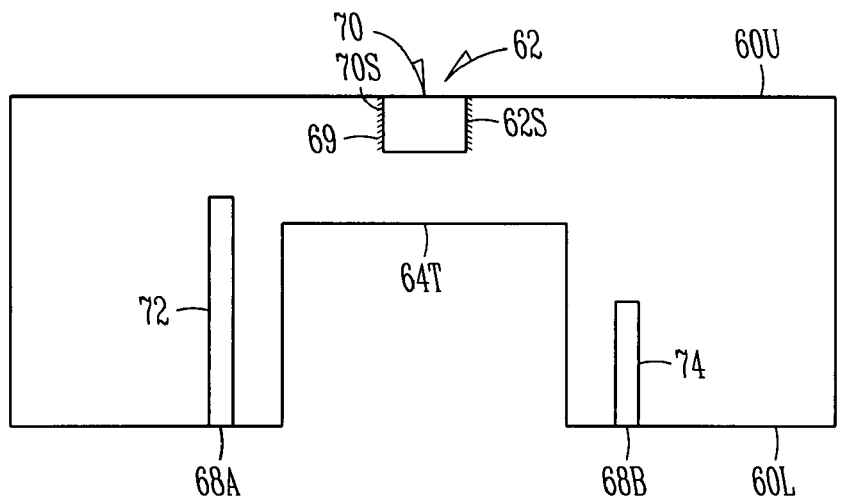
FIG. 4B is a cross-sectional view of the FIG. 3 waveguide body with a bulb in the opening, taken along line 4B-4B of FIG. 3.

FIG. 3 is a perspective sectional view of a rectangular prism-shaped waveguide body 60 according to a second example embodiment. Body 60 includes dielectric material having a dielectric constant greater than about 2, for example, alumina. In some example embodiments, the dielectric material may have a dielectric constant in the range of from 2 to 10 or any range subsumed therein, or a dielectric constant in the range from 2 to 20 or any range subsumed therein, or a dielectric constant in the range from 2 to 100 or any range subsumed therein, or an even higher dielectric constant. In some example embodiments, the body 60 may include more than one such dielectric material resulting in an effective dielectric constant for the body within any of the ranges described above. Body 60 has opposed planar first and second outer surfaces 60A, 60B (not shown), respectively, orthogonal to opposed planar third and fourth outer surfaces 60C, 60D. Body 60 further has a planar upper surface 60U from which depends downwardly an opening 62 for receiving a bulb, determined by a circumferential surface 62S and a planar bottom surface 62B, and a planar lower surface 60L from which depends upwardly a recess 64 determined by a circumferential surface 64S and a planar top surface 64T. A layer 66 of dielectric material separates chamber bottom surface 62B from recess top surface 64T. Surfaces 62S and 64S are cylindrical; however, other symmetric shapes, such as square or rectangular prisms, and asymmetric shapes may be used. The axis of symmetry of body 60 coincides with that of opening 62 and recess 64; however, body configurations with offset axes also are feasible. Surfaces 60A, 60B, 60C, 60D and/or 60U and 60L may be coated with an electrically conductive coating, such as silver paint or other metallic coating as described above, as may surfaces 62S and 62B of opening 62 and surfaces 64S and 64T of recess 64. As shown in FIG. 4B, a cross-sectional view of body 60 taken along line 4B-4B of FIG. 3, a plasma bulb 70, may be positioned within opening 62. The plasma bulb 70 may have an outer surface 70S whose contour matches that of surface 62S and be separated from the surface 62S by a layer 69 of heat-sintered alumina powder or adhesive. The layer 69 may be used to optimize thermal conductivity between the bulb surface 70S and the waveguide body 60. Alternatively, surfaces 62S and 70S are may be separated by an air-gap. First and second probes 72, 74 are may be positioned, respectively, within openings 68A, 68B extending from surface 60L into body 60, on opposite sides of recess 64. In some example embodiments having a body such as body 60, at least one additional probe may be positioned in the body 60.

Figure 4C:
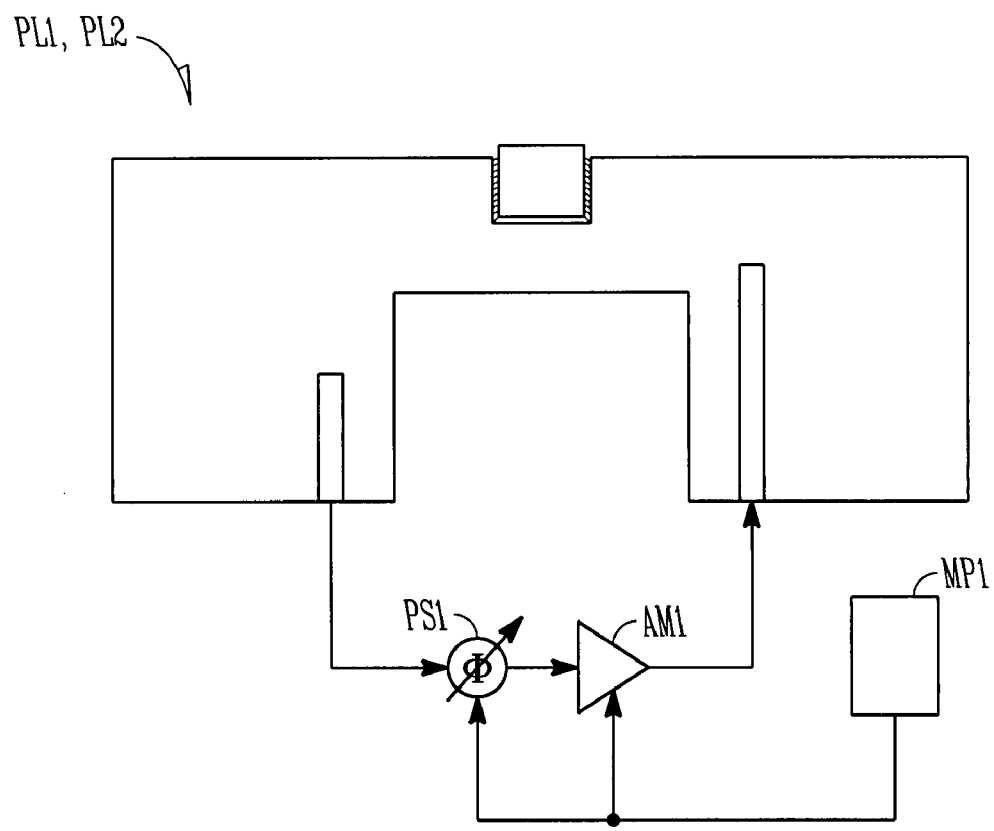
FIG. 4C schematically depicts a plasma lamp according to the first or second example embodiment wherein the dielectric waveguide body is connected to an amplifier, and an external microprocessor controls the amplifier and a phase-shifter.

As depicted schematically in FIG. 4C, a plasma lamp PL1, PL2 according to the first or second example embodiment, respectively, includes an amplifier AM1 whose output is connected to the first (drive) probe and whose input is connected to the second (feedback) probe through an active phase-shifter PS1 which modifies the phase of the signal from the second probe. An example implementation utilizes a PS214-315 voltage-controlled phase-shifter available commercially from Skyworks Solutions Inc. of Woburn, Mass. The amplifier AM1 and phase-shifter PS1 may be controlled by a microprocessor MP1 or other controller which coordinates the lamp startup and shutdown sequences and optimizes the loop phase during startup. In example embodiments, the amplifier AM1 may generate power at a frequency in the range of about 50 MHz (0.05 GHz) to about 30 GHz.

FIGS. 4D, 4E, 4F, 4G, 4H, 4I, 4J and 4K show example bulb configurations that may be used in connection with example embodiments. FIG. 4D shows a side cross section of a cylindrical bulb 400 having planar top 402 and bottom 404 surfaces. FIG. 4E shows a top view of a cross section through the middle of bulb 400. In this example, the cross section is circular, although rectangular or irregular shaped cross sections may be used in some example embodiments (e.g., hourglass shaped bulbs). FIG. 4F shows a side cross section of an oval bulb 406 having curved top 408 and bottom 410 surfaces. FIG. 4G shows a top view of a circular cross section through the middle of bulb 406. FIG. 4H shows a side cross section of a cylindrical bulb 412 having hemisphere shaped top 414 and bottom 416 surfaces. FIG. 4I shows a top view of a circular cross section through the middle of bulb 412. FIG. 4J shows a side cross section of a spherical bulb 418. FIG. 4K shows a top view of a cross section through the middle of spherical bulb 418. These shapes are examples only and other shapes may be used as well such as parabolically contoured bulbs or irregularly shaped bulbs (e.g., hourglass shaped bulbs).

Each of the above example bulbs has a length L between the inside walls of the bulb and an outer length OL. Each of the bulbs also has a width W between the inside walls of the bulb and an outer width OW. In bulbs with circular cross sections, the width W is equal to the inner diameter of the bulb and the outer width OW is equal to the outer diameter of the bulb. In a spherical bulb as show in FIGS. 4J and 4K, the length and width are both equal to the diameter. For irregular shaped bulbs, the inner width may be determined by using the largest interior width in the region where power is predominantly coupled into the bulb and the inner length may be determined using the greatest length between distal ends of the bulb.

In example embodiments, the bulb may be in any of the above shapes or other shapes and have, for example, an outer width OW in a range between 2 and 30 mm or any range subsumed therein, an inner width W in a range between 1 and 25 mm or any range subsumed therein, a wall thickness in a range between 0.5 and 4 mm or any range subsumed therein, an inner length L between 4 and 20 mm or any range subsumed therein. In example embodiments, the bulb volume may be between 10.47 mm$^3$ and 750 mm$^3$ or any range subsumed therein. The above dimensions are examples only and bulbs with other dimensions may also be used in example embodiments. In a particular example, the bulb may have a shape as shown in FIGS. 4H and 4I with an inner width of 3 mm, an inner length of 9 mm and a volume of about 56.52 mm$^3$. This example bulb may have an outer height of 14 mm, an outer width of 6 mm and have the inner volume that is closer to the top by 1 mm than the bottom (e.g., the thickness of the wall at the lower hemisphere is about 3 mm thick and the thickness of the wall at the top is about 2 mm thick). In another example, the bulb may have a shape as shown in FIGS. 4H and 4I with an inner width of 2 mm, an inner length of 4 mm and a volume of about 10.47 mm$^3$.

Example bulbs in any of the above configurations may comprise an envelope of transmissive material such as quartz, sapphire or other solid dielectric. Example bulbs may also be formed by a combination of materials forming an envelope. For example, a reflective body of ceramic may have an opening covered by a transmissive window of quartz, sapphire or transmissive material. Some bulbs may also be formed in part by surfaces of the waveguide body and/or other surfaces of a lamp body. For example, a lamp chamber may be formed in the waveguide body and covered by a transmissive window of quartz, sapphire or transmissive material.

Figure 5:
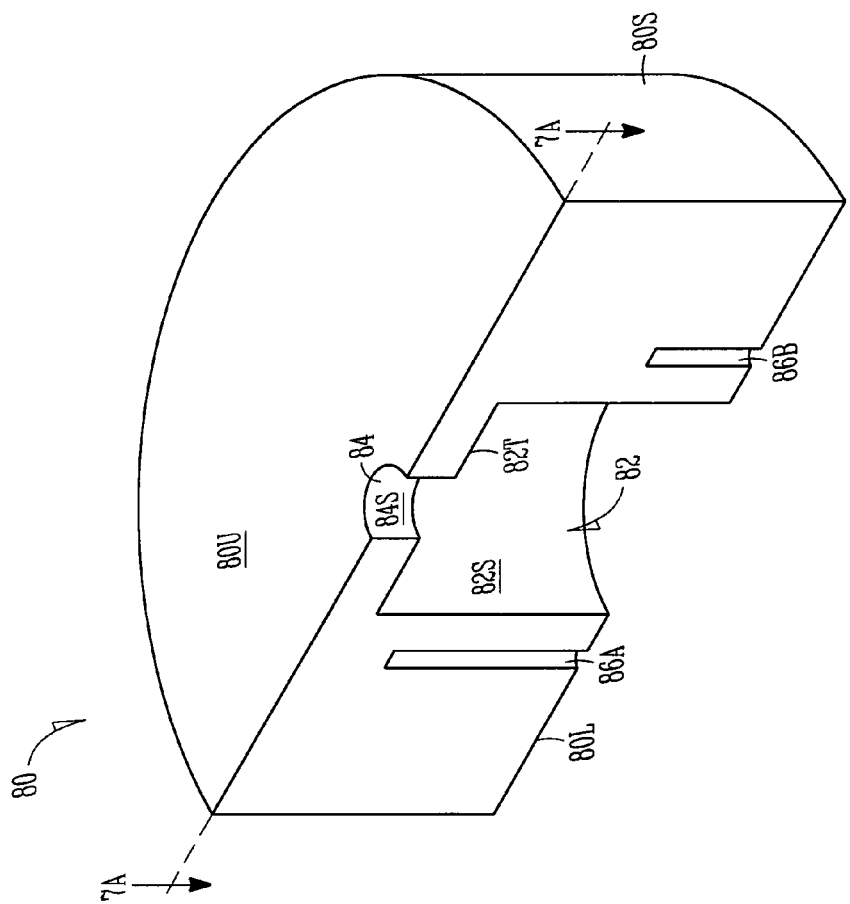
FIG. 5 is a perspective sectional view of a cylindrical dielectric waveguide body according to a third example embodiment, including a cylindrical opening in communication with a bottom recess.
Figure 7A:
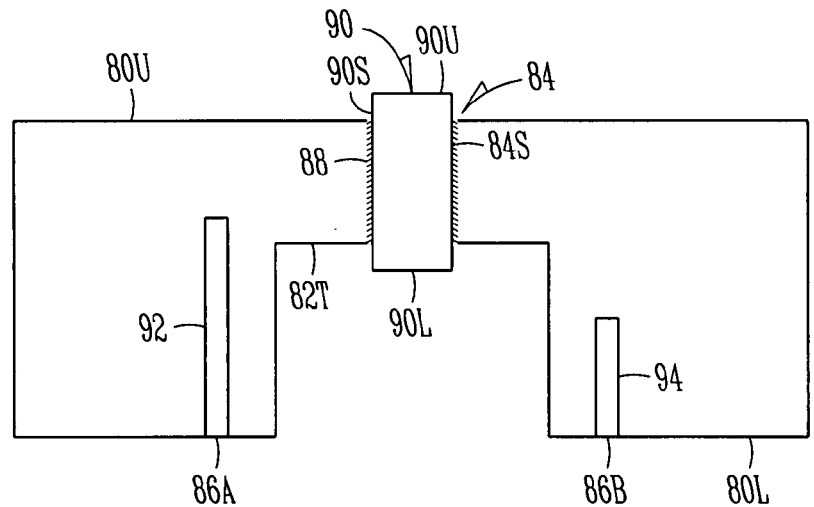
FIG. 7A is a cross-sectional view of the FIG. 5 waveguide body with a bulb in the opening, taken along line 7A-7A of FIG. 5.

FIG. 5 is a perspective sectional view of a cylindrical waveguide body 80 according to a third example embodiment. Body 80 includes dielectric material having a dielectric constant greater than about 2, for example, alumina. In some embodiments, the dielectric material may have a dielectric constant in the range of from 2 to 10 or any range subsumed therein, or a dielectric constant in the range from 2 to 20 or any range subsumed therein, or a dielectric constant in the range from 2 to 100 or any range subsumed therein, or an even higher dielectric constant. In some example embodiments, the body 80 may include more than one such dielectric material resulting in an effective dielectric constant for the body 80 within any of the ranges described above. Body 80 has a cylindrical outer surface 80S, a planar upper surface 80U, and a planar lower surface 80L from which depends upwardly a recess 82 determined by a circumferential surface 82S and a planar top surface 82T. An opening 84, determined by a circumferential surface 84S and effectively forming a lamp chamber, extends between surfaces 80U and 82T so that the opening 84 is in communication with recess 82. Surfaces 82S and 84S are cylindrical; however, other symmetric shapes, such as square or rectangular prisms, and asymmetric shapes may be used. The axis of symmetry of body 80 coincides with that of recess 82 and opening 84; however, body configurations with offset axes also are feasible. Surfaces 80S, 80U and 80L may be coated with an electrically conductive coating, such as silver paint or other metallic coating as described above, as may surface 84S of opening 84 and surfaces 82S and 82T of recess 82. First and second openings 86A, 86B extend from surface 80L into body 80, on opposite sides of recess 82. As shown in FIG. 7A, a cross-sectional view of body 80 taken along line 7A-7A of FIG. 5, a plasma bulb 90 (see FIG. 7A) may be closely received within opening 84. The plasma bulb 90 may have an outer surface 90S whose contour matches that of surface 84S and is separated from surface 84S by a layer 88 of heat-sintered alumina powder or adhesive. Layer 88 may be used to optimize thermal conductivity between the bulb surface 90S and the waveguide body 80. Alternatively, surfaces 84S and 90S may be separated by an air-gap. Bulb 90 has upper and lower ends 90U, 90L, respectively, which extend, respectively, above body upper surface 80U and below recess top surface 82T, into recess 82. Thus, in this example embodiment the bulb 90 ends are not enclosed by body 80 and are exposed to the external environment, permitting efficient radiation of thermal energy from the plasma whose peak temperature can range from 3000° to 10,000° C.

Figure 12A:
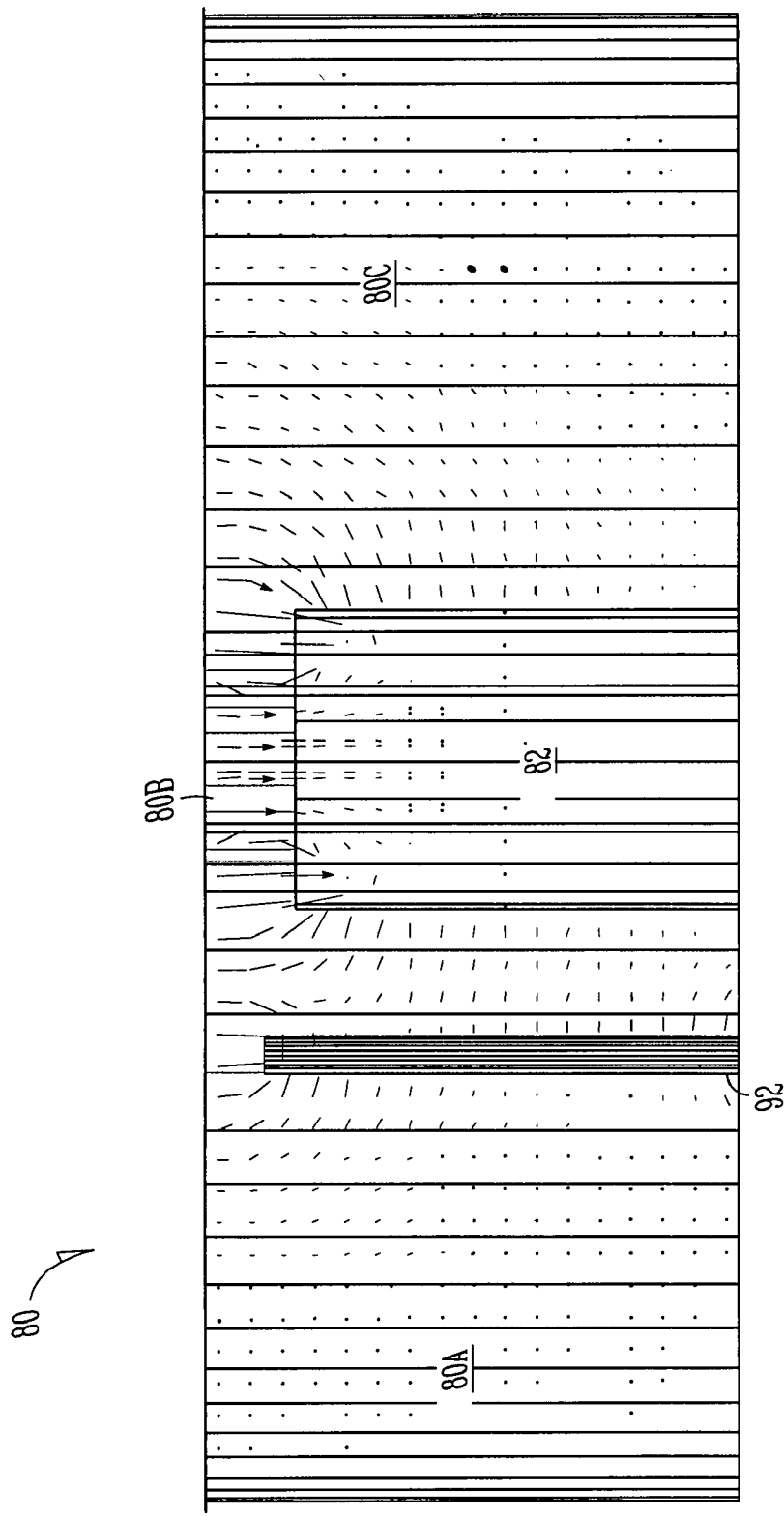
FIG. 12A shows the FEM-simulated electric field intensity in the FIG. 5 waveguide body designed for operation at 900 MHz and resonating at the body's fundamental mode frequency.
Figure 12B:
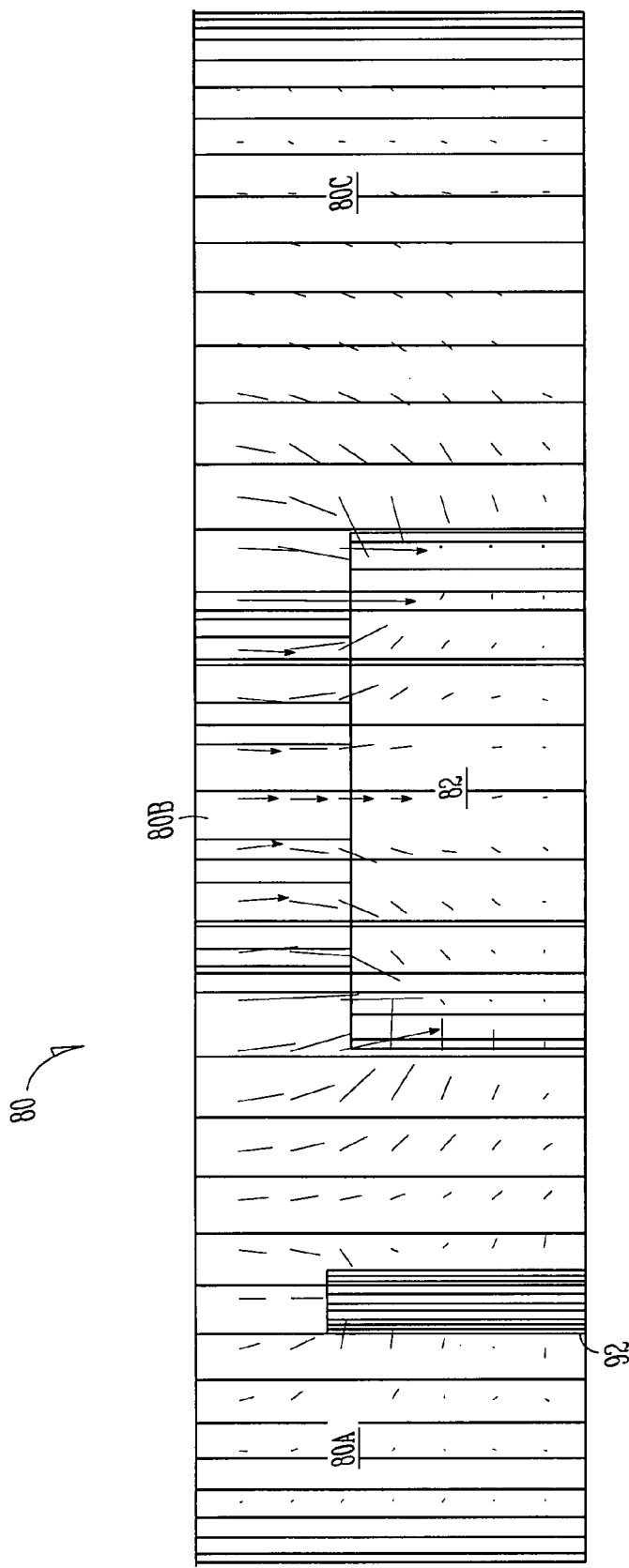
FIG. 12B shows the FEM-simulated electric field intensity in the FIG. 5 waveguide body designed for operation at 2.15 GHz and resonating at the body's fundamental mode frequency.

As can be inferred from the example electric field intensity distributions shown in FIGS. 12A and 12B, the bulb ends 90U, 90L would be exposed only to regions of reduced electric field intensity, resulting in longer bulb lifetime due to reduced plasma impingement on them. In other example embodiments the bulb 90 may be positioned completely within the opening 84. First and second probes 92, 94 may be positioned, respectively, within openings 86A, 86B. In some example embodiments having a body such as body 80, at least one additional probe may be positioned in the body.

Figure 6:
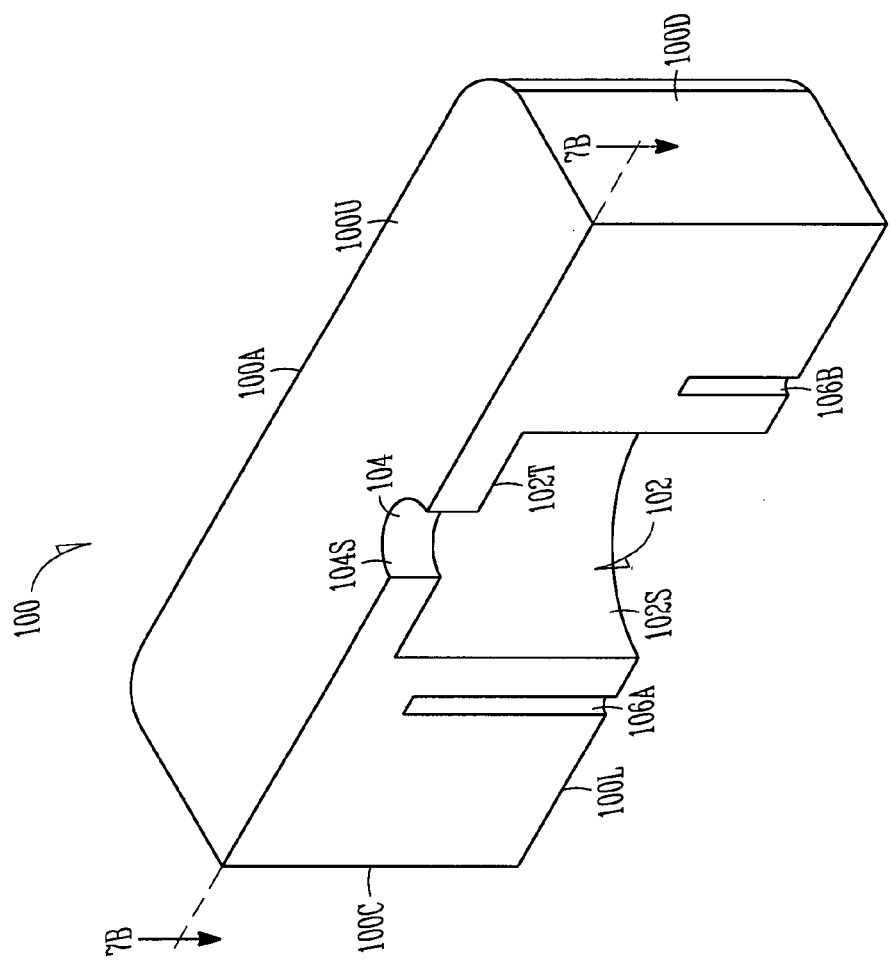
FIG. 6 is a perspective sectional view of a rectangular prism-shaped dielectric waveguide body according to a fourth example embodiment, including a cylindrical opening in communication with a bottom recess.
Figure 7B:
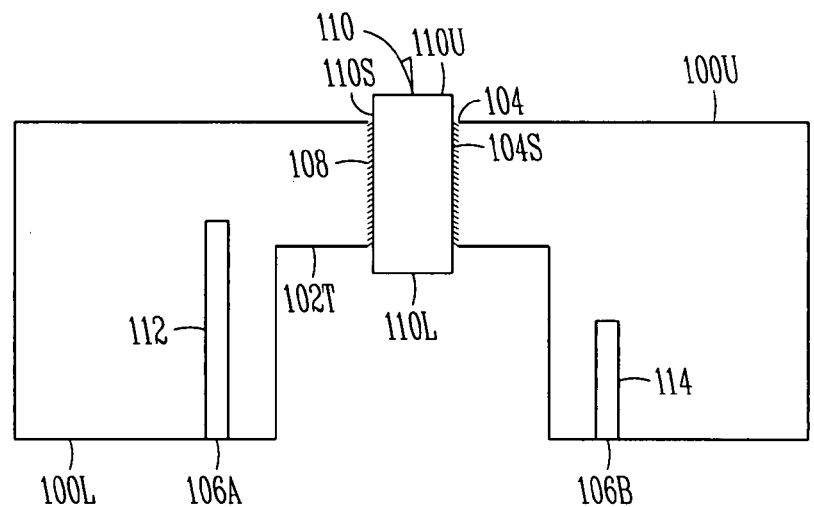
FIG. 7B is a cross-sectional view of the FIG. 6 waveguide body with a bulb in the opening, taken along line 7B-7B of FIG. 6.

FIG. 6 is a perspective sectional view of a rectangular prism-shaped waveguide body 100 according to a fourth example embodiment. Body 100 includes dielectric material having a dielectric constant greater than about 2, for example, alumina. In some embodiments, the dielectric material may have a dielectric constant in the range of from 2 to 10 or any range subsumed therein, or a dielectric constant in the range from 2 to 20 or any range subsumed therein, or a dielectric constant in the range from 2 to 100 or any range subsumed therein, or an even higher dielectric constant. In some example embodiments, the body 100 may include more than one such dielectric material resulting in an effective dielectric constant for the body 100 within any of the ranges described above. Body 100 has opposed planar first and second outer surfaces 100A, 100B (not shown), respectively, orthogonal to opposed, planar third and fourth outer surfaces 100C, 100D. Body 100 further has a planar upper surface 100U, and a planar lower surface 100L from which depends upwardly a recess 102 determined by a circumferential surface 102S and a planar top surface 102T. An opening 104, determined by a circumferential surface 104S and effectively forming a lamp chamber, extends between surfaces 100U and 102T so that the opening 104 is in communication with recess 102. Surfaces 102S and 104S are cylindrical; however, other symmetric shapes, such as square or rectangular prisms, and asymmetric shapes may be used. The axis of symmetry of body 100 coincides with that of recess 102 and opening 104, but body configurations with offset axes also are feasible. Surfaces 100A, 100B, 100C, 100D and/or 100U and 100L may be coated with an electrically conductive coating, such as silver paint or other metallic coating as described above, as may surface 104S of opening 104 and surfaces 102S and 102T of recess 102. First and second openings 106A, 106B extend from surface 100L into body 100, on opposite sides of recess 102. As shown in FIG. 7B, a cross-sectional view of body 100 taken along line 7B-7B of FIG. 6, a plasma bulb 110 may be positioned within opening 104. The plasma bulb 110 may have an outer surface 110S whose contour matches that of surface 104S is separated from surface 104S by a layer 108 of heat-sintered alumina powder or adhesive. Layer 108 may be used to optimize thermal conductivity between the bulb surface 110S and the waveguide body 100. Alternatively, surfaces 104S and 110S are may be separated by an air-gap. Bulb 110 has upper and lower ends 110U, 110L which extend, respectively, above body upper surface 100U and below recess top surface 102T. Thus, in this example embodiment the bulb ends are exposed to the external environment and to regions of reduced electric field intensity. In some example embodiments, the recess 102 may also be filled with alumina powder (which may be heat sintered) or other ceramic or solid dielectric. The material filling the recess 102 may provide a reflective surface around the lower end of the bulb 110. In these example embodiments, the material filling the recess 102 may be separated from the waveguide body 100 by the electrically conductive coating on the surface of the waveguide so the lower end of the bulb 110 is still in a region of reduced electric field intensity relative to the portion of the bulb surrounded by the waveguide body 100. In other example embodiments the bulb 110 may be positioned completely within the opening 104. First and second probes 112, 114 are positioned, respectively, within openings 106A, 106B. In some example embodiments having a body such as body 100, at least one additional probe may be positioned in the body.

Figure 7C:
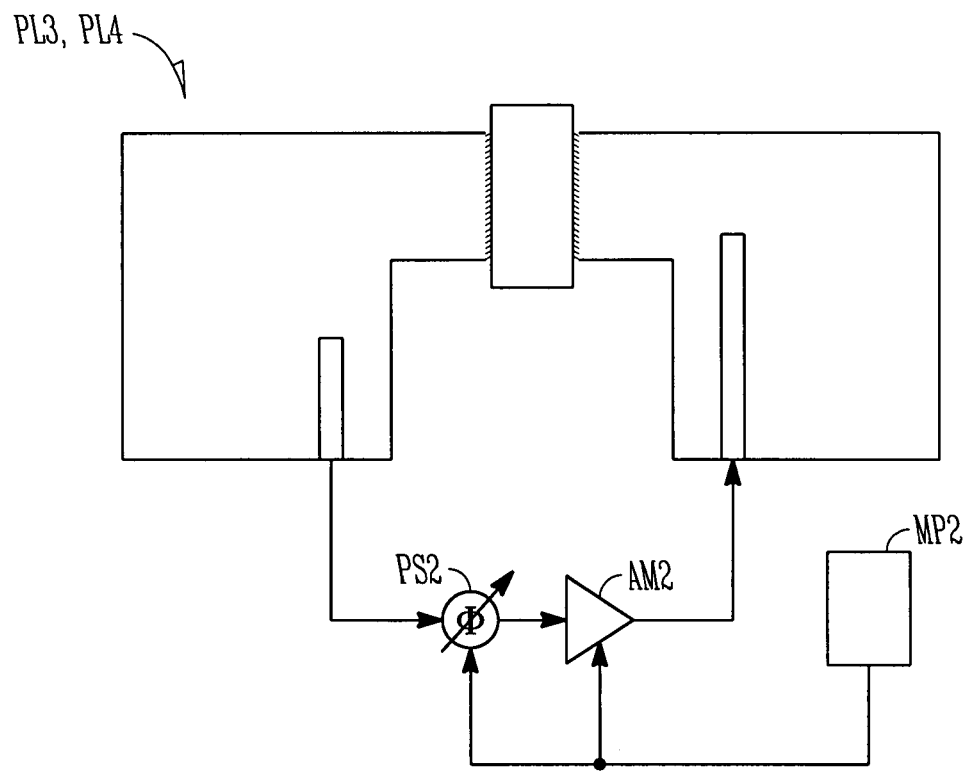
FIG. 7C schematically depicts a plasma lamp according to the third or fourth example embodiment wherein the dielectric waveguide body is connected to an amplifier, and an external microprocessor controls the amplifier and a phase-shifter.

As depicted schematically in FIG. 7C, a plasma lamp PL3, PL4 according to the third or fourth example embodiment, respectively, may include an amplifier AM2 whose output is connected to the first (drive) probe and whose input is connected to the second (feedback) probe through an active phase-shifter PS2 which modifies the phase of the signal from the second probe. The amplifier AM2 and phase-shifter PS2 may be controlled by a microprocessor MP2 or other controller which coordinates the lamp startup and shutdown sequences and optimizes the loop phase during startup. In example embodiments, the amplifier AM2 may generate power at a frequency in the range of about 50 MHz to about 30 GHz or any range subsumed therein.

Figure 8:
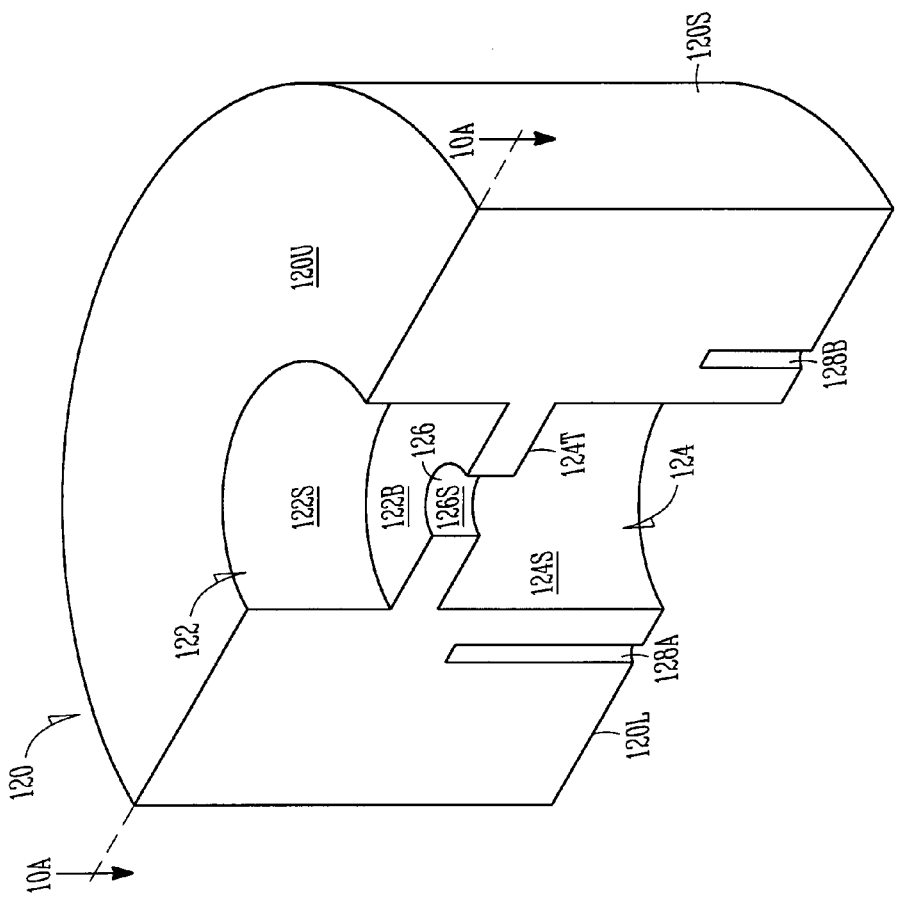
FIG. 8 is a perspective sectional view of a cylindrical dielectric waveguide body according to a fifth example embodiment, including a top recess, a bottom recess, and a cylindrical opening in communication with the top and bottom recesses.
Figure 10A:
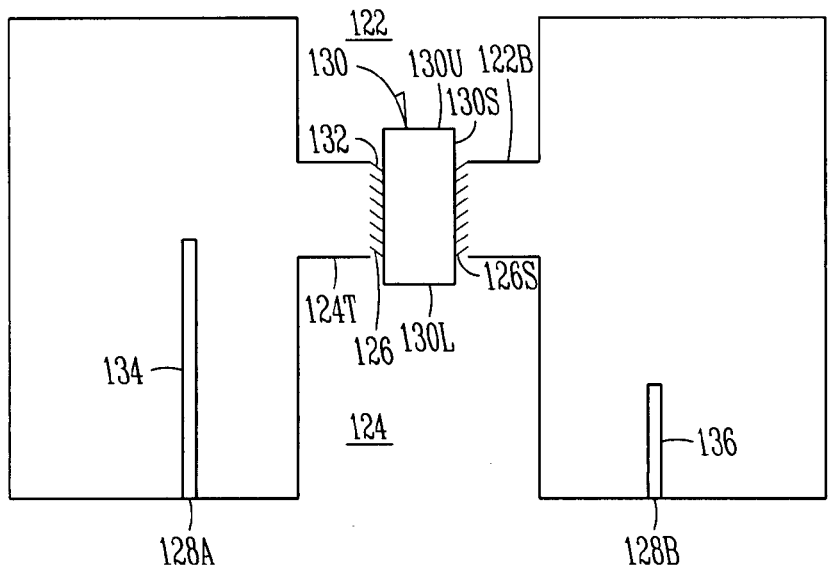
FIG. 10A is a cross-sectional view of the FIG. 8 waveguide body with a bulb in the opening, taken along line 10A-10A of FIG. 8.

FIG. 8 is a perspective sectional view of a cylindrical waveguide body 120 according to a fifth example embodiment. Body 120 includes dielectric material having a dielectric constant greater than about 2, for example, alumina. In some example embodiments, the dielectric material may have a dielectric constant in the range of from 2 to 10 or any range subsumed therein, or a dielectric constant in the range from 2 to 20 or any range subsumed therein, or a dielectric constant in the range from 2 to 100 or any range subsumed therein, or an even higher dielectric constant. In some example embodiments, the body 120 may include more than one such dielectric material resulting in an effective dielectric constant for the body 120 within any of the ranges described above. Body 120 has a cylindrical outer surface 120S, and a planar upper surface 120U from which depends downwardly an upper recess 122 determined by a circumferential surface 122S and a planar bottom surface 122B. Body 120 further has a planar lower surface 120L from which depends upwardly a lower recess 124 determined by a circumferential surface 124S and a planar top surface 124T. An opening 126, determined by a circumferential surface 126S and effectively forming a lamp chamber, extends between surfaces 122B and 124T so that the opening 126 is in communication with recesses 122 and 124. Surfaces 122S, 124S and 126S are cylindrical; however, other symmetric shapes such as square or rectangular prisms, and asymmetric shapes may be used. The axis of symmetry of body 120 coincides with that of upper recess 122, opening 126 and lower recess 124; however, body configurations with offset axes also are feasible. Surfaces 120S, 120U and 120L may be coated with an electrically conductive coating, such as silver paint or other metallic coating as described above, as may surfaces 122S and 122B of upper recess 122, surface 126S of opening 126, and surfaces 124S and 124T of lower recess 124. First and second openings 128A, 128B extend from surface 120L into body 120, on opposite sides of lower recess 124. As shown in FIG. 10A, a cross-sectional view of body 120 taken along line 10A-10A of FIG. 8, a plasma bulb 130 may be closely received within the opening 126. The plasma bulb 130 is shown to have an outer surface 130S whose contour matches that of surface 126S and is separated from surface 126S by a layer 132 of heat-sintered alumina powder or adhesive. Layer 132 may be used to optimize thermal conductivity between the bulb surface 130S and the waveguide body 120. Alternatively, surfaces 126S and 130S are may be separated by an air-gap. Bulb 130 has upper and lower ends 130U, 130L, respectively, which extend, respectively, above bottom surface 122B of upper recess 122 and below top surface 124T of lower recess 124. Because the bulb ends 130U, 130L protrude, respectively, into upper and lower recesses 122, 124, they are not exposed to the highest temperatures generated by the plasma. As evident from FIG. 10A, because the waveguide body 120 is not proximate to the bulb ends 130U, 130L, they are exposed only to regions of reduced field intensity. In some example embodiments, the lower recess 124 may also be filled with alumina powder (which may be heat sintered) or other ceramic or solid dielectric. The material filling the lower recess 124 may provide a reflective surface around the lower end of the bulb 130. In these example embodiments, the material filling the lower recess 124 may be separated from the waveguide body 120 by the electrically conductive coating on the surface of the waveguide so the lower end 130L of the bulb 130 is still in a region of reduced electric field intensity relative to the portion of the bulb 130 surrounded by the waveguide body 120. In other example embodiments the bulb ends 130U, 130L do not protrude from the opening 126. As shown in FIG. 10A, first and second probes 134, 136 are positioned, respectively, within the openings 128A, 128B. In some example embodiments having a body such as body 120, at least one additional probe may be positioned in the body 120.

Figure 9:
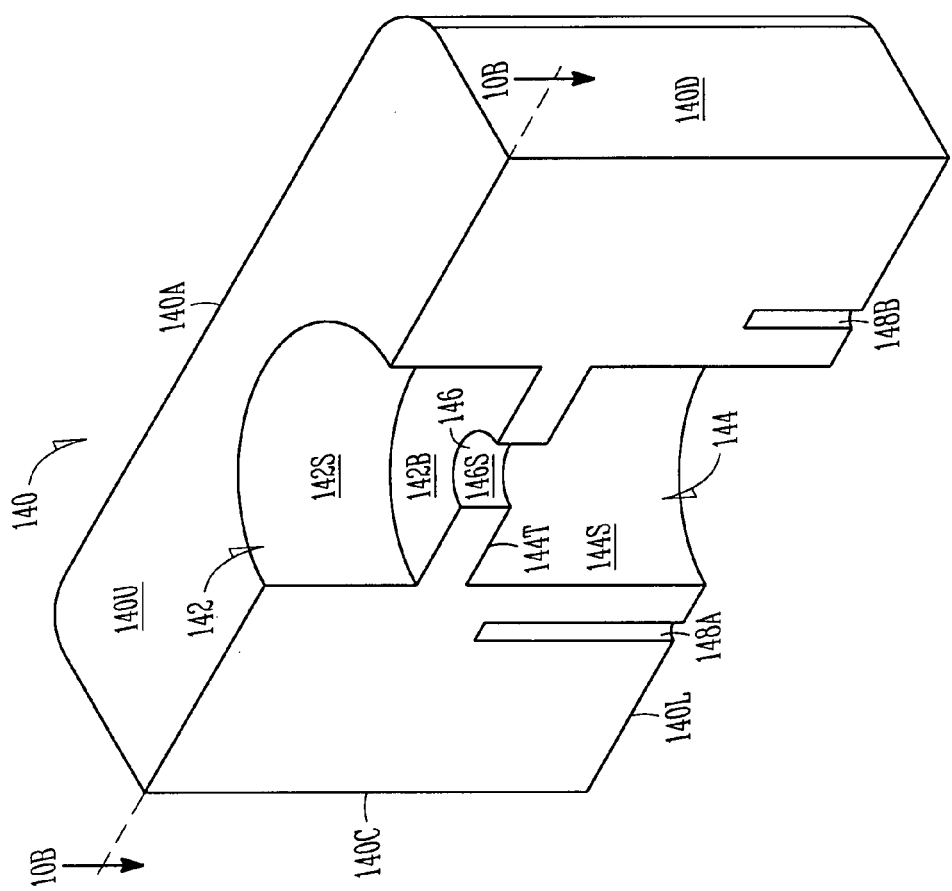
FIG. 9 is a perspective sectional view of a rectangular prism-shaped dielectric waveguide body according to a sixth example embodiment, including a top recess, a bottom recess, and a cylindrical opening in communication with the top and bottom recesses.
Figure 10B:
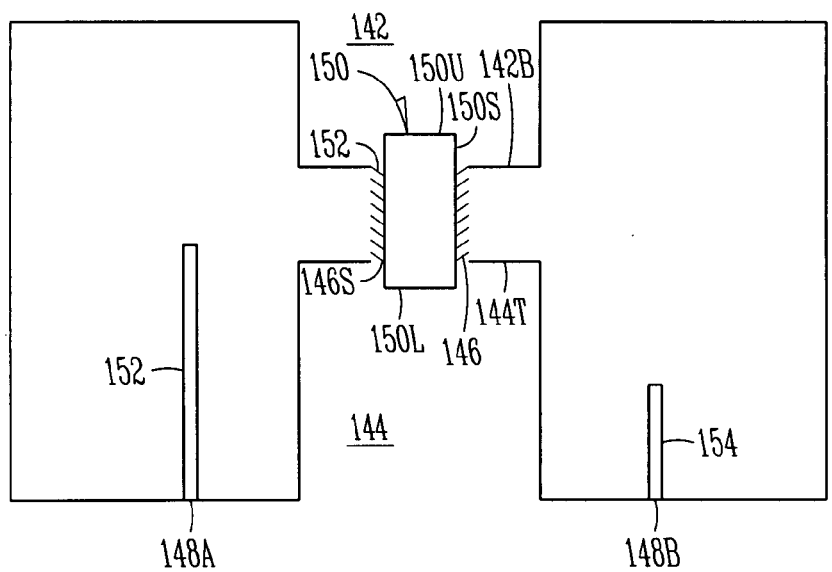
FIG. 10B is a cross-sectional view of the FIG. 9 waveguide body with a bulb in the opening, taken along line 10B-10B of FIG. 9.

FIG. 9 is a perspective sectional view of a rectangular prism-shaped waveguide body 140 according to a sixth example embodiment. Body 140 includes dielectric material having a dielectric constant greater than about 2, for example, alumina. In some example embodiments, the dielectric material may have a dielectric constant in the range of from 2 to 10 or any range subsumed therein, or a dielectric constant in the range from 2 to 20 or any range subsumed therein, or a dielectric constant in the range from 2 to 100 or any range subsumed therein, or an even higher dielectric constant. In some example embodiments, the body may include more than one such dielectric material resulting in an effective dielectric constant for the body within any of the ranges described above. Body 140 has opposed planar first and second outer surfaces 140A, 140B (not shown), respectively, orthogonal to opposed, planar third and fourth outer surfaces 140C, 140D. Body 140 has a planar upper surface 140U from which depends downwardly an upper recess 142 determined by a circumferential surface 142S and a planar bottom surface 142B. Body 140 further has a planar lower surface 140L from which depends upwardly a lower recess 144 determined by a circumferential surface 144S and a planar top surface 144T. An opening 146, determined by a circumferential surface 146S and effectively forming a lamp chamber, extends between surfaces 142B and 144T so that the opening 146 is in communication with recesses 142 and 144. Surfaces 142S, 146S and 144S are cylindrical; however, other symmetric shapes such as square or rectangular prisms, and asymmetric shapes may be used. The axis of symmetry of body 140 coincides with that of upper recess 142, opening 146 and lower recess 144, but body configurations with offset axes also are feasible. Surfaces 140A, 140B, 140C, 140D and/or 140U and 140L may be coated with an electrically conductive coating, such as silver paint or other metallic coating as described above, as may surfaces 142S and 142B of upper recess 142, surface 146S of opening 146, and surfaces 144S and 144T of lower recess 144. First and second openings 148A, 148B extend from surface 140L into body 140, on opposite sides of lower recess 144. As shown in FIG. 10B, a cross-sectional view of body 140 taken along line 10B-10B of FIG. 9, a plasma bulb 150 may be positioned within opening 146. The plasma bulb 150 may have an outer surface 150S whose contour matches that of surface 146S and is separated from the surface 146S by a layer 152 of heat-sintered alumina powder or adhesive. Layer 152 may be used to optimize thermal conductivity between the bulb surface 150S and the waveguide body 140. Alternatively, surfaces 146S and 150S may be separated by an air-gap. Bulb 150 has upper and lower ends 150U, 150L which extend, respectively, above bottom surface 142B of upper recess 142 and below top surface 144T of lower recess 144. Thus, in this example embodiment the bulb ends 150U, 150L are not exposed to the highest temperatures generated by the plasma or to regions of intensified electric field. As described above, the lower recess 144 may also be filled in some example embodiments while maintaining electrical separation from the waveguide body 140. As shown in FIG. 10B, first and second probes 152, 154 are positioned, respectively, within openings 148A, 148B. In some example embodiments having a body such as body 140, at least one additional probe may be positioned in the body 140.

Figure 10C:
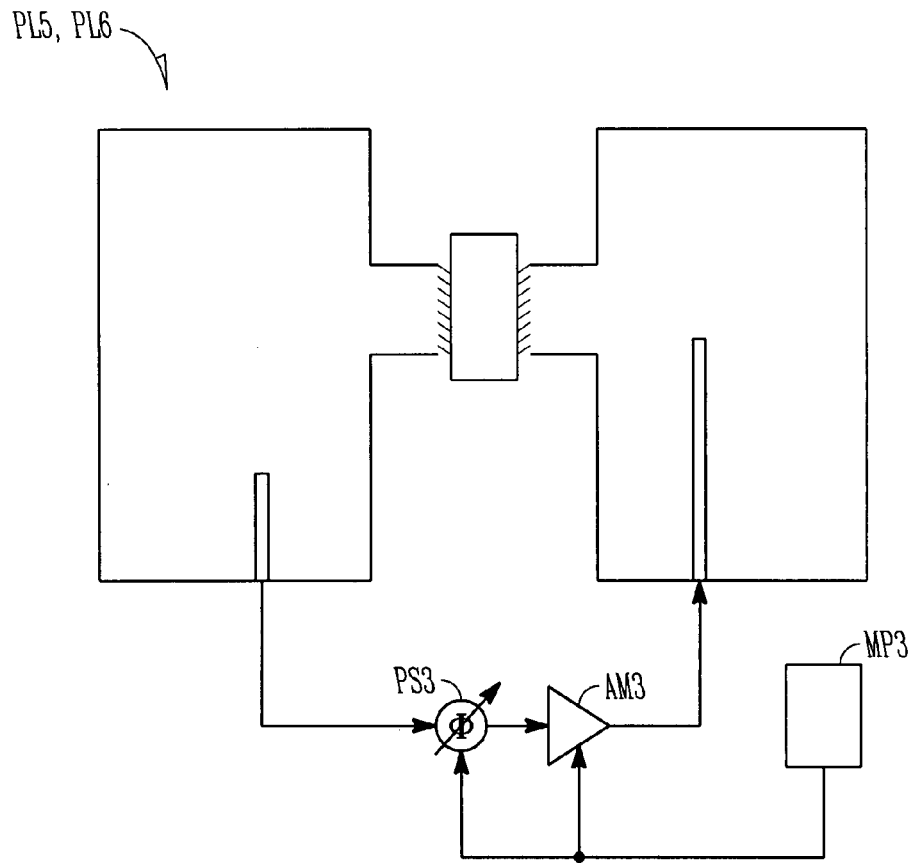
FIG. 10C schematically depicts a plasma lamp according to the fifth or sixth example embodiment wherein the dielectric waveguide body is connected to an amplifier, and an external microprocessor controls the amplifier and a phase-shifter.

As depicted schematically in FIG. 10C, a plasma lamp PL5, PL6 according to the fifth or sixth example embodiment, respectively, includes an amplifier AM3 whose output is connected to the first (drive) probe and whose input is connected to the second (feedback) probe through an active phase-shifter PS3 which modifies the phase of the signal from the second probe. The amplifier AM3 and phase-shifter PS3 may be controlled by a microprocessor MP3 or other controller which coordinates the lamp startup and shutdown sequences and optimizes the loop phase during startup. In example embodiments, the amplifier AM3 may generate power at a frequency in the range of about 50 MHz to about 30 GHz or any range subsumed therein.

In example embodiments, the bulb 130, 150 may have any of the configurations and dimensions described above in connection with FIGS. 4D-K with each bulb end protruding from the opening or at least one of the bulb ends protruding from the opening. In example embodiments, the bulb 130, 150 may extend beyond the surfaces of the waveguide body by an amount between 10 percent and 100% of the bulb inner length or any range subsumed therein. In example embodiments, the protrusions are equal in length and in a range between 1 and 10 mm or any range subsumed therein. In these examples, the length of the protrusion is the distance from the center of the bulb where it intersects the plane of the outer surface of the waveguide body to the inner surface of the distal end of the bulb that protrudes from the waveguide body. In other example embodiments, the bulb ends do not protrude from the opening or each end may protrude by a different amount or only one end of the bulb may protrude from the waveguide body. In example embodiments where the opening does not extend all the way through to the recess, the bulb may protrude just from the top surface of the waveguide body. The above dimensions are examples only and it will be appreciated that other dimensions and bulb configurations may be used in other example embodiments. In a particular example, the thickness of the waveguide adjacent to the bulb is 3 mm, the bulb has an inner length of 9 mm and extends beyond the top surface of the waveguide body by about 3.5 mm internal. The other end of the bulb extends below the bottom surface of the waveguide body (into the recess) by about 2.5 mm internal. This example bulb may have an outer height of 14 mm, an outer width of 6 mm and an inner volume that is closer to the top by 1 mm than the bottom (e.g., the thickness of the wall at the lower hemisphere may be about 3 mm thick and the thickness of the wall at the top may be about 2 mm thick). In this example, both ends of the bulb protrude by about 5.5 mm of the outer length. In another example, the thickness of the waveguide adjacent to the bulb is 2 mm, the bulb has an inner length of 4 mm and extends beyond the top and bottom surface of the waveguide body by about 1 mm on each end.

Figure 11:
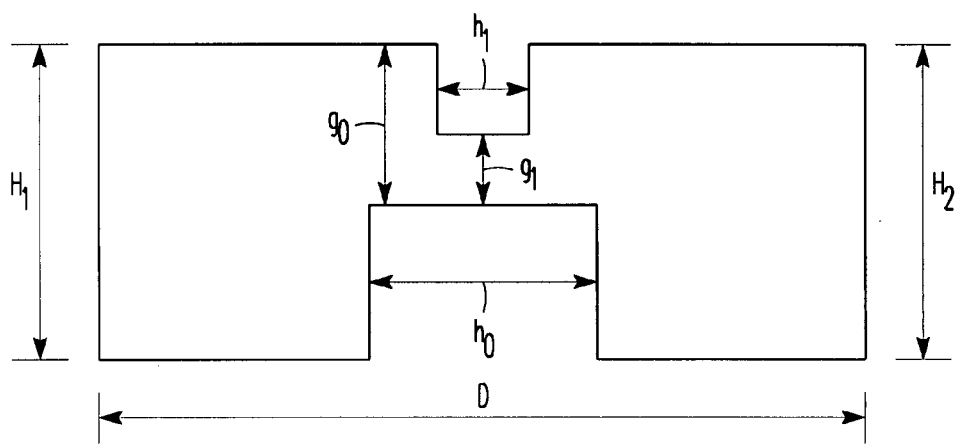
FIG. 11 shows dimensional parameters of the FIG. 4A, 4B, 7A or 7B cross-sections used in finite element model (FEM) simulations of the electric field intensity in the FIG. 2, 3, 5 or 6 waveguide body.

FIG. 11 shows dimensional parameters used in finite element model (FEM) simulations of the electric field distribution in the waveguide body 40, 60, 80, 100 of FIG. 2, 3, 5 or 6 respectively. For cylindrical waveguide body 40, $H_1$ (which is shown to be equal to $H_2$) is its height and D its diameter; $h_0$ and $h_1$ are the diameters of cylindrical recess 44 and cylindrical opening 42, respectively; $g_0$ is the thickness of dielectric material between upper surface 40U and recess top 44T; and $g_1$ is the thickness of dielectric material between chamber bottom 42B and recess top 44T. For rectangular prism-shaped body 60, $H_1$ (which is shown to be equal to $H_2$) is its height and D the length of the diagonal of its horizontal cross-section; $h_0$ and $h_1$ are the lengths of the diameters or diagonals of cylindrical or square recess 64 and cylindrical or square opening 62, respectively; $g_0$ is the thickness of dielectric material between upper surface 60U and recess top 64T; and $g_1$ is the thickness of dielectric material between chamber bottom 62B and recess top 64T. For cylindrical body 80 and rectangular prism-shaped body 100, $g_1=0$ as the openings 84, 104 extend to the recesses 82, 102. In example embodiments, the height $H_1$ may differ from the $H_2$. The thickness, $g_0$, is shown to be less than the first height, H1 and the second height, H2.

Finite element modeling simulations were performed of the electric field intensity distribution in the waveguide bodies 40, 60, 80, 100, varying the FIG. 11 dimensional parameters and using software tools such as HFSS™, available from Ansoft, Inc. of Pittsburgh, Pa., and FEMLAB™, available from COMSOL, Inc. of Burlington, Mass. FEM simulation of the electromagnetic field in a dielectric body entails first specifying: (a) the geometric dimensions, dielectric properties, and conducting surfaces of the body; (b) the probe locations and applied excitation fields; and (c) the boundary conditions at the body and free-space conditions. Mesh-size parameters controlling the simulation are then adjusted to achieve consistent results. We have found that excellent correlation between predicted and observed resonant frequencies can be obtained with an FEM model that ignores the electrical properties of the plasma and thus with the bulb region modeled as empty space. We also found that higher electric field intensities occur in bodies 80 and 100 than in bodies 40 and 60. Specifically, the intensity increases as the layer of dielectric material separating the opening from the recess decreases. FIG. 12A shows the FEM-simulated electric field intensity distribution in cylindrical waveguide body 80, resonating at the body's fundamental mode frequency, for the combination of FIG. 11 dimensional parameters found to provide the highest electric field intensity at 900 MHz: D=41.2 mm; H=17.8 mm; $h_0/D$=0.33; $h_1$=6.15 mm; $g_0$=3 mm; and $g_1/g_0$=0. The electric field intensity is rotationally symmetric about a vertical axis. The length and number density of the electric field vectors denote relative intensity. FIG. 12B shows the FEM-simulated electric field intensity distribution in waveguide body 80, resonating at the body's fundamental mode frequency, for the combination of FIG. 11 dimensional parameters found to provide the highest electric field intensity at 2.15 GHz: D=29.4 mm; H=7.62 mm; $h_0/D$=0.28; $h_1$=6.15 mm; $g_0$=3 mm; and $g_1/g_0$=0. The above dimensions are examples only. For example, in other example embodiments dimensions for these parameters in the following ranges (or any ranges subsumed therein) may be used: D (10 to 60 mm); H (3 to 30 mm); $h_0/D$ (0.10 to 0.50); $h_1$ (3 to 10 mm); $g_0$ (1 to 10 mm); and $g_1/g_0$ (0 to 3.0). Other example embodiments may use different dimensions.

As shown in FIGS. 12A and 12B, the example waveguide body 80 may have three regions, a first region 80A, a second region 80B and a third region 80C. The second region 80B above recess 82 is thinner and has a smaller volume than the first and third regions 80A and 80C. The first and third regions 80A, 80C may be contiguous and form a peripheral region surrounding the second region 80B (which may be a thin region in the middle of the waveguide body 80) as can be seen in FIGS. 5, 6, 8 and 9. In this example, the height, H, of the first and third regions 80A, 80C is greater than the thickness, $g_0$, of the second region 80B (see FIG. 11). For example, the height, H, may be more than twice the thickness, $g_0$. Drive probe 92 is shown positioned in the first region 80A. An opening 84 (see FIGS. 5 and 7A) may be formed in the second region 80B and a bulb 90 may be positioned in the opening 84. A feedback probe 94 may be positioned in region 80C (see FIGS. 5 and 7A) on the opposite side from the drive probe 92. Opening 84, bulb 90 and feedback probe 94 are omitted in FIGS. 12A and 12B for clarity. At both frequencies the effect of the recess 82 is to intensify the electric field in the second region 80B where the plasma bulb 90 is located. Power is provided by the drive probe 92 in the first region 80A, which is larger and has a lower electric field intensity. The electric field becomes more concentrated in the narrow second region 80B adjacent to the location of the bulb 90. Electric field intensity is greater than in a solid dielectric constant cylinder of the same dimensions, resulting in a lower fundamental mode frequency.

Figure 13A:
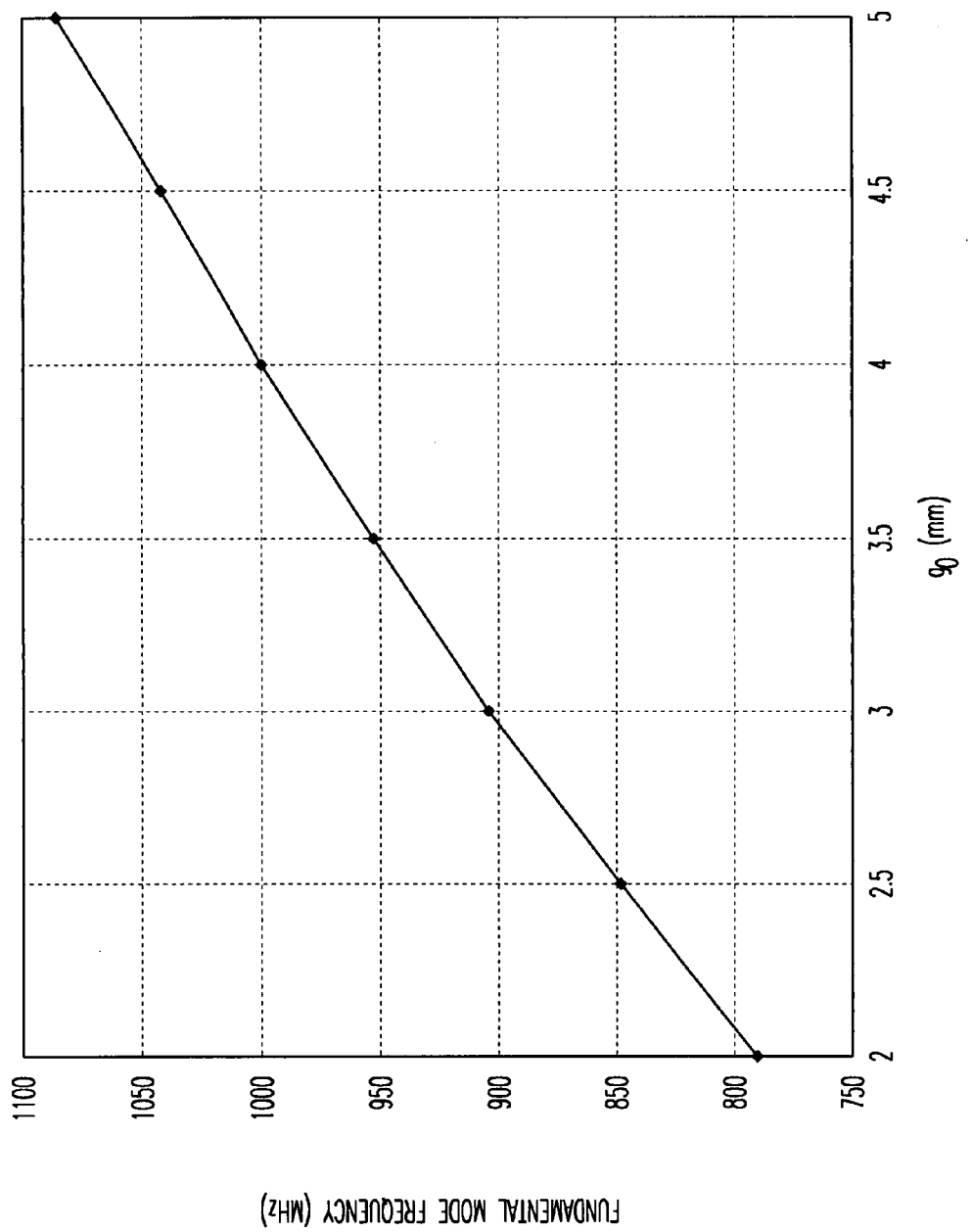
FIG. 13A shows the sensitivity of the fundamental mode frequency of the FIG. 5 waveguide body, designed for operation at 900 MHz, to dimensional parameter $g_0$ (see FIG. 11) for fixed body thickness and cylinder diameter, and fixed recess diameter and opening diameter.

FIG. 13A shows example dependence of the fundamental mode frequency (in MHz) of an alumina waveguide body 80 to the dimensional parameter $g_0$ (in mm), for the following example fixed body dimensions: D=41.15 mm; H=17.78 mm; $h_0$=13.36 mm; and $h_1$=6.15 mm. The frequency is seen to decrease approximately linearly with decreasing $g_0$ and thus with increasing depth of recess 82. So for a given body configuration, the choice of $g_0$ can be used to tune the resonant frequency. For a solid cylindrical waveguide body the fundamental mode and its resonant frequency are largely independent of cylinder height, because the dominant boundary condition is determined by the cylindrical surface. The fundamental and higher mode frequencies depend most directly on cylinder diameter; or, for a rectangular prism-shaped body, on the cross-section diagonal. However, waveguide bodies such as the example bodies 40, 60, 80, 100, 120 and 140 introduce additional boundary conditions affecting the resonant frequency.

Figure 13B:
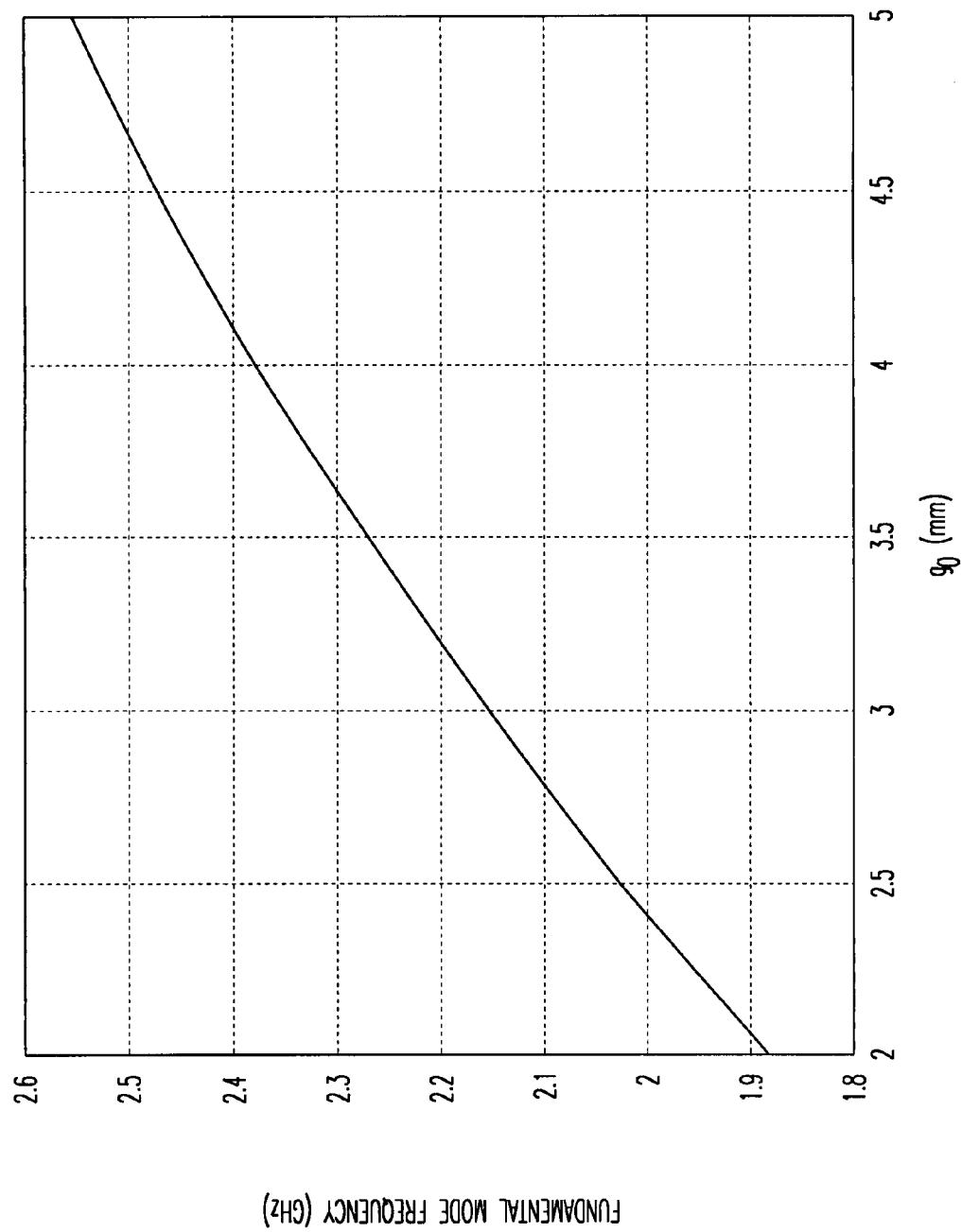
FIG. 13B shows the sensitivity of the fundamental mode frequency of the FIG. 5 waveguide body, designed for operation at 2.15 GHz, to dimensional parameter $g_0$ for fixed body thickness and cylinder diameter, and fixed recess diameter and opening diameter.

FIG. 13B shows example dependence of the fundamental mode frequency of an alumina waveguide body 80 to dimensional parameter $g_0$, for the following example fixed body dimensions: D=29.36 mm; H=7.62 mm; $h_0$=8.13 mm; and $h_1$=6.15 mm. Again, the fundamental mode frequency decreases approximately linearly with decreasing $g_0$. These results demonstrate that waveguide bodies according to example embodiments, even when made of material having a dielectric constant less than 10 (such as alumina), can have volumes smaller than 6 $cm^3$ and 23 $cm^3$, respectively, in plasma lamps operating at 2.15 GHz and 900 MHz. It is also believed that waveguide bodies in example embodiments can have volumes less than 3 $cm^3$ and 11.5 $cm^3$, respectively, in plasma lamps operating at 2.15 GHz and 900 MHz when made of a material having a dielectric constant less than 20.

For solid cylindrical and rectangular prism bodies, the fundamental mode and its resonant frequency are largely independent of body height (corresponding to H in FIG. 11). The most significant boundary conditions are the side surface(s); therefore, the resonant frequencies depend most directly on cylinder diameter and prism diagonal. Cut-outs such as a lower recess or upper and lower recesses introduce additional boundary conditions which affect the resonant frequency; as already noted, $g_0$ appears to be a significant dimensional parameter.

As described above, example embodiments may use a shaped waveguide body to allow operation at a lower frequency (or at the same frequency with a body of smaller volume) than a solid cylindrical or rectangular waveguide body having the same dielectric constant. The waveguide body may have a region containing a bulb that is relatively thin (e.g., the region having a height $g_0$ in FIG. 11), and other regions that are thicker (e.g., the region having a height H in FIG. 11). The thicker regions may be peripheral to the thin region and form a recess (e.g., recess 44 or 64 in FIG. 2 or 3) on one side of the thin region. In some example embodiments, the thicker regions may extend beyond the thin region in more than one direction and form a recessed region on both sides of the thin region (e.g., recesses 142 and 144 in FIG. 10B). Probes may be positioned in the thicker regions while the bulb is positioned in the thin region. As shown in FIGS. 12A and 12B, the electric field is intensified in the thin region adjacent to the bulb which allows operation at a lower frequency than a solid cylindrical or rectangular waveguide body having the same volume and same dielectric constant.

For example, simulations demonstrate that in example embodiments a shaped waveguide body with a dielectric constant less than 10 and a height of about 7.5 mm may operate in the fundamental mode at a frequency of 2.3 GHz or less and have a volume less than 3.5 $cm^3$. In contrast, a solid cylindrical or rectangular waveguide body with a dielectric constant less than 10 and operating in the fundamental mode at a frequency of 2.3 GHz or less would be expected to have a volume of at least 6 $cm^3$.

Simulations also demonstrate that example embodiments with a shaped waveguide body with a dielectric constant less than 10 and a height of about 18 mm may operate in the fundamental mode at a frequency of 1 GHz or less and have a volume less than 20 $cm^3$. In contrast, a solid cylindrical or rectangular waveguide body with a dielectric constant less than 10 and operating in the fundamental mode at a frequency of 1 GHz or less would be expected to have a volume of at least 30 $cm^3$.

Figure 1B:
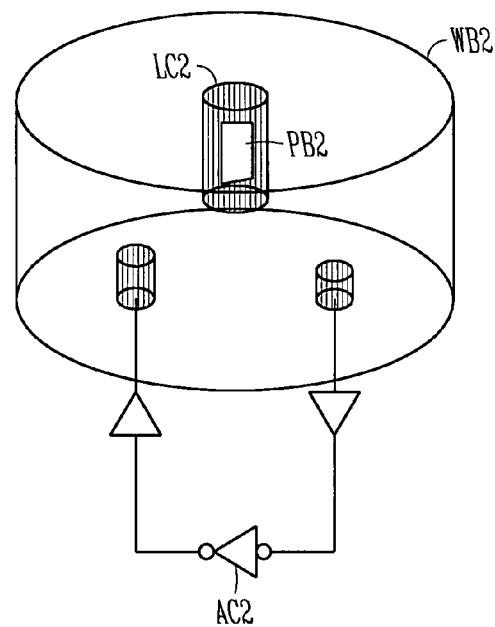
FIG. 1B schematically depicts a plasma lamp according to the prior art, including a cylindrical-shaped waveguide body of dielectric material.

Generally, the resonant frequency of solid rectangular and cylindrical waveguides of the type shown in FIGS. 1A and 1B, respectively, scale inversely to the square root of the dielectric constant of the waveguide body. Generally, for a constant height, the resonant frequency scales inversely as a function of diameter or diagonal, when the diameter or diagonal is larger than about four times the height. Thus, the volume of a solid rectangular or cylindrical waveguide body of the type shown in FIGS. 1A and 1B is expected to scale in inverse proportion to the dielectric constant when the height is held constant. That is, to maintain the same resonant frequency as the dielectric constant doubles, the volume must be approximately halved.

Example embodiments using a shaped waveguide are believed to be capable of resonating in a fundamental mode for a given frequency (e.g., 2.15 GHz or 900 MHz) at a volume smaller than the volume required for a solid cylindrical or rectangular waveguide of the same dielectric constant to resonate in the fundamental mode at the same frequency. In some example embodiments, the volume of the shaped waveguide may have a volume that is less than the volume of the corresponding solid or cylindrical waveguide body by 10%, 20%, 30% or more.

FIGS. 15A through 23B compare the fundamental mode frequencies of the example waveguide bodies 80 and 100 with solid rectangular-prism and cylindrical bodies of the type shown in FIGS. 1A and 1B, designed for operation at 1 GHz and 2 GHz, as a function of body diagonal (or diameter) and volume. The waveguide bodies may also be compared based on the maximum distances between any two points in the waveguide body.

Figure 14B:
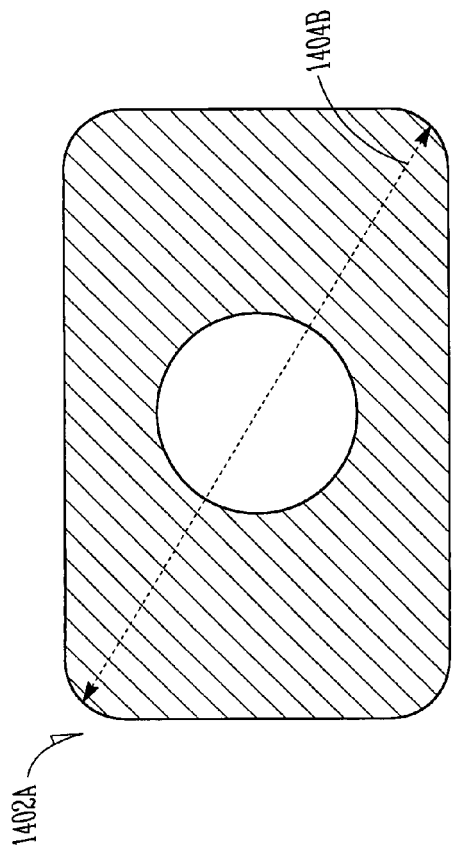
FIG. 14B shows the diagonal of a cross section of a rectangular waveguide body according to an example embodiment.
Figure 14D:
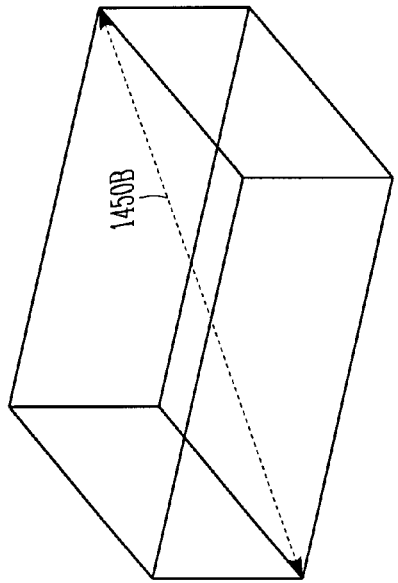
FIG. 14D shows the maximum distance between two points in a rectangular waveguide body according to an example embodiment.
Figure 14A:
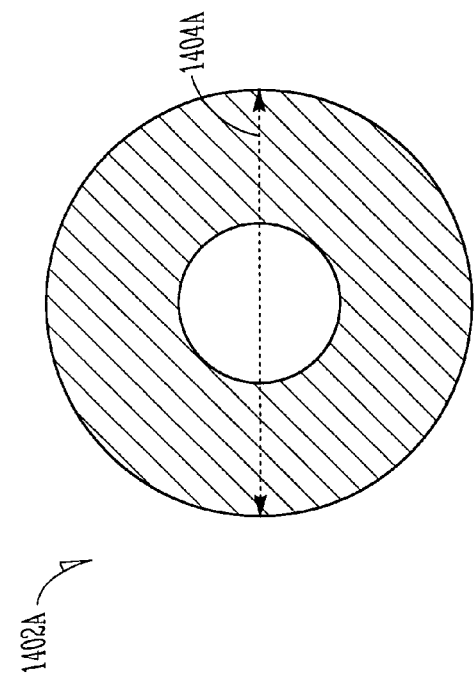
FIG. 14A shows the diameter of a cross section of a cylindrical waveguide body according to an example embodiment.

FIG. 14A shows a cross section 1402A of the shaped waveguide body 80 of FIG. 5. The cross section is taken at a position orthogonal to height, H, and passes through the recess 82. The diameter is shown at 1404A. In this example, this is also the maximum distance between any two points in the cross section. A similar cross section may be taken through a cylindrical waveguide body of the type shown in FIG. 1B. The diameter for each cross section of a cylindrical body of this type is the same. For comparison of waveguide bodies having other shapes, the cross section may be taken at particular positions within the waveguide body. For example, a cross section may be taken at a position orthogonal to the end of the drive probe or orthogonal to the bottom or middle of the bulb. In some examples, a central axis may be defined through the bulb (in the same direction as the central axis of the light that is radiated out of the bulb and away from the waveguide body). The cross section may be taken orthogonal to the central axis through the bulb. In particular, the cross section with the largest diameter (or, more generally, the cross section having the largest distance between any two points) that is orthogonal to the central axis of the bulb may be selected for comparison purposes.

FIG. 14B shows a cross section 1402B of the shaped waveguide body 100 of FIG. 6. The cross section is taken at a position orthogonal to height, H, and passes through the recess 102. The diagonal is shown at 1404B. In this example, this is also the maximum distance between any two points in the cross section. A similar cross section may be taken through a rectangular waveguide body of the type shown in FIG. 1A. The diagonal for each cross section in a rectangular prism of this type is the same. For comparison of waveguide bodies having other shapes, the cross section may be taken at particular positions within the waveguide body. For example, a cross section may be taken at a position orthogonal to the end of the drive probe or orthogonal to the bottom or middle of the bulb. In some examples, a central axis may be defined through the bulb (in the same direction as the central axis of the light that is radiated out of the bulb and away from the waveguide body). The cross section may be taken orthogonal to the central axis through the bulb. In particular, the cross section with the largest diagonal (or, more generally, the cross section having the largest distance between any two points) that is orthogonal to the central axis of the bulb may be selected for comparison purposes.

Figure 14C:
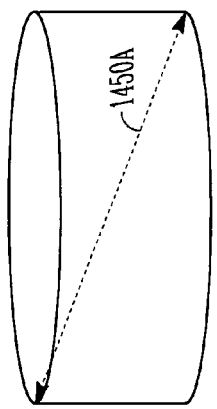
FIG. 14C shows the maximum distance between two points in a cylindrical waveguide body according to an example embodiment.

FIG. 14C shows a three dimensional representation of the outer boundaries of the shaped waveguide body 80 of FIG. 5. The distance from the bottom right edge of the cylinder to the top opposite edge is shown at 1450A in FIG. 14C. In this example, this is also the maximum distance between any two points in the three-dimensional waveguide body. For comparison of waveguide bodies having other shapes, the maximum distance between any two points in the waveguide body may be selected.

FIG. 14D shows a three dimensional representation of the outer boundaries of the shaped waveguide body 100 of FIG. 6. The distance from the bottom left corner right edge of the prism to the opposite top right corner is shown at 1450B in FIG. 14D. In this example, this is also the maximum distance between any two points in the three-dimensional waveguide body. For comparison of waveguide bodies having other shapes, the maximum distance between any two points in the waveguide body may be selected.

One way of comparing waveguide bodies is to look at the ratio of the diameter or diagonal of a cross section over the wavelength. More generally, the maximum distance between two points in a cross section may be used. This is a useful way of representing the size of a cross section required for a particular frequency. The wavelength is equal to the speed of light divided by the product of the fundamental frequency and square root of the dielectric constant: $C/(f*\sqrt{\in_r})$. If more than one dielectric material is used in the waveguide body, the effective dielectric constant can be used.

Figure 15A:
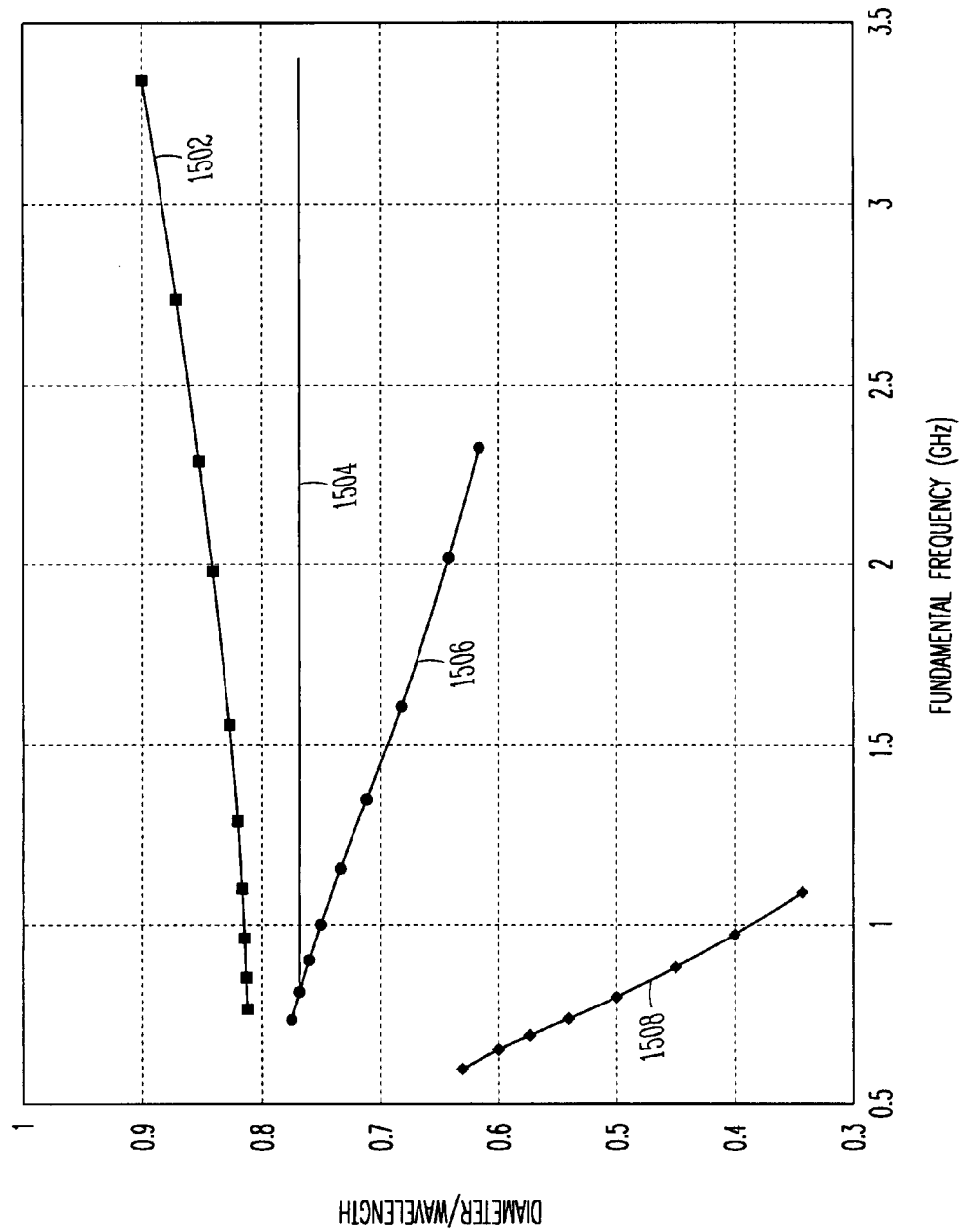
FIG. 15A is a graph showing the ratio of diameter over wavelength as a function of frequency for shaped waveguides according to example embodiments and for a cylindrical waveguide.

FIG. 15A is a graph showing the ratio of diameter over wavelength as a function of frequency for shaped waveguides according to example embodiments and for a cylindrical waveguide. In this graph, a dielectric constant of 10 was used. The curve shown at 1502 shows the ratio of diameter over wavelength for a cylindrical waveguide of the type shown in FIG. 1B with a height of 12.5 mm. The curve at 1504 shows the theoretical ideal for an infinite pill-like cylinder and "perfect magnetic conductor" boundary approximation. This curve has a diameter/wavelength ratio of about 0.7655. The curve at 1506 shows the ratio of diameter over wavelength for a shaped waveguide body 80 that is designed for operation at 2 GHz. In this example, the height, H, is 7.5 mm, the diameter of the recess has is 10 mm and $g_0$ is 3 mm. As can be seen from the graph, the ratio of diameter to wavelength is less than 0.7655 at frequencies over 1 GHz and is less than 0.7 for frequencies from 1.5 to 2.3 GHz. The curve at 1508 shows the ratio of diameter over wavelength for a shaped waveguide body 80 that is designed for operation at 900 MHz. In this example, the height, H, is 18 mm, the diameter of the recess is 10 mm and $g_0$ is 3 mm. As can be seen from the graph, the ratio of diameter to wavelength is less than 0.7655 at frequencies between 600 MHz and 1.2 GHz. The ratio is less than 0.5 from 800 MHz to 1.2 GHz and less than 0.4 from 1 GHz to 1.2 GHz.

Figure 15B:
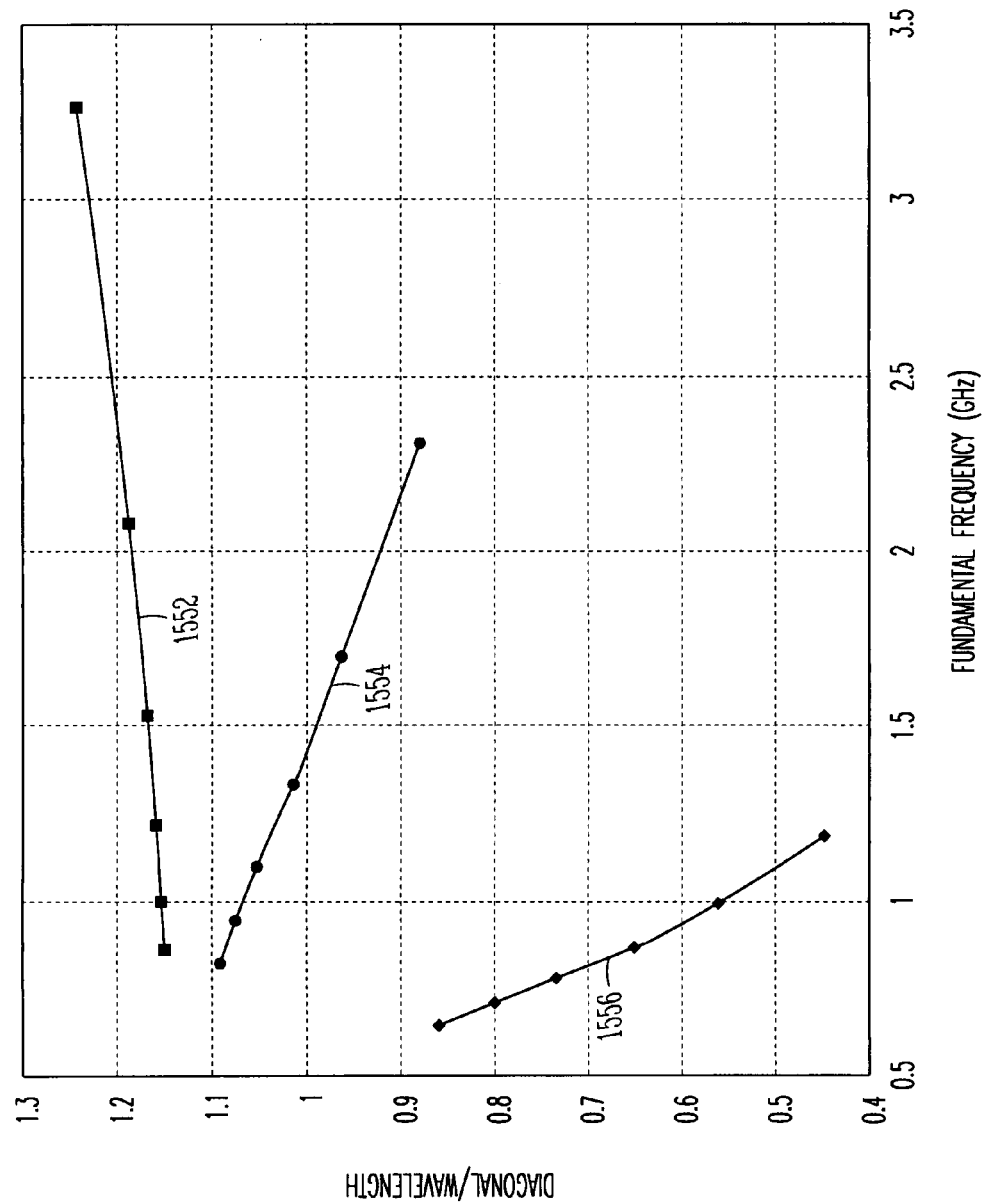
FIG. 15B is a graph showing the ratio of diagonal over wavelength as a function of frequency for shaped waveguides according to example embodiments and for a rectangular waveguide.

FIG. 15B is a graph showing the ratio of diagonal over wavelength as a function of frequency for shaped waveguides according to example embodiments and for a rectangular waveguide. In this graph, a dielectric constant of 10 was used. The curve shown at 1552 shows the ratio of diagonal over wavelength for a rectangular waveguide of the type shown in FIG. 1A with a height of 12.5 mm and a 2:3 aspect ratio. The curve at 1554 shows the ratio of diameter over wavelength for a shaped waveguide body 100 that is designed for operation at 2 GHz. In this example, the height, H, is 7.5 mm, the diameter of the recess is 10 mm, $g_0$ is 3 mm and the aspect ratio is 2:3. As can be seen from the graph, the ratio of diagonal to wavelength is less than 1.1 for frequencies from 1 to 2.3 GHz and less than 1 for frequencies from 1.5 to 2.3 GHz. The curve at 1556 shows the ratio of diameter over wavelength for a shaped waveguide body 100 that is designed for operation at 900 MHz. In this example, the height, H, is 18 mm, the diameter of the recess is 10 mm, $g_0$ is 3 mm and the aspect ratio is 2:3. As can be seen from the graph, the ratio of diagonal to wavelength is less than 0.9 at frequencies between 600 MHz and 1.2 GHz. The ratio is less than 0.7 from 800 MHz to 1.2 GHz and less than 0.6 from 1 GHz to 1.2 GHz.

As shown in FIGS. 15A and 15B, a shaped waveguide can be used to achieve smaller diameters or diagonals (and, more generally, a smaller maximum distance between any two points in a cross section) than a solid cylindrical or rectangular waveguide of comparable dimensions. Similar ratios can be used to determine the ratio of the maximum distance between any two points in the three dimensional waveguide body (see FIGS. 14C and 14D) over the wavelength. At the heights used, this does not change the ratios by a significant amount. See example tables 1-4 below for differences between diameter or diagonal and the maximum distance between any two points in the three dimensional waveguide body (indicated by the column "max dist"). As will be apparent this results in ratios (maximum distance between any two points in waveguide over wavelength) that are smaller for the shaped waveguides than a comparable solid cylindrical or rectangular waveguide. Accordingly, example embodiments may be characterized by using the ratio of maximum distance over wavelength for any of the maximum distances or ranges of maximum distances described in tables 1-4 (or calculated from any of the other examples disclosed herein) and the corresponding fundamental frequencies or ranges of fundamental frequencies for those example waveguides. The ratios described above would be about the same if maximum distance is used when the height, H, is 7.5 mm (see tables 1 and 2 below). For example, a shaped waveguide body 80 with height 7.5 mm may have ratios of max dist/wavelength of less than 0.7 for frequencies from 1.5 to 2.3 GHz. A shaped waveguide body 100 with height 7.5 mm may have ratios of max dist/wavelength of less than 1 for frequencies from 1.5 to 2.3 GHz. For a height of 18 mm, the ratios would be about the same at larger diameters/diagonals (e.g., 1.6% larger at a diameter of 10 cm) while there is a more significant difference at smaller diameters/diagonals (e.g., about 23% larger at a diameter of 2.5 cm) (see tables 3 and 4). For example, a shaped waveguide body 80 with height 18 mm may have ratios of max dist/wavelength of less than about 0.6 for 800 MHz to 1.2 GHz and less than about 0.5 from 1 GHz to 1.2 GHz. A shaped waveguide body 100 with height 18 mm may have ratios of max dist/wavelength of less than about 0.8 from 800 MHz to 1.2 GHz and less than about 0.7 from 1 GHz to 1.2 GHz. These ratios are significantly lower than ratios for a solid cylindrical or rectangular waveguide of comparable dimensions at the same operating frequencies.

Figure 16A:
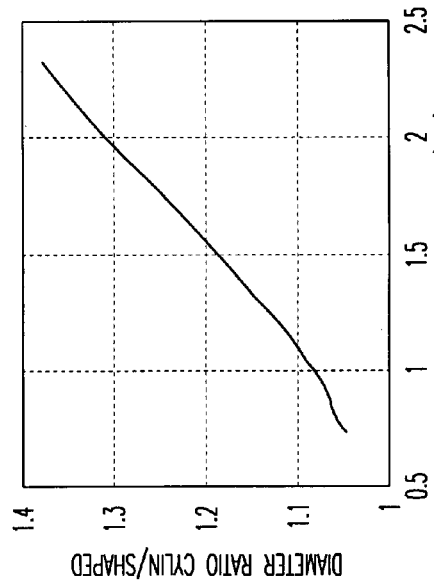
FIG. 16A compares, as a function of body diameter, the fundamental mode frequency of the FIG. 5 waveguide body with that of a cylindrical FIG. 1B waveguide body, when both are designed for operation at 2 GHz.
Figure 16B:
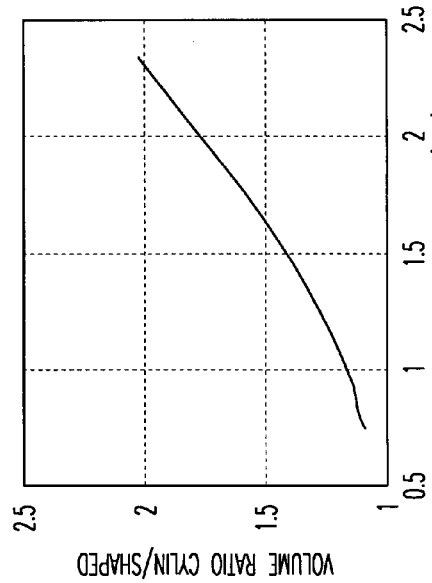
FIG. 16B plots the FIG. 16A data as the ratio of the FIG. 1B body diameter to the FIG. 5 body diameter, as a function of fundamental mode frequency.

FIG. 16A compares, as a function of body diameter, the fundamental mode frequency (in GHz) of a highly-pure alumina body 80 (asterisk data-points) with that of a highly-pure alumina body FIG. 1B cylindrical body ("x" data-points) for the following example conditions: a common height (7.5 mm) and body diameter, and for body 80 a centered circular recess 10 mm in diameter, and a $g_0$ of 3 mm. The body height and diameter were selected for a lamp designed to operate at about 2 GHz. While FIGS. 16A, 16B, 17A and 17B also compare body 80 with a cylindrical body of FIG. 1B when operating at frequencies as high as 3.5 GHz and as low as 0.75 GHz, the distinctions between body 80 and the cylindrical body of FIG. 1B are more significant at higher frequencies such as 2 GHz and less significant at lower frequencies such as 900 MHz. However, in other example embodiments where the body height and diameter are selected to operate at about 900 MHz, significant differences are observed at lower frequencies as described below in connection with FIGS. 20A, 20B, 21A, 21B. In FIG. 16A, the difference between the two diameters increases with increasing body fundamental frequency. For example, for a fundamental frequency of 2 GHz the diameter of body 80 is about 3 centimeters (cm) while the diameter of the conventional FIG. 1 body is 4 cm; for a fundamental frequency below 1 GHz the diameters are about the same. The end data-point on the body 80 curve shows that for a fundamental frequency of about 2.3 GHz, the diameter is about 2.2 cm. FIG. 16B shows the FIG. 16A data in terms of the ratio of the two body diameters (FIG. 1B/body 80) as a function of fundamental mode frequency.

Figure 17A:
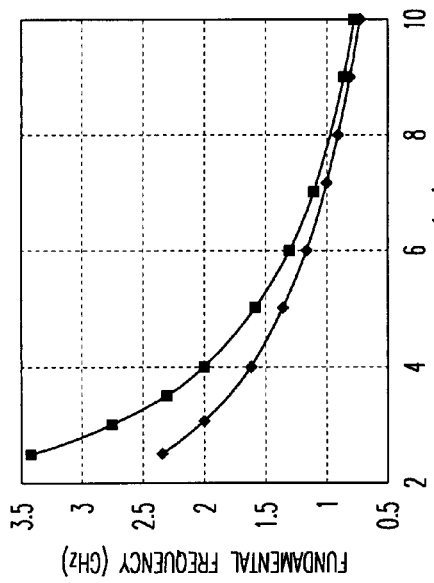
FIG. 17A compares, as a function of body volume, the fundamental mode frequency of the FIG. 5 waveguide body with that of a cylindrical FIG. 1B waveguide body, when both are designed for operation at 2 GHz.
Figure 17B:
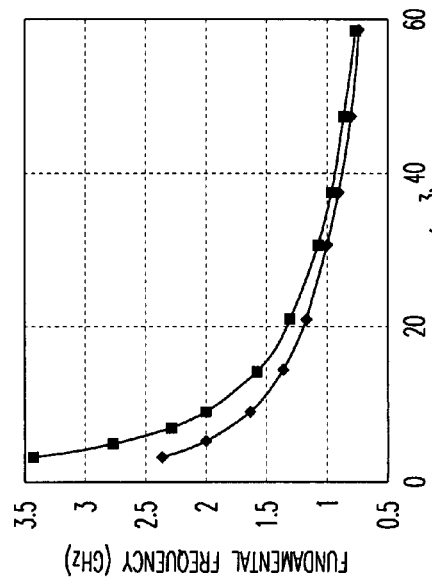
FIG. 17B plots the FIG. 17A data as the ratio of the FIG. 1B body volume to the FIG. 5 body volume, as a function of fundamental mode frequency.

FIG. 17A compares, as a function of body volume, the fundamental mode frequency of the FIG. 16A body 80 with that of the FIG. 16A cylindrical body under the FIG. 16A conditions. The difference between the two volumes increases with increasing fundamental mode frequency. For a fundamental frequency of 2 GHz this difference is about 4.3 cm³, a volume reduction of about 45%. For fundamental frequencies of 1.6 GHz and 2.3 GHz, the volume reduction is about 33% and 50%, respectively. The end data-point on the body 80 curve shows that for a fundamental frequency of about 2.3 GHz, the volume is about 3.5 cm³. FIG. 17B shows the FIG. 17A data in terms of the ratio of the two body volumes (FIG. 1B/body 80) as a function of fundamental mode frequency.

Table 1 compares the fundamental mode frequency (GHz) and volume (cm³) of body 80 and the solid cylindrical body as a function of body diameter (cm). The volumes for the cylindrical body are slightly less for a given diameter than the volumes for body 80 with the same diameter, because different assumptions were made about the bulb volumes for the two types of waveguides (which were subtracted from the overall volume to determine the volumes below). As described above, example embodiments may use a smaller, protruding bulb (which subtracts less volume from the waveguide body) rather than a larger bulb fully embedded in the waveguide body. However, this is not believed to change the overall conclusions about the decrease in volumes that can be achieved at a given frequency by using a shaped waveguide.

TABLE 1

| | | cylindrical body | | body 80 | |
|---|---|---|---|---|---|
| diameter | max dist | frequency | volume | frequency | volume |
| 2.5 | 2.61 | 3.4120 | 3.1789 | 2.3328 | 3.2127 |
| 3.0 | 3.09 | 2.7460 | 4.7988 | 2.0178 | 4.8326 |
| 3.5 | 3.57 | 2.2965 | 6.7132 | | |
| 4.0 | 4.07 | 1.9870 | 8.9221 | 1.6116 | 8.9559 |
| 5.0 | 5.06 | 1.5640 | 14.2236 | 1.3456 | 14.2573 |
| 6.0 | 6.05 | 1.2936 | 20.7031 | 1.1582 | 20.7369 |
| 7.0 | 7.04 | 1.1030 | 28.3607 | 1.0132 | 28.3945 |
| 8.0 | 8.04 | 0.9629 | 37.1965 | 0.9004 | 37.2302 |
| 9.0 | 9.03 | 0.8542 | 47.2103 | 0.8055 | 47.2441 |
| 10.0 | 10.03 | 0.7680 | 58.4022 | 0.7334 | 58.4360 |

FIG. 18A compares, as a function of body cross-section diagonal, the fundamental mode frequency of a highly-pure alumina body 100 with that of a highly-pure alumina FIG. 1A rectangular prism-shaped body for the following conditions: a common height (7.5 mm) and cross-section aspect ratio of 2:3, and for body 100 a centered circular recess 10 mm in diameter, and a $g_0$ of 3 mm. The body height and cross-section diagonal were selected for a lamp designed to operate at about 2 GHz. The difference between the two diagonals increases moderately with increasing body fundamental frequency. For a fundamental frequency of 2 GHz the body 100 diagonal is about 4.8 cm while the diagonal of the FIG. 1 body is about 5.2 cm. The end data-point on the body 100 curve shows that for a fundamental frequency of about 2.3 GHz, the diagonal is about 3.6 cm. FIG. 18B shows the FIG. 15A data in terms of the ratio of the two body diagonals (FIG. 1A/body 100) as a function of fundamental mode frequency.

FIG. 19A compares, as a function of body volume, the fundamental mode frequency of the FIG. 18A body 100 with that of the FIG. 18A rectangular prism-shaped body under the FIG. 18A conditions. Again, the difference between the two volumes increases with increasing fundamental mode frequency. For a fundamental frequency of 2 GHz this difference is about 43%, slightly less than for the cylindrical body comparison shown in FIG. 17A. For fundamental frequencies of 1.6 GHz and 2.3 GHz, the volume reduction is about 30% and 48%, respectively, again slightly less than for the cylindrical bodies. The end data-point on the body 100 curve shows that for a fundamental frequency of about 2.3 GHz, the volume is about 4.2 cm³. FIG. 19B shows the FIG. 19A data in terms of the ratio of the two body volumes (FIG. 1A/body 100) as a function of fundamental mode frequency.

Table 2 compares the fundamental mode frequency (GHz) and volume (cm³) of body 100 and the rectangular prism body as a function of body diagonal (cm). The volumes for the rectangular body are slightly less for a given diagonal than the volumes for body 100 with the same diagonal, because different assumptions were made about the bulb volumes for the two types of waveguides (which were subtracted from the overall volume to determine the volumes below). As described above, example embodiments may use a smaller, protruding bulb (which subtracts less volume from the waveguide body) rather than a larger bulb fully embedded in the waveguide body (as was assumed for the rectangular body). However, this is not believed to change the overall conclusions about the decrease in volumes that can be achieved at a given frequency by using a shaped waveguide.

TABLE 2

| | | rectangular body | | body 100 | |
|---|---|---|---|---|---|
| diagonal | max dist | frequency | volume | frequency | volume |
| 3.606 | 3.68 | 3.273 | 3.997 | 2.313 | 4.031 |
| 5.408 | 5.46 | 2.079 | 9.622 | 1.690 | 9.656 |
| 7.211 | 7.25 | 1.531 | 17.497 | 1.332 | 17.531 |
| 9.014 | 9.05 | 1.216 | 27.622 | 1.106 | 27.656 |
| 10.817 | 10.84 | 1.009 | 39.997 | 0.942 | 40.031 |
| 12.619 | 12.64 | 0.863 | 54.622 | 0.819 | 54.656 |

Figure 20B:
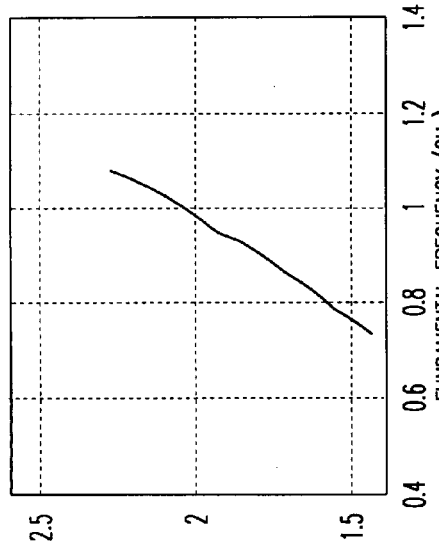
FIG. 20B plots the FIG. 20A data as the ratio of the FIG. 1B body diameter to the FIG. 5 body diameter, as a function of fundamental mode frequency.
Figure 20A:
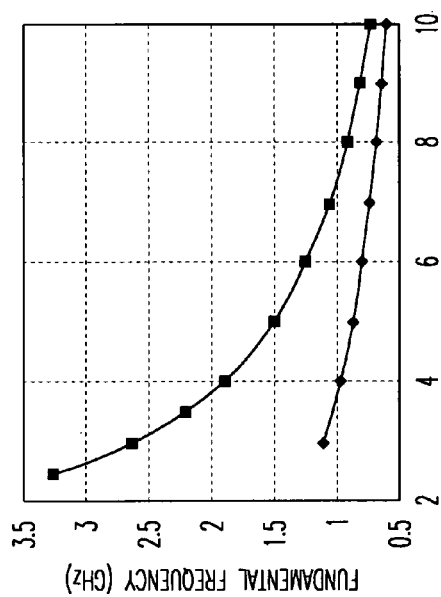
FIG. 20A compares, as a function of body diameter, the fundamental mode frequency of the FIG. 5 waveguide body with that of a cylindrical FIG. 1B waveguide body, when both are designed for operation at 1 GHz.

FIG. 20A compares, as a function of body diameter, the fundamental mode frequency of a highly-pure alumina body 80 with that of a highly-pure alumina FIG. 1B cylindrical body for the following conditions: a common height (18.0 mm) and body diameter, and for body 80 a centered circular recess 10 mm in diameter, and a $g_0$ of 3 mm. The body height and diameter were selected for a lamp designed to operate at about 1 GHz. For a fundamental frequency of 1 GHz, the diameter of body 80 is about 3.8 cm while the diameter of the cylindrical body is about 7.3 cm, a reduction of about 48%. The end data-point on the body 80 curve shows that for a fundamental frequency of about 1.1 GHz the diameter is about 3.0 cm. FIG. 20B shows the FIG. 20A data in terms of the ratio of the two body diameters (FIG. 1B/body 80) as a function of fundamental mode frequency, the difference between the two body diameters increasing with increasing frequency.

Figure 21B:
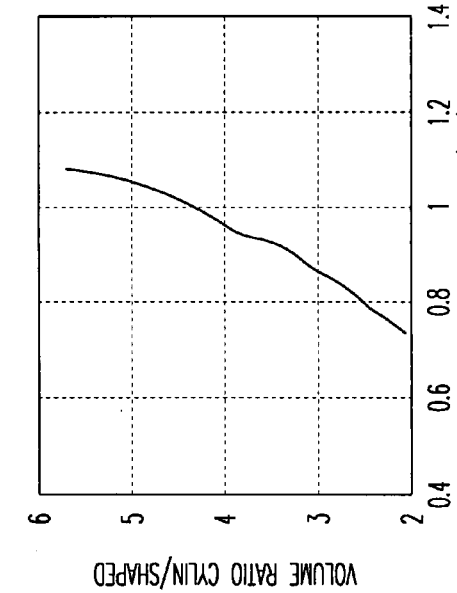
FIG. 21B plots the FIG. 21A data as the ratio of the FIG. 1B body volume to the FIG. 5 body volume, as a function of fundamental mode frequency.
Figure 21A:
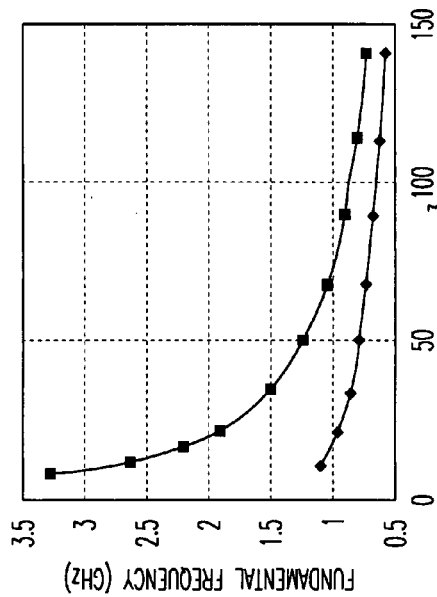
FIG. 21A compares, as a function of body volume, the fundamental mode frequency of the FIG. 5 waveguide body with that of a cylindrical FIG. 1B waveguide body, when both are designed for operation at 1 GHz.

FIG. 21A compares, as a function of body volume, the fundamental mode frequency of the FIG. 20A body 80 with that of the FIG. 20A cylindrical body under the FIG. 20A conditions. The difference between the volumes increases substantially with increasing fundamental mode frequency. For a fundamental frequency of 1 GHz this difference is about 76%. For fundamental frequencies of 900 MHz and 1.08 GHz, the volume reduction is about 69% and 80%, respectively. The end data-point on the body 80 curve shows that for a fundamental frequency of about 1.1 GHz the volume is about 5.0 cm$^3$. FIG. 21B shows the FIG. 21A data in terms of the ratio of the two body volumes (FIG. 1B/body 80) as a function of fundamental mode frequency.

Table 3 compares the fundamental mode frequency (GHz) and volume (cm$^3$) of body 80 and the solid cylindrical body as a function of body diameter (cm). As described above, different assumptions were made about the bulb volumes for the two types of waveguides (which were subtracted from the overall volume to determine the volumes below) although this is not believed to change the overall conclusions about the decrease in volumes that can be achieved at a given frequency by using a shaped waveguide.

TABLE 3

| | | cylindrical body | | body 80 | |
|---|---|---|---|---|---|
| diameter | max dist | frequency | volume | frequency | volume |
| 2.5 | 3.08 | 3.241 | 8.434 | | |
| 3.0 | 3.50 | 2.609 | 12.321 | 1.084 | 11.43 |
| 3.5 | 3.94 | 2.182 | 16.916 | | |
| 4.0 | 4.39 | 1.888 | 22.217 | 0.954 | 21.33 |
| 5.0 | 5.31 | 1.486 | 34.941 | 0.863 | 34.05 |
| 6.0 | 6.26 | 1.229 | 50.492 | 0.786 | 49.60 |
| 7.0 | 7.23 | 1.048 | 68.870 | 0.733 | 67.98 |
| 8.0 | 8.20 | 0.915 | 90.076 | 0.679 | 89.18 |
| 9.0 | 9.18 | 0.811 | 114.109 | 0.636 | 113.22 |
| 10.0 | 10.16 | 0.730 | 140.970 | 0.596 | 140.08 |

Figure 22A:
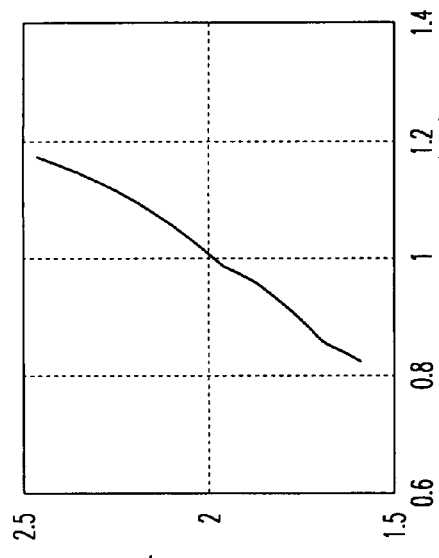
FIG. 22A compares, as a function of body diagonal, the fundamental mode frequency of the FIG. 6 waveguide body with that of a rectangular prism FIG. 1A waveguide body, when both are designed for operation at 1 GHz.
Figure 22B:
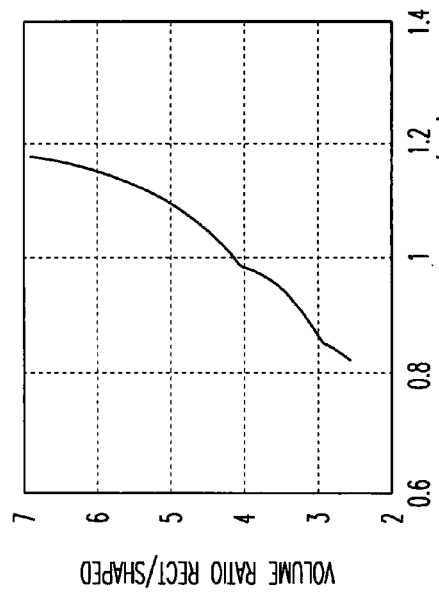
FIG. 22B plots the FIG. 22A data as the ratio of the FIG. 1A body diagonal to the FIG. 6 body diagonal, as a function of fundamental mode frequency.

FIG. 22A compares, as a function of body cross-section diagonal, the fundamental mode frequency of a highly-pure alumina body 100 with that of a highly-pure alumina FIG. 1A rectangular prism-shaped body for the following conditions: a common height (18.0 mm) and cross-section aspect ratio of 2:3, and for body 100 a centered circular recess 10 mm in diameter, and a $g_0$ of 3 mm. The body height and cross-section diagonal were selected for a lamp designed to operate at about 1 GHz. For a fundamental frequency of 1 GHz, the diagonal of body 100 is about 5.1 cm while the diagonal of the FIG. 1A rectangular prism-shaped body is about 10.6 cm, a reduction of about 52% or about 4% greater than for the FIGS. 20A, 20B comparison. The end data-point on the body 100 curve shows that for a fundamental frequency of about 1.2 GHz the diagonal is about 3.5 cm. FIG. 22B shows the FIG. 22A data in terms of the ratio of the two body diagonals (FIG. 1A/body 100) as a function of fundamental mode frequency, the difference between the two diagonals increasing with increasing fundamental frequency.

Figure 23A:
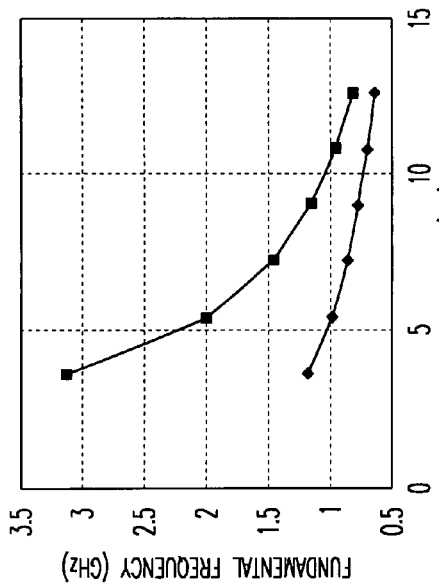
FIG. 23A compares, as a function of body volume, the fundamental mode frequency of the FIG. 6 waveguide body with that of a rectangular FIG. 1A waveguide body, when both are designed for operation at 1 GHz.
Figure 23B:
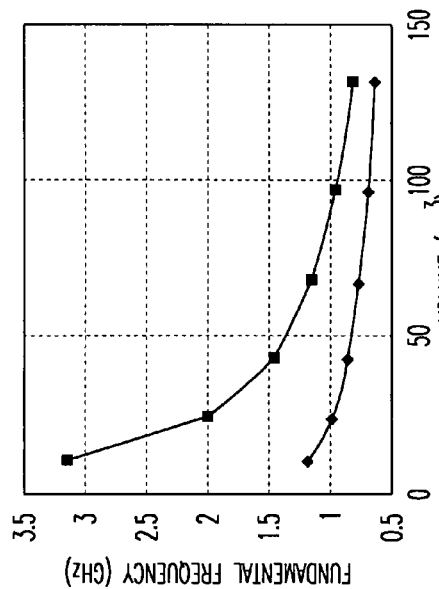
FIG. 23B plots the FIG. 23A data as the ratio of the FIG. 1A body volume to the FIG. 6 body volume, as a function of fundamental mode frequency.

FIG. 23A compares, as a function of body volume, the fundamental mode frequency of the FIG. 22A body 100 with that of the FIG. 22A rectangular prism-shaped body under the FIG. 22A conditions. The difference between the volumes increases substantially with increasing fundamental mode frequency. For a fundamental frequency of 1 GHz this difference is about 86%. For fundamental frequencies of 900 MHz and 1.08 GHz, the volume reduction is about 70% and 80%, respectively. The end data-point on the body 100 curve shows that for a fundamental frequency of about 1.2 GHz, the volume is about 8.3 cm$^3$. FIG. 23B shows the FIG. 23A data in terms of the ratio of the two body volumes (FIG. 1A/body 100) as a function of fundamental mode frequency.

Table 4 compares the fundamental mode frequency (GHz) and volume (cm$^3$) of body 100 and the rectangular prism body as a function of body diagonal (cm). As described above, different assumptions were made about the bulb volumes for the two types of waveguides (which were subtracted from the overall volume to determine the volumes below) although this is not believed to change the overall conclusions about the decrease in volumes that can be achieved at a given frequency by using a shaped waveguide.

TABLE 4

| | | rectangular body | | body 100 | |
|---|---|---|---|---|---|
| diagonal | max dist | frequency | volume | frequency | volume |
| 3.606 | 4.03 | 3.109 | 10.297 | 1.175 | 9.506 |
| 5.408 | 5.70 | 1.975 | 23.797 | 0.983 | 23.006 |
| 7.211 | 7.43 | 1.454 | 42.697 | 0.853 | 41.906 |
| 9.014 | 9.19 | 1.155 | 66.997 | 0.773 | 66.206 |
| 10.817 | 10.97 | 0.959 | 96.697 | 0.703 | 95.906 |
| 12.619 | 12.75 | 0.820 | 131.797 | 0.642 | 131.006 |

Figure 24:
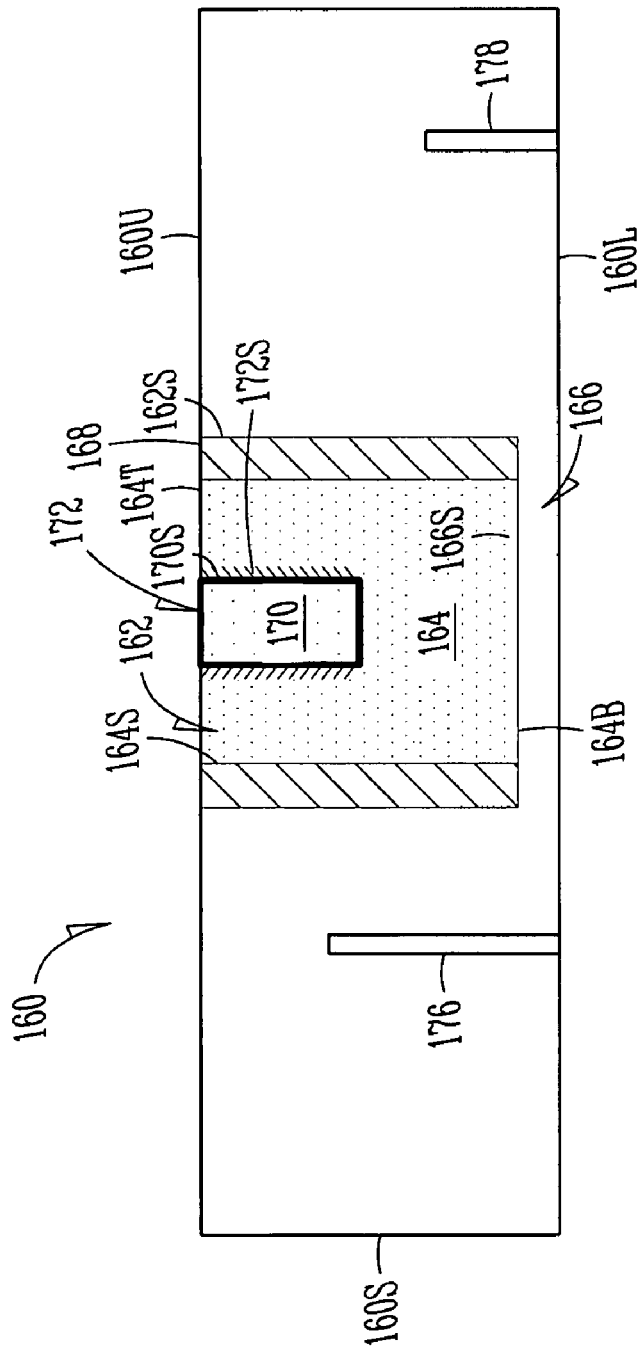
FIG. 24 is a cross-sectional view of a cylindrical or rectangular prism-shaped waveguide body according to a seventh example embodiment, including a bulb within an opening within a sleeve of high thermal conductivity material within a dielectric waveguide body.

FIG. 24 schematically depicts a cross-sectional view of a cylindrical or rectangular prism-shaped waveguide body in a plasma lamp according to a seventh example embodiment. For simplicity, only a cylindrical body 160 is described, although other shapes may be used in other example embodiments. Body 160 includes dielectric material having a dielectric constant greater than about 2. In some example embodiments the material may have a high dielectric constant greater than 50 or even 100. In some example embodiments the material can be magnesium calcium titanate (MCT), a ceramic having a dielectric constant of about 140. Body 160 includes planar upper and lower surfaces 160U, 160L, respectively, orthogonal to a cylindrical outer surface 160S. Surfaces 160S, 160U, 160L may be coated with an electrically conductive coating, such as silver paint or other metallic coating as described above. A recess 162 depending from surface 160U, determined by a cylindrical surface 162S, closely receives a sleeve 164 of material having a thermal conductivity coefficient in a range between 10 and 50 watts/meter-Kelvin. In some example embodiments this highly thermally conductive material can be alumina. Sleeve 164 includes a planar top surface 164T approximately level with body upper surface 160U, an outer surface 164S, and a planar bottom surface 164B attached to planar surface 166S of body portion 166 with an adhesive such as 940HT alumina adhesive, available from Cotronics Corp. of Brooklyn, N.Y. Surface 164S is attached to surface 162S by a layer 168 of alumina powder or adhesive. Alternatively, surfaces 162S and 164S are separated by an air-gap having a width in a range between 0.25 and 2 mm. An air-gap has the advantage of minimizing the effect of thermally-induced stress between the sleeve and body. Depending from surface 164T is an opening 170, determined by a cylindrical surface 170S, within which is positioned a cylindrical bulb 172 having an outer surface 172S. Surface 172S is attached to surface 170S by heat-sintered alumina powder or adhesive. Alternatively, an air-gap separates surfaces 170S and 172S. First and second probes 176, 178 are inserted into body 160 through surface 160L. At least one additional probe may also be positioned in body 160. Typically, the diameter of body 160 is in a range between 1 and 6 cm, and the diameter of sleeve 164 ranges from 10% to 75% of the body diameter. By using a material with a high dielectric constant for the body 160 the size of the waveguide body may be reduced. However, the high dielectric material may not have desirable thermal properties (thermal expansion, thermal conductivity, consistent dielectric constant at different temperatures, etc.). By using a lower dielectric constant material with desirable thermal properties around the bulb, both a small waveguide body with high dielectric constant and desired thermal properties may be achieved.

Figure 25:
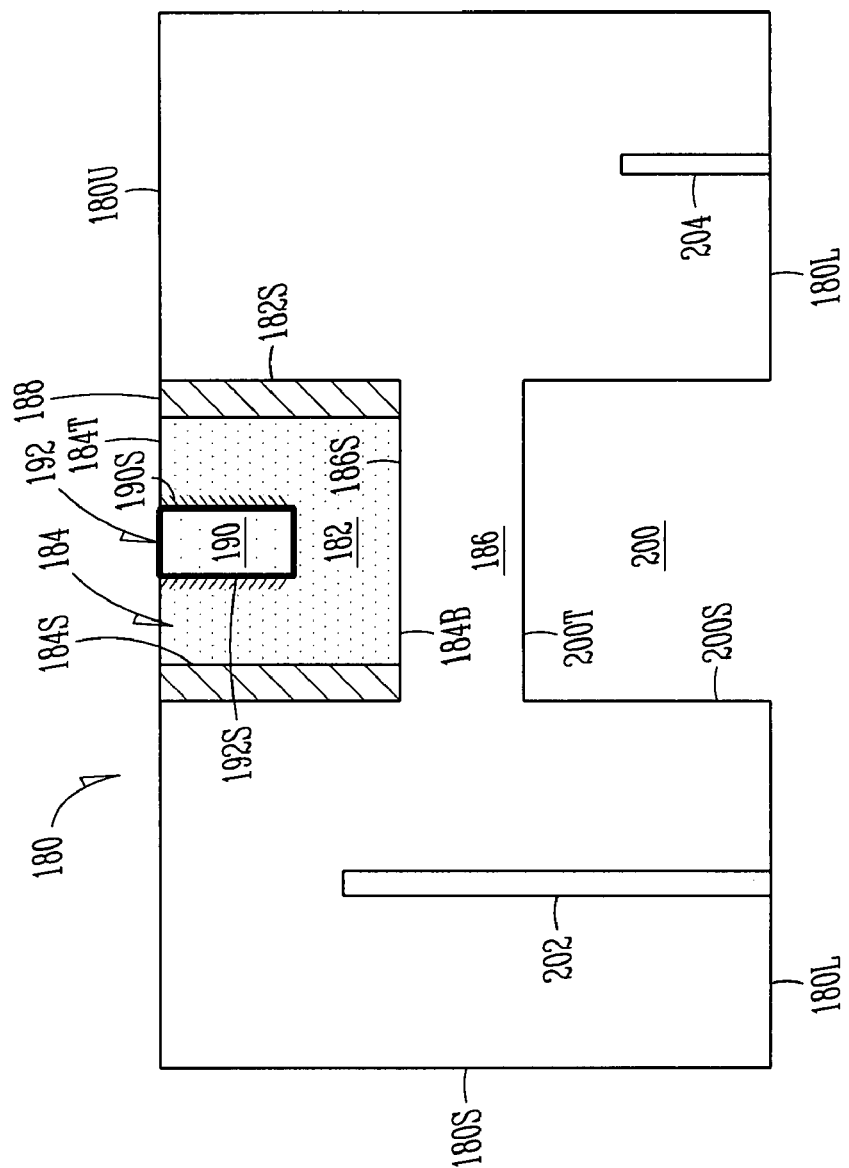
FIG. 25 is a cross-sectional view of a cylindrical or rectangular prism-shaped waveguide body according to an eighth example embodiment, including a bulb within an opening within a sleeve of high thermal conductivity material within a dielectric waveguide body having a bottom recess.

FIG. 25 schematically depicts a cross-sectional view of a cylindrical or rectangular prism-shaped waveguide body in a plasma lamp according to an eighth example embodiment. Only a cylindrical body 180 is described. Body 180 includes dielectric material having a dielectric constant greater than about 2. In some example embodiments the material can be magnesium calcium titanate. Body 180 includes planar upper and lower surfaces 180U, 180L, respectively, orthogonal to a cylindrical outer surface 180S. Surfaces 180S, 180U, 180L may be coated with an electrically conductive coating, such as silver paint or other metallic coating as described above. A first recess 182 depending from surface 180U, determined by a cylindrical surface 182S, closely receives a sleeve 184 of material having a thermal conductivity coefficient in a range between 10 and 50 watts/meter-Kelvin. In some example embodiments this highly thermally conductive material can be alumina. Sleeve 184 includes a planar top surface 184T approximately level with body upper surface 180U, an outer surface 184S, and a planar bottom surface 184B adhesively attached to planar surface 186S of body portion 186. Surface 184S is attached to surface 182S by a layer 188 of alumina powder or adhesive. Alternatively, surfaces 182S and 184S are separated by an air-gap. Depending from surface 184T is an opening 190, determined by a cylindrical surface 190S, within which is positioned a cylindrical bulb 192 having an outer surface 192S. Surface 192S is attached to surface 190S by alumina powder or adhesive. Alternatively, an air-gap separates surfaces 190S and 192S. Body 180 further includes a second recess 200, determined by a cylindrical surface 200S and a top surface 200T, depending upwardly from surface 180L and separated from sleeve 184 by dielectric body portion 186. Surfaces 200S and 200T may be coated with an electrically conductive coating, such as silver paint or other metallic coating as described above. First and second probes 202, 204, respectively, are inserted into body 180 through surface 180L, separated by recess 200. At least one additional probe may also be positioned in body 180. Typically, the diameter of body 180 is in a range between 1 and 6 cm, and the diameter of sleeve 184 ranges from 10% to 75% of the body diameter. By using a material with a high dielectric constant for the body 180 the size of the waveguide body may be reduced. However, the high dielectric material may not have the thermal properties (thermal expansion, thermal conductivity, consistent dielectric constant at different temperatures, etc.). By using a lower dielectric constant material with desirable thermal properties around the bulb, both a small waveguide body with high dielectric constant and desired thermal properties may be achieved.

Figure 26:
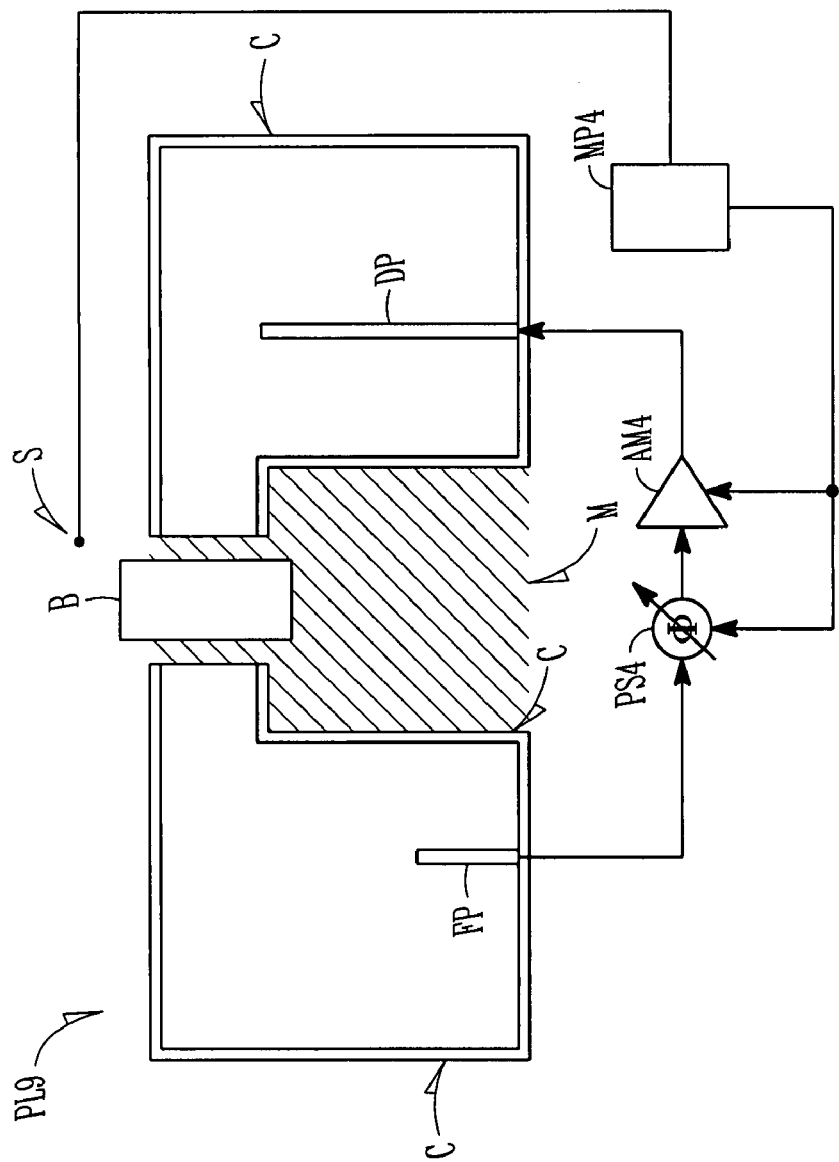
FIG. 26 is a cross-sectional view of a lamp with a waveguide body according to a ninth example embodiment.

FIG. 26 shows a plasma lamp PL9 according to a ninth example embodiment. The plasma lamp has a waveguide body of solid dielectric material having a dielectric constant greater than 2. Alumina may be used in example embodiments. An electrically conductive coating C, such as silver paint or other material, is shown on the surface of the waveguide body. A similar coating may be used in the above example embodiments, although it is not shown in FIGS. 1-25 for ease of illustration. Another ceramic material or adhesive is included around the bulb and in the recess below the bulb B. In this example, alumina powder may be used. The alumina powder is packed around the bulb and into the recess and is sintered by the heat of the bulb. The alumina powder is outside of the waveguide body, so power can still be concentrated in a narrow region adjacent to the bulb. While the ends of the bulb extend outside of the narrow region of the waveguide, additional solid dielectric material (such as alumina powder) M may be added to the lamp body outside of the boundaries of the waveguide. This material M may provide reflection for the bulb and/or stability for the thin region of the waveguide near the bulb. The material M may also be used to manage thermal properties of the lamp, such as conduction of heat from the bulb, and may be in contact with bulb surfaces that extend outside of the waveguide. The electrically conductive coating allows irregular, complex shaped waveguides to be used while allowing the lamp body to have a different shape by including additional dielectric material outside the boundary of the waveguide.

As depicted schematically in FIG. 26, a plasma lamp PL9 includes an amplifier AM4 whose output is connected to the first (drive) probe DP and whose input is connected to the second (feedback) probe FP through an active phase-shifter PS4 which modifies the phase of the signal from the second probe. In other example embodiments, the active phase-shifter PS4 may be positioned between the output of the amplifier and the drive probe DP rather than between the feedback probe FP and the input to the amplifier AM4. The amplifier AM4 and phase-shifter PS4 are controlled by a microprocessor MP4 or other controller which coordinates the lamp startup and shutdown sequences and optimizes the loop phase during startup. In example embodiments, the amplifier AM4 may generate power at a frequency in the range of about 50 MHz to about 30 GHz, or any range subsumed therein. A sensor S also samples the light from the bulb and provides a signal to the microprocessor MP4 that may be used to adjust the brightness of the lamp. This sensor may be omitted in some example embodiments. The microprocessor MP4 may also receive a signal from a brightness control (e.g., such as a manual setting that can be adjusted by the user) that can be used to adjust the brightness of the lamp. The control and feedback circuit shown in FIG. 26 may also be used with the other example embodiments described above.

Figure 27A:
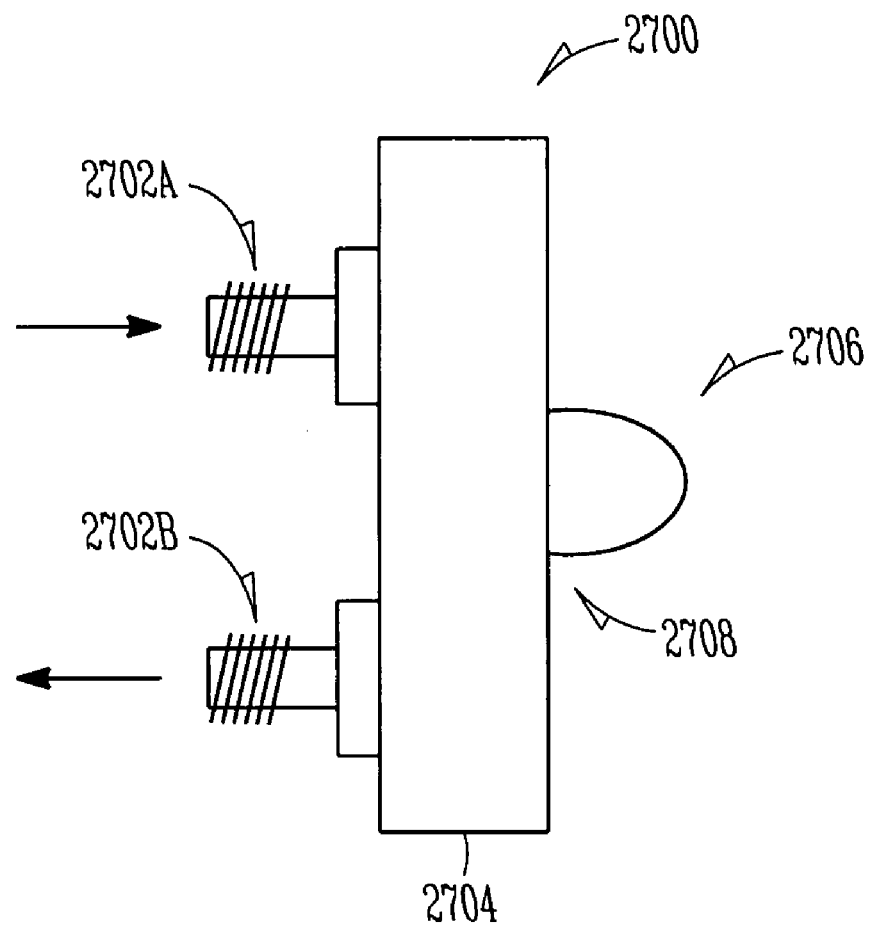
FIG. 27A is a side view of a lamp according to an example embodiment with a connector to a drive probe and a connector to a feedback probe according to an example embodiment.

FIG. 27A is a side view of a lamp 2700 according to an example embodiment. The lamp 2700 may be connected to a control and feedback circuit of the type shown in FIG. 26. The lamp has a connector 2702A to the drive probe that may be connected to the output of the amplifier and a connector 2702B to the feedback probe that may be connected to the input of the amplifier through the active phase shifter. Power is coupled into the waveguide body 2704 to ignite a plasma in the bulb 2706 as described above. As shown in FIG. 27A, the bulb 2706 may protrude from the front surface 2708 of the waveguide 2704 which reduces the electric field intensity at the end of the bulb.

Figure 27B:
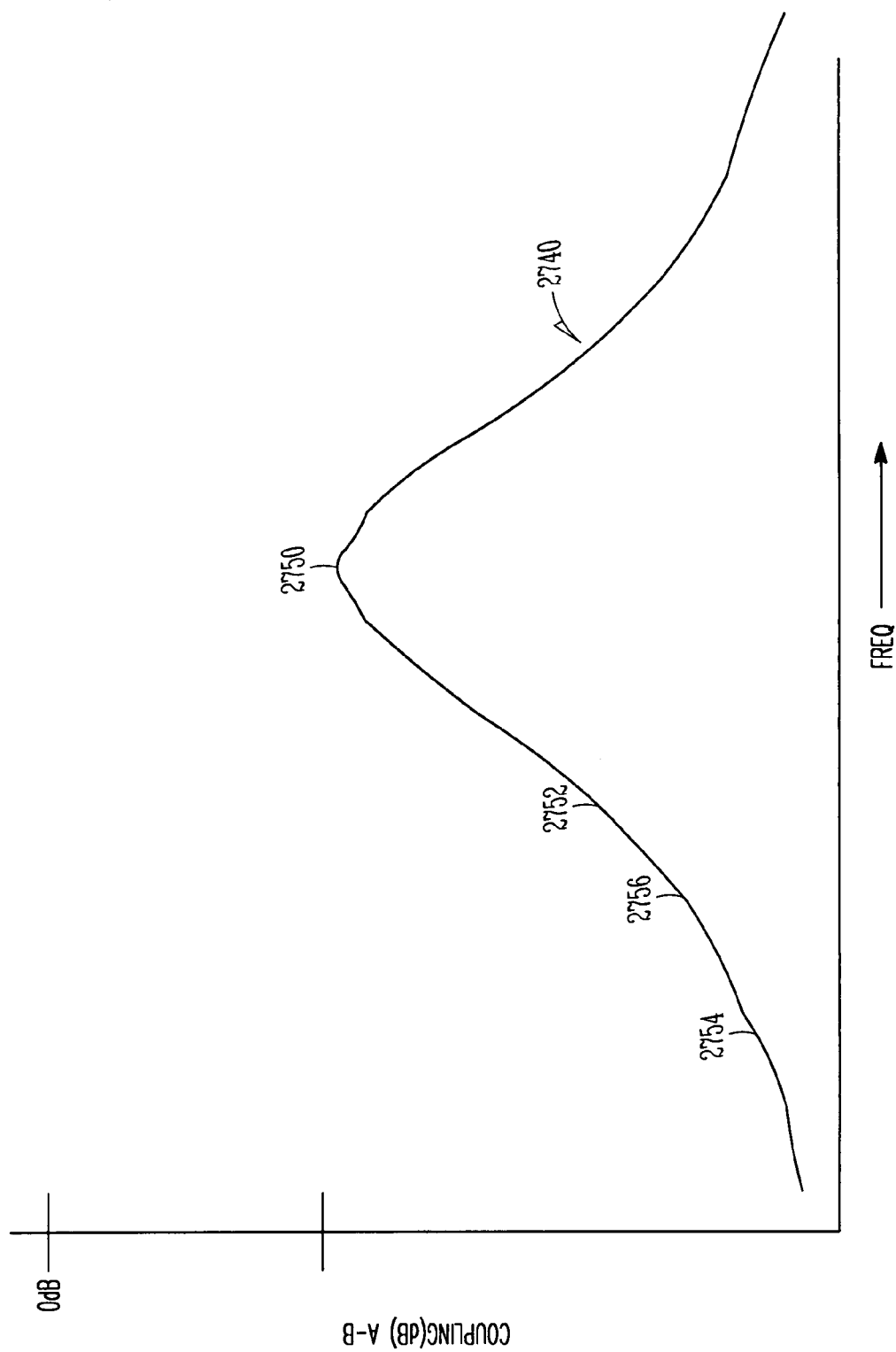
FIG. 27B is a chart illustrating coupling between a port for a drive probe and a port for a feedback probe for the lamp of FIG. 27A as a function of frequency during periods of lamp operation from ignition to steady state.

An example ignition and startup sequence for lamp 2700 will now be described. FIG. 27B is a chart showing power coupling from input connector 2702A to feedback connector 2702B as a function of frequency. The curve 2740 is an approximation of the frequency response for the lamp 2700 in its cold state when the plasma in the bulb 2706 is not ignited. However, as the plasma ignites, the center frequency, peak amplitude, and width of the resonance all shifts due to changing impedance of the plasma. The positive feedback loop automatically oscillates at a frequency based on the load conditions and phase of the feedback signal. If the phase is such that constructive interference occurs for waves of a particular frequency circulating through the loop, and if the total response of the loop (including the amplifier, the lamp, and all connecting elements) at that frequency is such that the wave is amplified rather than attenuated in a loop-traversal, then the loop will oscillate that frequency. Because, in the absence of a phase-shifter, the phase of a wave circulating back to the same point in a loop depends on the ratio of its wavelength (frequency) to the physical length of the loop (as well as the dielectric constants of all intervening material), whether a particular setting of the phase shifter induces constructive or destructive feedback is itself a function of frequency. In this way, the phase shifter is used to finely-tune the actual frequency of oscillation within the range supported by the lamp's resonant frequency response. In doing so, it also in effect tunes how well power is coupled into the lamp, whose absorption of the incoming RF power is itself a function of frequency. Thus the phase shifter provides a control with which the startup sequence may be optimized, as will be described.

Figure 27C:
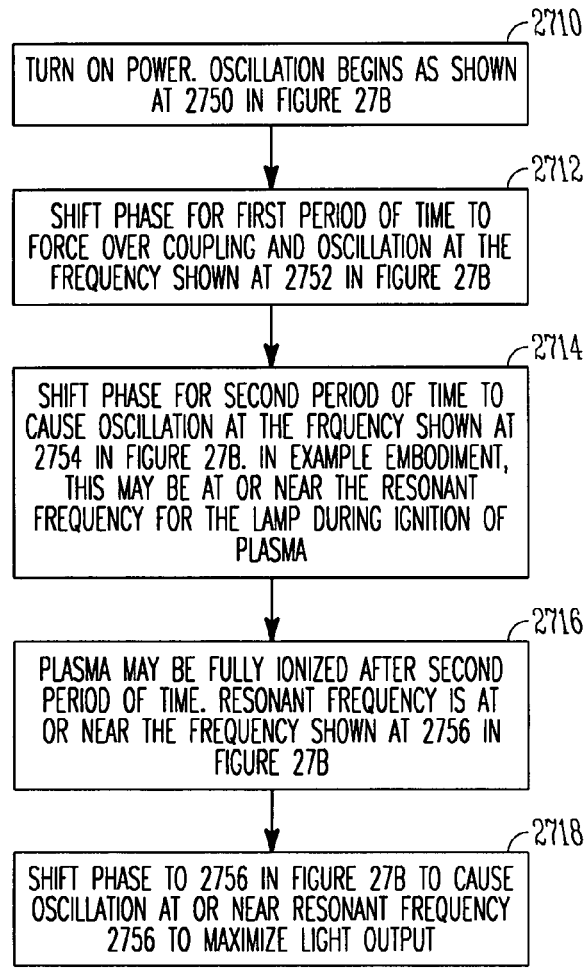
FIG. 27C is a flow chart of a method for operating a lamp according to an example embodiment.

FIG. 27C is a flow chart of a method for operating a lamp 2700 according to an example embodiment. Referring to FIG. 27C, the lamp may be turned on at step 2710. At step 2710, the lamp is in a cold state and the plasma is not ignited. Oscillation begins at the frequency shown at 2750 in FIG. 27B. As the load conditions of the lamp change, the feedback loop automatically adjusts the frequency and selects a frequency of oscillation based on the resonant frequency for the load conditions and the phase of the feedback signal. In order to spike the power to expedite initial ignition of the plasma in the bulb, the microcontroller cause the phase shifter to adjust the phase to over couple the power as shown at step 2712 in FIG. 27C. This forces oscillation at 2752, although this is not the resonant frequency during ignition of the plasma. The "natural" oscillation would occur at the resonant frequency 2754 during ignition, but the selected phase causes destructive interference at 2754 and constructive interference at 2752. While reference is made to phases selected to cause oscillation at particular frequencies, it will be understood that the microcontroller and phase shifter control the phase in this example embodiment and not specific frequencies. The feedback loop automatically selects a frequency based on load conditions and phase. The feedback loop may dynamically adjust frequency throughout the ignition/startup process based on these conditions, although the selected phase can shift oscillation relative to the frequencies that would otherwise occur as the load conditions change during ignition.

This state causes a high power level to be applied to the bulb for a short period of time. The phase may be maintained for a first period of time. In an example embodiment, the first period is predetermined and controlled by the microprocessor and may be in the range of, for example, 50 ms to 1 second or any range subsumed therein. In a particular example, the first period may be 100 ms. In some example embodiments, this state may cause the power level of the amplifier to exceed the continuous wave (CW) power rating of the amplifier for a short period of time. For example, an amplifier with a CW power rating of 75 watts, 100 watts or 150 watts may be used in various example embodiments and the power provided by the amplifier may exceed this level during step 2712 (by up to, for example 10%-80% more than the CW power rating, or any range subsumed therein). The power may then be lowered to a power level at or below the CW power rating in step 2714 as described below. The load impedance of the lamp in this state is not well matched to the ideal load specified for the amplifier (which may be, for example, 50 ohms in some example embodiments). This state may be stressful on the amplifier in some example embodiments and may be maintained for a short period of time. In some example embodiments, the first period of time may be selected to be less than the time specified for the pulsed power rating of the amplifier. This configuration is an example only and other configurations may be used to provide power during step 2712.

After the power is spiked during the first period of time, the microcontroller causes the phase shifter to adjust the phase for a second period of time as shown at step 2714. This causes oscillation at the frequency shown at 2754 in FIG. 27C which is at or near the resonant frequency during ignition. As described above, while reference is made to particular frequencies, it will be understood that the feedback loop may dynamically adjust frequency throughout this process. The impedance matching between the lamp and the amplifier is better than during step 2712, but still may not be very good. As the plasma becomes fully vaporized, the resonant frequency may shift to 2756 in FIG. 27B, but the phase is not adjusted for oscillation at this frequency. The second period of time may be predetermined by the microcontroller and, in example embodiments, may be between 5 and 20 seconds or any range subsumed therein. In a particular example, the second period of time is 9.9 seconds (10 seconds less the amount of time used for step 2712).

After the second period of time, the plasma may be fully ionized as shown at step 2716 and the resonant frequency for steady state operation of the lamp may be at or near 2756. As shown at step 2718, the microcontroller may cause the phase shifter to shift the phase to oscillate at the resonant frequency 2756 to maximize light output.

The above method is an example only and other variations may be used in some example embodiments. For example, instead of using predetermined periods of time set by a microcontroller or other control circuit, lamp conditions (such as brightness from sensor S in FIG. 26, the signal from the feedback probe, a measurement of reflected power at the drive probe or other operating condition of the lamp) may be used to determine when and how to shift the phase in some example embodiments. In other example embodiments, the microcontroller may step through less than four phases (for example two phases—an ignition phase and a phase for steady state operation when the plasma is ionized) or more than four phases (for example a range of phases at various frequencies as the resonant frequency changes during ignition and startup). The phase used to achieve desired lamp operating conditions during initial ignition, startup and steady state operation may be determined empirically in example embodiments and/or through simulation/modeling and/or by signals derived from lamp operating conditions monitored by the microprocessor. In other example embodiments, the phase selected for steady state operation may be slightly out of resonance, so maximum brightness is not achieved. This may be used to leave room for the brightness to be increased and/or decreased in response to brightness control signals.

Figure 27D:
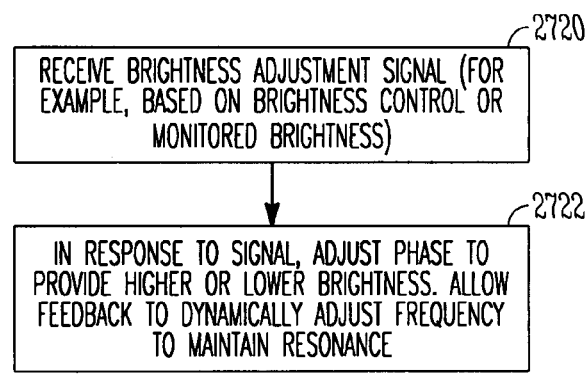
FIG. 27D is a flow chart of a method for brightness adjustment according to an example embodiment.

FIG. 27D is a flow chart of a method for brightness adjustment according to an example embodiment. This example method may be used in connection with a control and feedback circuit of the type shown in FIG. 26. As shown at 2720, the microprocessor may receive a signal indicating the brightness of the lamp should be adjusted. This signal may be generated by a sensor S that samples the light from the bulb B. The signal may also be provided by a brightness control or based on timers or other triggers in the lamp. As shown at 2722, the microcontroller then causes the phase shifter PS4 to adjust the phase. In an example embodiment, phase shifting may be used to increase or decrease the brightness.

Figure 28:
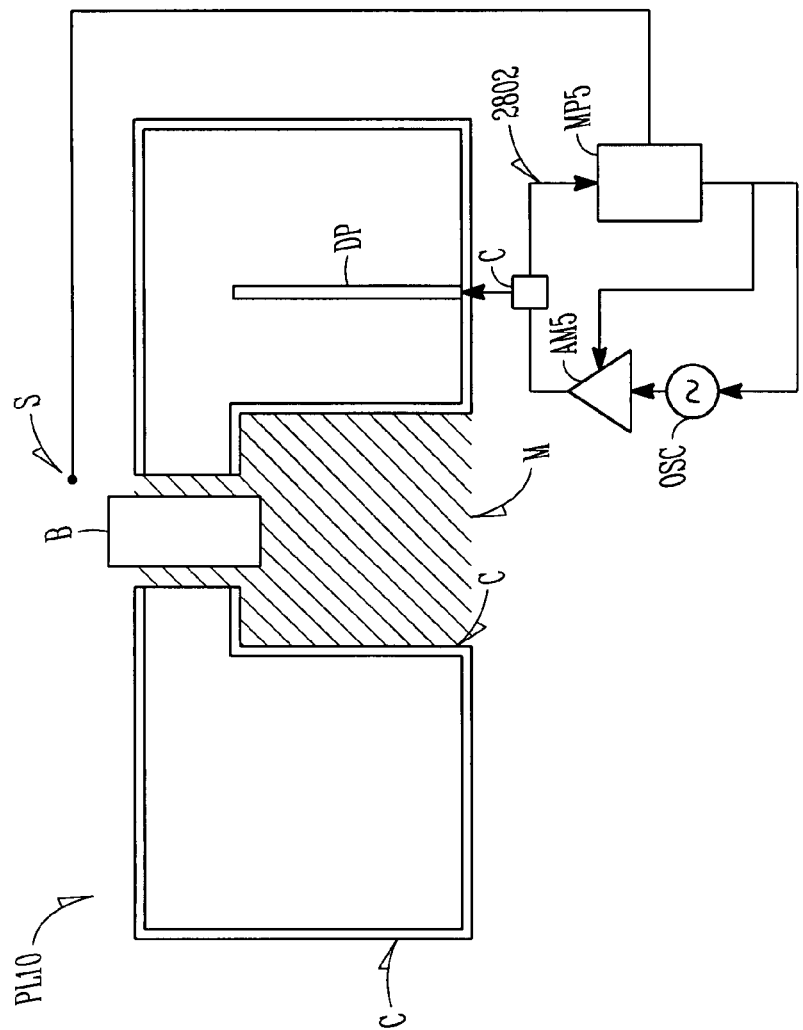
FIG. 28 is a cross-sectional view of a lamp with a waveguide body according to a tenth example embodiment.

FIG. 28 is a cross-sectional view of a lamp PL10 with a waveguide body according to a tenth example embodiment. The lamp PL10 is similar to the lamp PL9 of FIG. 26 except that it does not have a feedback probe and uses a different power circuit. As shown in FIG. 28, an oscillator OSC may provide power through amplifier AMS to the drive probe DP. The drive probe DP is embedded in the solid waveguide body. A microprocessor MP5 is used to control the frequency and power level provided to the drive probe DP. The microprocessor MP5 may cause power to be provided at a first frequency and power level for initial ignition, a second frequency and power level for startup after initial ignition and a third frequency and power level when the lamp reaches steady state operation. Each step in the startup process may continue for a predetermined period of time as determined by the microprocessor or may be based on lamp conditions such as a signal from sensor S or on reflected power from the waveguide body and drive probe. Reflected power may be provided back to the microprocessor as shown at 2802. It may be more difficult to maintain resonance with the power circuit shown in FIG. 28, because the microprocessor must have preset conditions based on anticipated lamp conditions at a particular time or must determine the settings based on conditions of the lamp. In contrast, the feedback loop of FIG. 26 automatically provides dynamic adjustment of the frequency based on varying lamp conditions.

Figure 29:
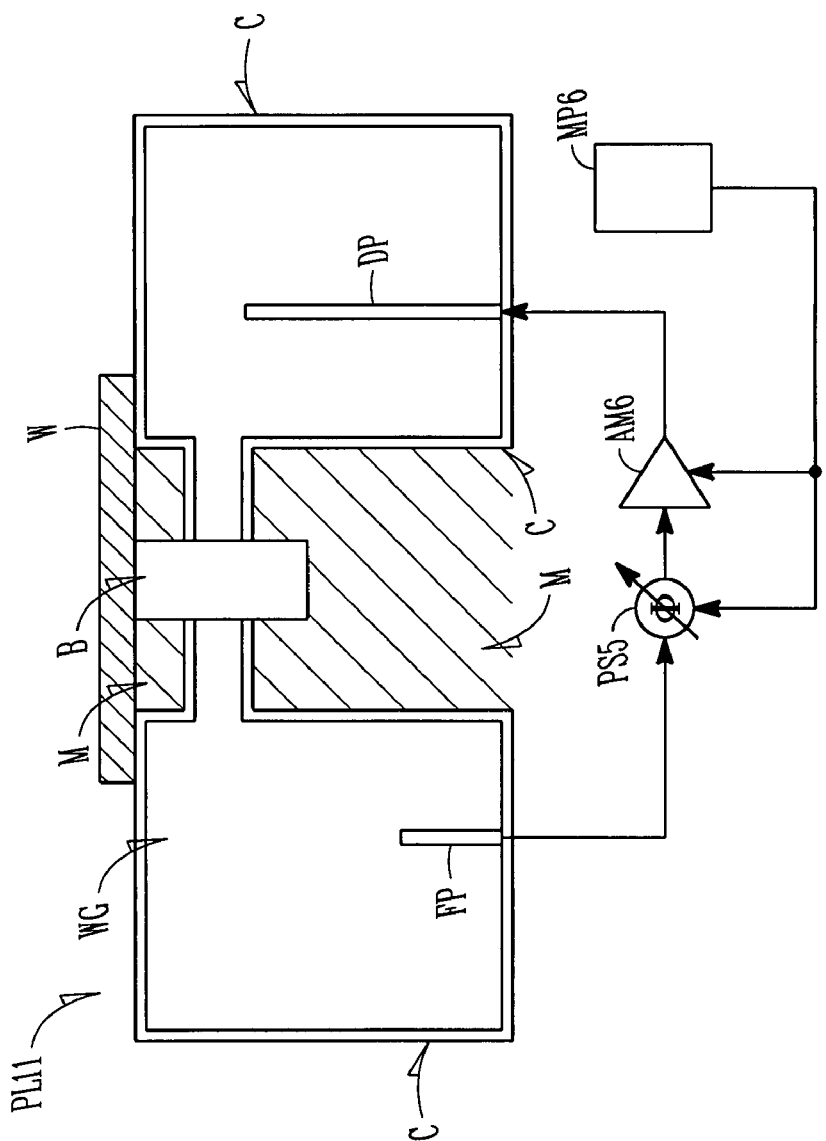
FIG. 29 is a cross-sectional view of a lamp with a waveguide body according to an example eleventh embodiment.

FIG. 29 is a cross-sectional view of a lamp with a waveguide body according to an eleventh example embodiment. The lamp PL11 is similar to the lamp PL9 of FIG. 26 except that the bulb B is formed from the lamp body. In this example embodiment, the waveguide body WG has a narrow region adjacent to the bulb. The outer surface of the waveguide body WG has a metallic coating C. The waveguide body WG directs power into the bulb B. A material M is added outside the waveguide body WG to define the walls of the bulb. The material may be the same dielectric material used for the waveguide body WG. For example, the waveguide body WG and material M may both be alumina. In other example embodiments, the material M may be different than the waveguide body WG. For example, the material M may include sintered alumina powder. The material M and waveguide body WG define a cavity extending into the lamp body from a top surface of the lamp body. A transmissive window W seals the cavity to form a bulb. The window may be quartz, sapphire or other transmissive material. In some example embodiments, the bulb may have a ceramic or quartz liner inside the cavity. This design allows the waveguide WG to provide power primarily to the middle of the bulb and keep the ends of the bulb (including window W) away from the areas of highest electric field intensity. Since there are no separate bulb walls in the cavity, it may be possible to design a very small bulb with high power density with this approach.

Figure 30B:
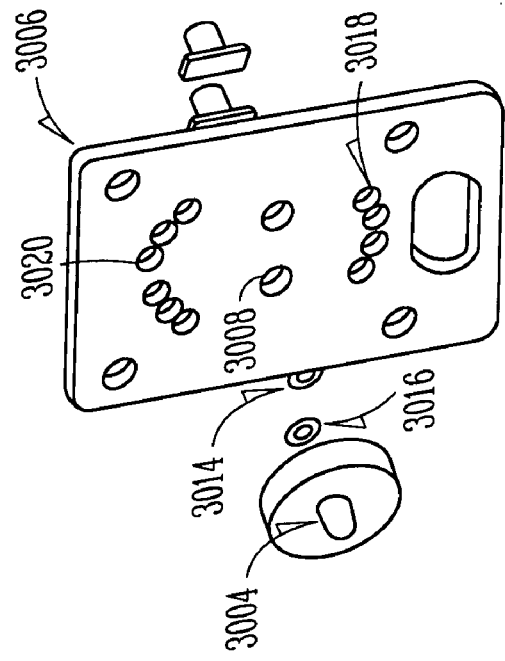
FIGS. 30A and 30B are perspective views of a back plate and heat sink assembly according to an example embodiment.
Figure 30A:
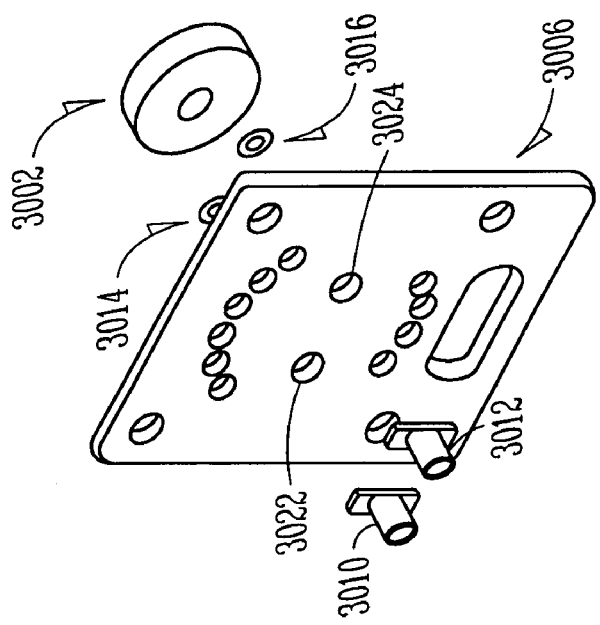

FIGS. 30A and 30B are perspective views of a back plate and heat sink assembly according to an example embodiment, which provides the mechanical interface for the lamp body 3002 to the rest of the system, which may include a feedback and control circuit of the type shown in FIG. 26. As described above, the outer surface of the lamp body (other than the surface of the waveguide adjacent to the bulb) may be coated with an electrically conductive material such as silver paint. The lamp dielectric body 3002 and the bulb 3004 are fastened to the backplate 3006, the latter also providing a cavity 3008 in the example embodiments where alumina powder is used as the interface between the lamp body and the bulb. In alternative example embodiments, adhesive or other materials may be used as part of this interface. The interface around the bulb may be important for thermal management as described further below and may be adjusted empirically or through simulation/modeling to achieve desired lamp operating conditions.

Electrical connections to the probes are made using coaxial cable to the SMA connectors 3010 and 3012, whose center pins connect to the probes that protrude into the lamp body through holes 3022 and 3024 in the back plate. In an example embodiment, connector 3010 may connect to a drive probe embedded in the dielectric waveguide body 3002 and connector 3012 may connect to a feedback probe embedded in the dielectric waveguide body 3002. Connector gaskets are placed between the probe-holes on the lamp-body and the backplate. These serve to both minimize EMI from leakage at that critical juncture where guided-waves in the coaxial cable couple to the lamp, as well as regulate the thermal conductivity between the lamp and the backplate. The diameter, thickness, and hole-diameter are parameters that may be varied empirically to achieve both EMI and thermal conductivity control. For example, the backplate/gasket assembly may be configured to provide electromagnetic interference (EMI) shielding that complies with FCC part 15 class A/B EMI requirements (less than 49.5 dBuV/m at 10 meters for class A and less than 54 dBuV/m at 3 meters for class B) and also to control thermal losses to the heat sink so high brightness can be achieved (as described further below). In this example, the backplate/gasket provides the desired EMI shielding, but is not in intimate contact with the entire back side of the dielectric lamp body 3002. Thermal losses are thereby limited to avoid over cooling. A metal bracket with flanges may also be attached around the perimeter of the waveguide body to facilitate assembly of the lamp. The metal bracket may use a spring or clamp to apply positive pressure around the perimeter of the waveguide. In example embodiments using a metal bracket, the thermal losses from the waveguide to the bracket may also be taken into account when managing thermal losses from the bulb.

Air-hole patterns 3018 and 3020 may also be drilled into the backplate to provide convective cooling to the lamp. The size, quantity, and placement of these are also varied empirically to achieve the desired operating temperatures. The backplate may be attached to a chamber or housing containing the waveguide and bulb. A fan may be used to circulate air through the air holes to promote conductive and convective cooling of the outer surfaces of the waveguide and the surfaces of the bulb exposed to the surrounding environment. In an example embodiment, air may be circulated into the chamber or housing through one set of holes in the back plate and exhausted through a second set of holes. In another example embodiment, air may be circulated into both sets of holes and exhausted through another vent or opening in the chamber or housing containing the waveguide and bulb. The air flow may be selected to control the rate of non-radiative heat loss from the waveguide and bulb.

Thermal losses may also be managed through the selection of the thermal conductivity of materials used in the lamp, the design of the interface between the bulb and the waveguide body, the design of the interface between the lamp body and the heat sink and the surface area of the bulb in contact with surrounding materials and the surface area exposed to the surrounding environment. The bulb loses heat through conductive losses to the surrounding materials, through conductive and convective heat losses to the surrounding environment and through radiation. Example embodiments may be designed to provide sufficient conductive and convective heat transfer to avoid damage to the bulb, but otherwise maximize radiation to provide high brightness. For example, the waveguide may a solid alumina material.

The interface between the bulb and the waveguide may use a material with a lower thermal conductivity, such as alumina powder. In an example embodiment, the layer may have a thermal conductivity in the range of about 0.5 to 10 watts/meter-Kelvin (W/mK) or any range subsumed therein. For example, sintered alumina powder with 55% packing density (45% fractional porosity) and thermal conductivity in a range of about 1 to 2 watts/meter-Kelvin (W/mK) may be used. Alternatively, a thin layer of a ceramic-based adhesive or an admixture of such adhesives may be used. Depending on the formulation, a wide range of thermal conductivities is available. For example, one line of adhesives available commercially from Cotronics, Inc. of Brooklyn, N.Y. spans the range of 0.28 to 6.2 W/mK. In one example, the Cotronics RES-BOND 919 adhesive may be used. This adhesive has a thermal conductivity of about 0.58 W/mK and a continuous-use temperature rating of 1540° C. As described above, other example embodiments may use a thermal layer or sleeve of material having a thermal conductivity coefficient in a range between about 10 and 50 watts/meter-Kelvin (W/mK) or any range subsumed therein. In practice, once a layer composition is selected having a thermal conductivity close to the desired value, fine-tuning may be accomplished by altering the layer thickness. Some example embodiments may not include a separate layer of material around the bulb and may provide a direct conductive path to the waveguide body.

The gaskets may be used to provide EMI shielding and a heat sink over a region of the waveguide body. However, the back plate may be spaced by the gaskets from the waveguide body to avoid over cooling through conductive transfer from the waveguide body directly to the back plate. This thermal management allows a high temperature to be maintained in the plasma in the bulb with controlled conductive losses and high radiation resulting in high brightness. While the resulting plasma might damage a bulb in many configurations, the bulb ends may extend beyond the waveguide body and be spared excess damage from the plasma. Conductive and convective losses may also be managed through selection of the bulb size. Conductive losses increase with increased size of the bulb and convective losses depend on the bulb surface area exposed to the surrounding environment and the air flow. A very small bulb can be used to achieve a high power density and high brightness. For example, a bulb with an inner width of 3 mm and an inner length of 9 mm may be used in some example embodiments. Smaller bulbs might also be used in some example embodiments, such as a bulb with a 3 mm inner width and 6 mm inner length or a bulb with a 2 mm inner width and 4 mm inner length. The bulb may use a fill such as Indium Bromide, Sulfur, Selenium or Tellurium. Additives such as Mercury may be used. In some examples, a metal halide such as Cesium Bromide may be added to stabilize a discharge of Sulfur, Selenium or Tellurium.

A waveguide comprising a dielectric material with an electrically conductive outer coating can be used to couple power to a bulb very efficiently as described above. The non-radiative thermal losses from the bulb can be controlled through by selecting the size and surface area of the bulb, the thermal conductivity of surrounding materials, the area of the bulb in contact with surrounding materials, the area exposed to the external environment and the air flow and conditions maintained in the surrounding environment.

Thermal modeling may be used to select a lamp configuration providing a high peak plasma temperature resulting in high brightness, while remaining below the working temperature of the bulb material. Once a general model is established, the thickness of the thermal layers, positioning of the bulb and air flow may also be empirically adjusted to obtain desired lamp operating conditions. In one example, a model was used in which the plasma region is modeled as a thermal source surrounded by a region of cooler gases between the plasma and the bulb walls. Heat is transferred to the bulb walls primarily by conduction and convection. Between the bulb outer surface and the waveguide body (or thermal layer), there are three main heat transport paths: radiation from the bulb outer surface(s), convection, and conduction through contact with the waveguide body (or thermal layer). Of these, conduction is by far the most effective path for surfaces of the bulb in contact with the waveguide body (or thermal layer), accounting for over 90% of the heat flow in the surfaces in contact with the waveguide body (or thermal layer) in one example. At the interface between the bulb outer surface(s) and the waveguide body, a thermal layer (or selection of waveguide materials) and surface area in contact with the bulb can be selected for fine regulation of thermal conductivity to optimize the plasma/bulb temperature ratio.

In one example, the modeling may be performed using the TAS™ software package available commercially from Harvard Thermal, Inc. of Harvard, Mass. Like other similar packages, TAS™ is based on the industry standard SINDA (Systems-Improved Numerical Differentiating Analyzer) code. After specifying via a user interface the geometry, thermal properties, and heat sources/sinks of the system being modeled, mesh generation and numerical solution using a finite-difference algorithm are performed.

In one example, the plasma was modeled as a uniform tube 1 millimeter (mm) in diameter and 5 mm in length, which uniformly dissipates 120 W of heat input. The bulb was modeled as a quartz cylinder having a 5 mm inner diameter and 8 mm inner length, a sidewall thickness of 2 mm, and upper and lower cap thicknesses of 2.5 mm. The waveguide body was modeled as a solid alumina cylinder 20 mm in height and 36 mm in outer diameter. The top of the bulb upper cap protruded from the body's top surface by 2.5 mm. The thermal layer (acting as a heat-flux regulator) was modeled as a layer 0.5 mm thick whose thermal conductivity was varied parametrically in a range between 0.05 and 1 W/mK. For comparison, pure single-crystal aluminum oxide has a thermal conductivity of about 40 W/mK at room temperature, while air at 400° C. has a thermal conductivity of about 0.05 W/mK. The low end of the range modeled therefore represents the "null" case of an air-gap between the bulb longitudinal outer surface and the opening inner surface.

In this example, a design temperature upper limit of 1200° C. was selected for the bulb walls, several hundred degrees cooler than the 1500° C. working temperature of quartz. In example embodiments, this temperature margin can be in a range from about 100° C. to about 500° C., or any range subsumed therein. Other temperature limits may be selected for other materials. In one example, this model showed a plasma peak temperature of about 6350° K when the thermal conductivity of thermal layer is about 0.6 W/mK. A higher thermal conductivity would result in lower bulb wall temperature at the expense of lower plasma peak temperature and less brightness. A solid alumina waveguide body in direct contact with the bulb, with thermal conductivity in a range of 20 to 40 W/mK, would result in a lower plasma temperature and lower brightness. On the other hand, a quartz bulb surrounded by air would need to operate at lower power (with lower brightness) to keep the bulb cool enough to avoid damage to the quartz. Example embodiments using a higher temperature material (such as a bulb having walls formed out of a portion of an alumina waveguide body) may operate at a higher temperature and permit materials with different thermal conductivity to be used. As described above, the ends of the bulb may also extend beyond the plasma region inside the bulb (e.g., bulbs extending beyond the surfaces of the waveguide).

In example embodiments, use of a solid waveguide, a partial heat sink in contact with the surface of the waveguide, a material with lower thermal conductivity between the bulb and the waveguide and a small bulb may result in a luminous efficiency of between 80 lumens/watt and 120 lumens/watt or any range subsumed therein. Example embodiments may result in a total brightness of between 8,000 and 12,000 lumens, or any range subsumed therein, or more at powers between 100-150 watts, or any range subsumed therein. For instance, a lamp according to an example embodiment may have a total brightness of more than 10,000 lumens at a power of about 100 watts. In another example, a lamp according to an example embodiment may have a total brightness of more than 12,000 lumens at a power of about 150 watts. It is believed that these results may be achieved both initially and after various benchmarks, such as 100 hours, 1000 hours or 10000 hours of lamp operation. In addition, damage to the bulb may be avoided by maintaining the temperature of the bulb surfaces below the working temperature of the bulb material and by extending the ends of the bulb outside the surfaces of the waveguide (and away from the region of peak plasma temperature). For example, even after 100 hours, 1000 hours or 10000 hours of lamp operation at or above 10000 lumens, it is believed that the above luminous efficiency and total brightness may be achieved without melting or significant degradation of transmittance of the quartz (e.g., loss of 5-20% or more of transmittance in any region of the bulb or any range subsumed therein). These are examples only and lower or higher brightness may be achieved with other example embodiments.

The above methods may be used to control the thermal losses in both electrodeless bulbs and bulbs containing electrodes. A bulb may be formed from a discharge envelope of quartz, sapphire or other material or may be formed in part by the walls of a waveguide or lamp body. The bulb may be electrodeless and use a waveguide or coil to couple power into the bulb or use a pair of discharge electrodes in the bulb comprising tungsten and/or other metals between which a discharge is maintained. A power source provides power to the electrodes to produce a discharge. A heat sink may be placed in at least partial contact with the bulb wall. In an example embodiment, the heat sink may be in at least partial contact with the bulb wall around the discharge region of the bulb where the plasma is formed (for example, the region between the electrodes in a bulb with electrodes). The heat sink may comprise a solid material such as a dielectric material with a dielectric constant greater than 2. In example embodiments, alumina or alumina powder may be used. In other example embodiments, any of the thermal layer materials described above may be used. In example embodiments, the heat sink may be a waveguide or solid lamp body or a thermal layer between a bulb and a waveguide or lamp body or a combination of the foregoing. The heat sink provides a path for conductive heat loss from the wall of the bulb. In example embodiments, the thermal conductivity may be in the range of 0.5 to 50 watts/meter-Kelvin (W/mK) or any range subsumed therein. The thermal conductivity of the heat sink and area of contact between the heat sink and bulb wall may be configured such that the wall temperature of the bulb is maintained below a level that would damage the bulb material or cause significant wall reaction between the fill ingredients, the bulb material, and/or the electrode materials. In example embodiments, the heat sink and area of contact between the heat sink and bulb wall may be configured to enable inner bulb wall loadings above 1.5 $W/mm^2$ for high luminous efficacy and long lamp life. As described above, luminous efficiency of 80-120 lumens/watt or any range subsumed therein and high total brightness of more than 12,000 lumens may be achieved using these thermal management techniques.

What is claimed is:

1. An electrodeless plasma lamp comprising:
   a lamp body;
   a feed to provide power to the lamp body at a resonant frequency for the lamp body;
   an elongate bulb containing a fill to form a light emitting plasma, an interior volume of the bulb being less than a volume of the lamp body; and
   two electrically conductive surfaces proximate opposed ends of the bulb, an electric field extending between the two electrically conductive surfaces when power is provided to the lamp body to form the light emitting plasma, and wherein a distance between the two electrically conductive surfaces is less than an inner length of the bulb.

2. The electrodeless plasma lamp of claim 1, wherein the bulb has an axis of rotational symmetry and the electric field extends along the axis of rotational symmetry.

3. The electrodeless plasma lamp of claim 1, wherein the distance between the two electrically conductive surfaces is greater than 2 mm.

4. The electrodeless plasma lamp of claim 1, wherein the lamp body includes a recess in a lower portion of the lamp body, a top surface of the recess comprising one of the two electrically conductive surfaces.

5. The electrodeless plasma lamp of claim 1, wherein the lamp body includes an opening in an upper portion of the lamp body, one of the two electrically conductive surfaces forming a perimeter of the opening.

6. The electrodeless plasma lamp of claim 1, wherein the inner length of the bulb is between 4 mm and 20 mm.

7. The electrodeless plasma lamp of claim 1, wherein the interior volume of the bulb is less than about 750 $mm^3$.

8. The electrodeless plasma lamp of claim 1, wherein at least one of the two electrically conductive surfaces is metallic coating on an upper surface of the lamp body.

9. The electrodeless plasma lamp of claim 1, wherein the bulb is positioned proximate the two electrically conductive surfaces so that both ends of the bulb are exposed to regions of reduced electric field intensity.

10. The electrodeless plasma lamp of claim 1, wherein the electrically conductive surfaces surround a perimeter of the bulb.

11. The electrodeless plasma lamp of claim 1, wherein inner ends of the bulb are exposed to an external environment of the lamp body.

12. The electrodeless plasma lamp of claim 1, wherein the lamp body resonates in a fundamental resonant mode.

13. The electrodeless plasma lamp of claim 1, wherein the feed is a probe that extends into the lamp body.

14. The electrodeless plasma lamp of claim 1, wherein the lamp body comprises a dielectric material having a dielectric constant greater than about 2.

15. The electrodeless plasma lamp of claim 1, wherein the waveguide body is circular cylindrical in shape.

16. The electrodeless plasma lamp of claim 1, wherein the waveguide body is a rectangular prism in shape.

17. The electrodeless plasma lamp of claim 1, wherein one of the two electrically conductive surfaces is a planar upper surface of the lamp body, the planar upper surface including an opening through which the bulb extends.

18. The plasma lamp of claim 1, wherein the volume of the lamp body is at least five times greater than the interior volume of the bulb.

19. The plasma lamp of claim 1, wherein the volume of the lamp body is at least ten times greater than the interior volume of the bulb.

20. The electrodeless plasma lamp of claim 1, wherein the frequency is less than about 1 GHz, the interior volume of the bulb is less than about 750 mm$^3$, and the volume of the lamp body is at least five times greater than the interior volume of the bulb.

21. The electrodeless plasma lamp of claim 1, wherein the frequency is less than about 1 GHz, the interior volume of the bulb is less than about 750 mm$^3$, and the volume of the dielectric body is at least ten times greater than the interior volume of the bulb.

22. The electrodeless plasma lamp of claim 1, wherein the frequency is less than 1 GHz.

23. The electrodeless plasma lamp of claim 9, wherein the electrically conductive surfaces proximate the bulb are each spaced from a corresponding end of the bulb.

24. The electrodeless plasma lamp of claim 23, wherein the ends of the bulb extend beyond the electrically conductive surfaces by more than 10% of the inner length of the bulb.

25. The electrodeless plasma lamp of claim 23, wherein inner ends of the bulb extend beyond the electrically conductive surfaces by more than 1 mm.

26. The electrodeless plasma lamp of claim 25, wherein inner ends of the bulb extend beyond the electrically conductive surfaces by more than 2.5 mm.

27. An electrodeless plasma lamp comprising:
a resonant structure comprising two electrically conductive surfaces, a first electrically conductive surface forming an outer shell having a opening;
an elongate bulb containing a fill that forms a light emitting plasma, the bulb being positioned at least partially within the opening and with ends of the bulb proximate the two electrically conductive surfaces and the bulb having an interior volume less than a volume of the lamp body; and
a feed to provide power to the lamp body at a resonant frequency for the lamp body, wherein an electric field extends between the two electrically conductive surfaces when power is provided to the resonant structure to form the light emitting plasma, and a distance between the two electrically conductive surfaces is less than an inner length of the bulb.

28. An electrodeless plasma lamp comprising:
a resonator operating in a fundamental resonant mode, the resonator comprising a first electrically conductive material having an electrically conductive surface enclosing a dielectric body with a dielectric constant greater than 2;
a feed to provide power to the resonator at a frequency at which the resonator operates in the fundamental resonant mode;
an elongate bulb containing a fill to form a light emitting plasma when the resonator resonates in the fundamental resonant mode, the bulb having an interior volume that is less than the volume of the resonator and being supported proximate an upper surface of the resonator by the dielectric material, the bulb having a first end positioned proximate a first electrically conductive surface of the first electrically conductive material; and
a second electrically conductive material having a second electrically conductive surface proximate a second end of bulb, wherein an electrical field extends between the first and second electrically conductive surfaces and the distance between the first electrically conductive surface and the second electrically conductive surface is less than an inner length of the bulb.

29. The electrodeless plasma lamp comprising:
a resonator having an upper side, a lower side and at least one side wall connecting the upper side and the lower side, the at least one side wall comprising a side electrically conductive surface;
a feed to provide power to the resonator at a frequency at which the resonator operates in a fundamental resonant mode;
a bulb containing a fill to form a light emitting plasma when the resonator resonates in the fundamental resonant mode, the bulb having an interior volume that is less than the volume of the resonator and being supported proximate the upper side of the resonator;
a first electrically conductive surface electrically connected to the side electrically conductive surface, a portion of the first electrically conductive surface terminating proximate a first end of the bulb;
a second electrically conductive surface terminating proximate a second end of the bulb, wherein a electric field extends between the portion of the electrically conductive surface proximate the first end of the bulb and the second electrically conductive surface proximate the second end of the bulb.

30. The electrodeless plasma lamp of claim 29, wherein the bulb is supported in the resonator by a dielectric material having a dielectric constant greater than 2.

31. The electrodeless plasma lamp of claim 29, wherein the dielectric material supporting the bulb is spaced from the lower side of the resonator.

32. The electrodeless plasma lamp of claim 29, wherein the first electrically conductive surface extends across the upper surface of the resonator.

33. The electrodeless plasma lamp of claim 29, wherein a plane in which the upper side of the resonator lies extends through the bulb.

34. The electrodeless plasma lamp of claim 29, wherein the first electrically conductive surface extends across the upper surface of the resonator.

35. The electrodeless plasma lamp of claim 29, wherein the first electrically conductive surface surrounds a perimeter of the first end of the bulb.

36. The electrodeless plasma lamp of claim 29, wherein the second electrically conductive surface terminating proximate the second end of the bulb surrounds a perimeter of the second end of the bulb.

37. The electrodeless plasma lamp of claim 29, wherein the first electrically conductive surface surrounds a perimeter of the first end of the bulb, and the second electrically conductive surface terminating proximate the second end of the bulb surrounds a perimeter of the second end of the bulb.

38. The electrodeless plasma lamp of claim 29, wherein the resonator is circular cylindrical in shape.

39. The electrodeless plasma lamp of claim 29, wherein the resonator is a rectangular prism in shape.

40. The electrodeless plasma lamp of claim 29, wherein the resonator includes an air cavity below the bulb and between the upper side and the lower side.

41. The electrodeless plasma lamp of claim 29, wherein the first end and second end of the bulb are exposed from a body of the resonator.

* * * * *

UNITED STATES PATENT AND TRADEMARK OFFICE
CERTIFICATE OF CORRECTION

PATENT NO. : 8,022,607 B2  
APPLICATION NO. : 11/553910  
DATED : September 20, 2011  
INVENTOR(S) : Frederick M. Espiau et al.

Page 1 of 1

It is certified that error appears in the above-identified patent and that said Letters Patent is hereby corrected as shown below:

On the face page, in field (75), in "Inventors", in column 1, lines 1-3, delete "Yian Chang, Topanga, CA (US); Frederick M. Espiau, legal representative, Topanga, CA (US);" and insert -- Yian Chang, deceased, late of Topanga, CA (US); by Frederick M. Espiau, legal representative, Topanga, CA (US) --, therefor.

On the face page, in field (57), under "Abstract", in column 2, line 1, delete "lamp is," and insert -- lamp is --, therefor.

Signed and Sealed this  
Sixth Day of March, 2012

David J. Kappos  
*Director of the United States Patent and Trademark Office*